United States Patent [19]
Stendardo et al.

[11] Patent Number: 5,556,283
[45] Date of Patent: Sep. 17, 1996

[54] CARD TYPE OF ELECTRONIC LEARNING AID/TEACHING APPARATUS

[76] Inventors: William Stendardo, 407 Leonia Ave., Bogota, N.J. 07603; David Weisman, 30 Mill Valley La., Stamford, Conn. 06903

[21] Appl. No.: 302,493

[22] Filed: Sep. 8, 1994

[51] Int. Cl.$^6$ ........................................................ G09B 7/00
[52] U.S. Cl. ........................ 434/188; 434/169; 434/308; 434/311; 434/322; 434/363
[58] Field of Search ................................. 434/129, 169, 434/171, 172, 188, 198, 199, 201, 307 R, 308–311, 322, 363; 273/236, 237, 238; 364/410–412

[56] References Cited

U.S. PATENT DOCUMENTS

| | | | |
|---|---|---|---|
| 4,358,278 | 11/1982 | Goldfarb | 434/169 X |
| 4,465,465 | 8/1984 | Nelson | 434/308 X |
| 4,681,548 | 7/1987 | Lemelson | 434/308 X |
| 4,980,919 | 12/1990 | Tsai | 434/169 X |
| 5,055,053 | 10/1991 | Hyman | 434/169 X |
| 5,407,357 | 4/1995 | Cutler | 434/317 X |

*Primary Examiner*—Richard J. Apley
*Assistant Examiner*—Glenn E. Richman

[57] ABSTRACT

An electronic learning system that utilizes a plurality of coded cards on which sensory-information representations are provided to present pictorial-symbol information and/or language-symbol information, in conjunction with a housing that contains card slots in combination with a visually and functionally distinctive button associated with each individual card slot and a button associated in an equal manner to all card slots, wherein a card may be inserted in each of the card slots. The operator can cause the system to generate unique audible information associated with the sensory-information representation provided on any selected card by pressing the visually and functionally distinctive button associated with the card slot in which the card is inserted. The operator can also cause the system to generate, automatically and sequentially, unique audible information associated with the sensory-information representation provided on each inserted card and, depending on the type of cards installed, perform secondary functions as the individual cards are being accessed, such as, mathematical computations, pattern recognition, and spelling accuracy by pressing the visually and functionally distinctive button associated in an equal manner with all card slots, after which automatic tertiary functions take place such as the accuracy of the result of mathematical computations are accessed and an audible message is generated; an audible message equivalent to the combination of the installed cards is generated; and the accuracy of the spelling of words formed by individual cards is determined and an audible message is generated.

37 Claims, 12 Drawing Sheets

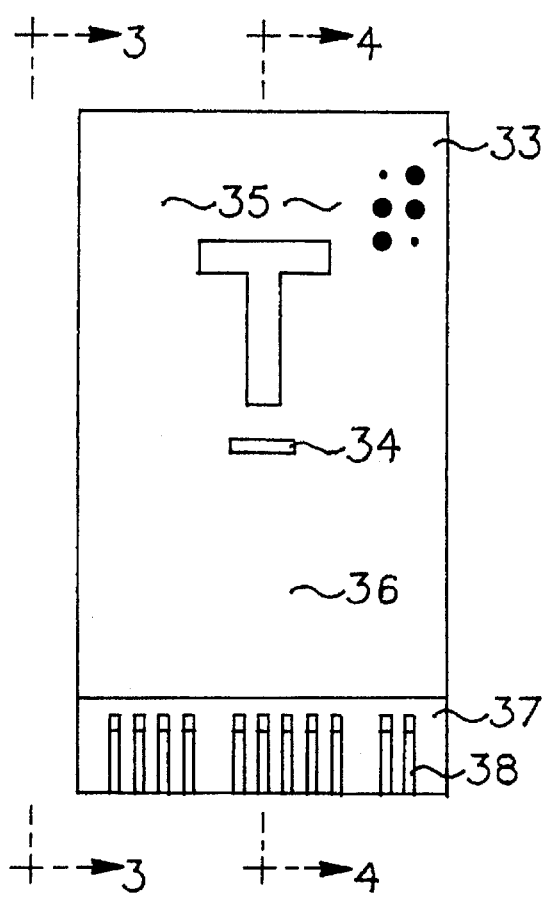
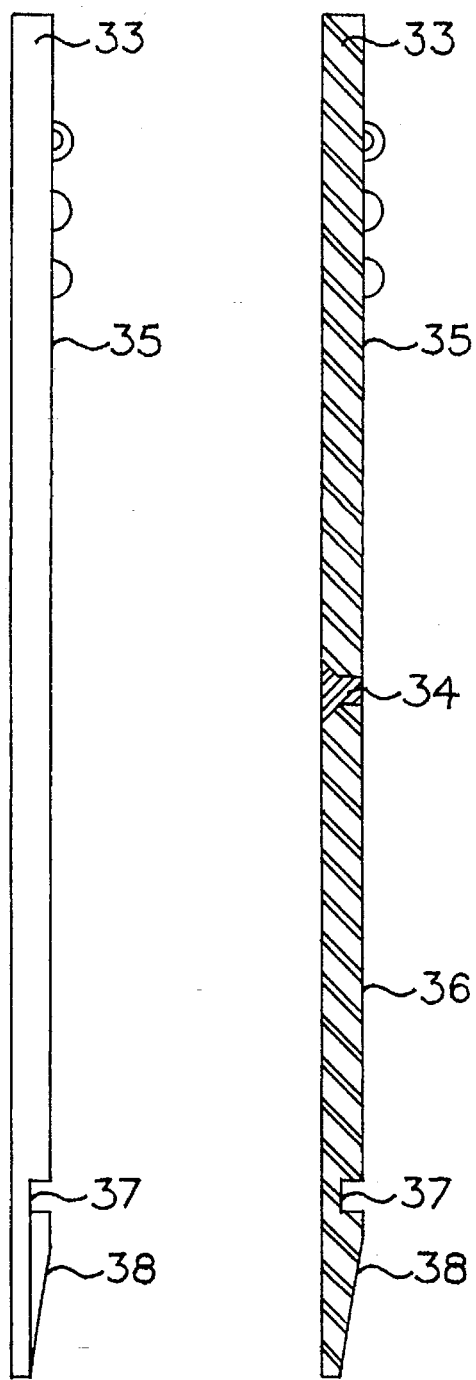
FIG. 2
FIG. 3　FIG. 4

CARD TYPE OF ELECTRONIC LEARNING AID/TEACHING APPARATUS

BACKGROUND OF THE INVENTION

1. Field of the Invention

This invention relates to electronic learning aids, flash-card training aids, and teaching devices. More specifically, this invention relates to a card type of electronic learning aid/teaching apparatus that includes a housing device and a plurality of uniquely coded cards, each having a surface on which a sensory-information representation in visual, tactile (including braille), and/or odorous form is provided to present pictorial symbol information and/or language-symbol information, to include imagery, alphabetic letters, phonemes, words, text, numerals, and/or arithmetical symbols. One or more coded cards are positionable on the housing device to enable the apparatus to generate unique audible information, such as vocal expression and/or nonvocal sound, associated with each coded card. The operator may cause the apparatus to generate the unique audible information of any selected coded card, or, starting with the leftmost coded card installed in the housing device, the operator can cause the apparatus to generate automatically, at a user adjustable rate, the unique audible information of all the coded cards sequentially. In addition, a means is provided for performing arithmetic operations on coded cards and generating audible results. A means is also provided for generating the corresponding audible equivalent of an arrangement of coded cards. A means is also provided to illuminate the sensory-information representation while the unique audible information associated with the coded card is being generated by the apparatus. A means is also provided for expanding the learning aid/teaching apparatus by increasing the total coded-card capacity. In addition, a means is also provided for increasing the amount of individual segments of unique audible information that may be accessed at a given time. An additional means is provided whereby a programming circuit is attached to the apparatus to allow the programming of selected coded cards.

2. Description of the Prior Art

Flash-card training aids are known in the prior art. One example of such prior art is disclosed in U.S. Pat. No. 5,040,987, entitled "Educational Aid for Word and Numeral Recognition," issued Aug. 20, 1991. Flash-card training aids are in common use in the education and the rehabilitation environments. An example of this is the Phonics Made Easy flash cards manufactured by School Zone® Publishing Company of Grand Haven, Mich. The types of flash cards mentioned above necessitate a supervisory person, who must provide information regarding the content of the card to the student/patient whenever required. In effect, the student/patient cannot use the cards alone and unsupervised.

Also, electronic learning aids that include the use of a card are known in the prior art. Examples include Time . . . To Go!™, Math . . . To Go !™, Words . . . To Go!™, Touch & Discover™, and Touch & Tell™, manufactured by Texas Instruments, Incorporated, of Dallas, Tex., as well as LITTLE TALKING SCHOLAR™ and FLASHCARDS™ by Video Technology Industries, Incorporated, of Wheeling, Ill. Each of the above-mentioned products is intended primarily for single-user operation and can accommodate only one card at a time, thus restricting the creativity and imagination of the operator by preventing multi-user interaction and the combination of card information. The Touch & Discover™, Touch & Tell™, and LITTLE TALKING SCHOLAR™ products offer expansion packs that provide additional activities and cards. Only one expansion pack can be installed at any one time, and when it is installed, the original, built-in activities of the product are disabled, preventing the combination of new and old activities and card information. In addition, the interword time of the internal speech synthesizers in these products is not adjustable, causing word-recognition problems for young or aphasic persons. Also, the Time . . . To Go!™, Math . . . To Go!™, Words . . . To Go!™, and FLASHCARDS™ products provide audible information in tone form only, a liquid-crystal display being the primary information output to the user. Liquid-crystal displays have a narrow field of view and are made small for economic reasons. The primary disadvantage of liquid-crystal-display-type products when used by young or aphasic persons is the poor reproduction of letters by the liquid-crystal display, as compared with letters, both uppercase and lowercase, found in printed material. This poor reproduction might confuse young or aphasic persons. Also, in the LITTLE TALKING SCHOLAR™, there is no apparent functional connection between the single card and a group of associated buttons. The card and the buttons are physically separated, as well as being on two different planes. This separation may cause confusion for young or aphasic users. The Talk Back™ III, manufactured by the Crestwood Company of Milwaukee, Wis., is a device that combines multiple cards with a housing device containing an addressable voice-storage means. To operate, the user presses one of three buttons located on the housing device, and a voice message is generated. A major disadvantage of this product is that the recorded voice message will be generated when the button is pressed, even if the wrong card or no card is installed—the device has no circuit means of card detection; thus, the device necessitates the presence of a supervisory person at all times. Another disadvantage of the product is its inability to generate the voice message sequentially from the three addresses of the voice-storage means automatically; this prevents the combination of card information. Still another disadvantage of the product is the inability to adjust the interword time of the voice message, which may be necessary for young or aphasic users as an aid in word recognition.

U.S. Pat. No. 4,403,965, entitled "Electronic Teaching Apparatus," issued Sep. 13, 1983, discloses a teaching apparatus combining interchangeable, flexible overlays containing multiple printed pictorial representations in unification with a keyboard under programmed control. To operate, the user presses the appropriate pictorial representation, closing the appropriate overlaid switch contact on the keyboard, in response to synthesized verbal prompts from the apparatus. The major disadvantage of this apparatus is an inability to tailor the operation of the apparatus to the specific needs or wishes of the user. Another disadvantage of this apparatus is its inability to operate with multiple overlays at the same time, which prevents the combining of overlay information. Another disadvantage of this apparatus is that the overlays can only be used with the apparatus and are not self-contained items to be used independently. Young and aphasic users might become confused if they attempt to use the cards in a traditional flash-card application because of the unfamiliar appearance and shape. Still another disadvantage of this apparatus is the inability to adjust the interword time of the synthesizer, which may be necessary for young or aphasic users as an aid in word recognition.

U.S. Pat. No. 4,729,564, entitled "Card Reading Responsive Electronic Game," issued Mar. 8, 1988, discloses an electronic game in combination with cards depicting printed number, size, color, and shape represented by a bar code. To operate, the user inserts a card into the device in response to synthesized voice instructions from the device. Responses to the user's card selection are indicated by the synthesized voice and liquid-crystal-display facial caricature generated by the apparatus. The major disadvantage of this device is the lack of ability to tailor the operation of the apparatus to the specific needs or wishes of the user. Another disadvantage of this apparatus is its inability to operate with multiple cards at the same time, which prevents the combination of card information. Another disadvantage of this device is that the cards can only be used with the apparatus and are not self-contained items to be used independently. Young and aphasic users might become confused if they attempt to use the cards in a traditional flash-card application because of the unfamiliar appearance and shape. Still another disadvantage of this device is the inability to adjust the interword time of the synthesizer, which may be necessary for young or aphasic users as an aid in word recognition.

U.S. Pat. No. 4,980,919, entitled "Message Card Type of Language Practising Set for Children," issued Dec. 25, 1990, discloses a language-practising apparatus combining a maximum of sixteen possible message cards with an addressable voice synthesizer. Before the apparatus can be operated, a pattern or picture must be drawn or attached to a message card and a supervisory person must install the message card into the apparatus and then record an equivalent voice message into the addressable voice synthesizer. To operate, the user inserts a message card into the apparatus and the voice equivalent of the meaning of the picture shown on the message card is immediately played. One of the major disadvantages of this apparatus is its inability to operate with multiple message cards at the same time, which prevents the combination of message-card information. Another major disadvantage of this apparatus becomes apparent when multiple words, patterns, and/or colors are shown on the message card, causing confusion to young or aphasic users when they try to link a particular equivalent voice-message word to one of the multiple words, patterns, and/or colors on the message card. Still another major disadvantage of this apparatus is the need to remove and reinsert the message card whenever the user wishes to hear the equivalent voice message repeated. Because it is a practising device, the need to repeat the equivalent voice message many times is essential, but it makes the removal and reinsertion of the message card not only a distraction but difficult for young, aphasic, or physically disabled users. Another disadvantage of this apparatus is the external controls for recording the equivalent voice message, which can distract users; also, when unsupervised, the user might program over the equivalent voice message. Still another disadvantage of this apparatus is the inability to adjust the interword time of the synthesizer, which may be necessary for young or aphasic users as an aid in word recognition. Additional disadvantages of this apparatus are the combination of only sixteen addressable locations of the voice synthesizer and the fact that the quality of the equivalent voice message is not at the same level of a low-noise, correctly pronounced, studio recording, making the apparatus unacceptable for the education and rehabilitation environments.

U.S. Pat. No. 5,188,533, entitled "Speech Synthesizing Indicia for Interactive Learning," issued Feb. 23, 1993, discloses an interactive learning device in the form of a three-dimensional, indicium-bearing unit in the physical shape of a letter or number. To operate, the user touches the top surface of the indicium, activating the internal voice-synthesis circuitry to produce the name or phonetic sounds of the indicium audibly. A major disadvantage of this device is its inability to generate the name or phonetic sounds of multiple indicia without the user's pressing each individual indicium. Sequentially pressing multiple indicia may result in the name or phonetic sounds of two or more indicia being heard simultaneously, confusing the user. Another major disadvantage of this device is apparent when young or aphasic users attempt to position lowercase letters such as "b," "d," "p," and "q" physically. To young or aphasic users, these indicia are unfamiliar objects with no apparent orientation, and the likelihood, for example, of a user's handling the indicium for the letter "b" but orienting it as a "d," "p," or "q" is strong. Another disadvantage of the device is that the user must cover part of the indicium to be able to hear the name or phonetic sounds and may inadvertently cover all of the indicium; thus, the relationship between the letters or numbers represented by the indicia and the sounds associated with those symbols may be a confused one. Still another disadvantage of the device is the need for a supervisory person to be present when two or more indicia are being operated by the user, to prevent multiple indicia from being pressed simultaneously, causing the sound of two or more indicia to be heard at the same time.

Other patents describing learning aids that combine the use of cards include U.S. Pat. No. 4,403,966, entitled "Children Conductive Intelligence Autosuggestive Machine"; U.S. Pat. No. 4,358,278, entitled "Learning and Matching Apparatus and Method"; and U.S. Pat. No. 4,505,682, entitled "Learning Aid with Match and Compare Mode of Operation."

Thus, there exists a need for an improved, card-type, electronic learning aid/teaching apparatus.

SUMMARY OF THE INVENTION

The present invention provides an educational device in the form of a card type of electronic learning aid/teaching apparatus. It is intended for use by a variety of people, including but not limited to preschool, primary-school, visually impaired, hearing-impaired, and/or aphasic persons learning or relearning skills, including but not limited to basic arithmetic, recognition and pronunciation of letters, numbers, or words, sentence structure, and recognition of sounds, colors, shapes, textures, braille, and/or odors; persons (adults or children) learning a foreign language or English as a second language; and preschool children learning basic information such as their name spelling, telephone number, home address, and other emergency information. The electronic learning aid/teaching apparatus of this invention includes a housing that can accommodate up to eight (8) interchangeable, individually coded cards, each coded card having a surface on which a sensory-information representation in visual, tactile (including braille), and/or odorous form is provided to present pictorial-symbol information and/or language-symbol information, to include imagery, alphabetic letters, phonemes, words, text, numerals, and/or arithmetical symbols. The housing is made up of eight (8) card slots, each card slot having a visually and functionally associated button and light-emitting diode. The housing also contains one (1) button visually and functionally associated in an equal manner with all of the card slots. To operate, the user installs up to eight (8) of the individually coded cards into the card slots of the housing. To cause the apparatus to generate unique audible information, such as vocal expression and/or nonvocal sound, associated with a particular installed coded card, the operator presses the visually and functionally distinctive button associated with the card slot in which the coded card is installed. To cause the apparatus to generate unique audible information, such as vocal expression and/or nonvocal sound, associated with all of the installed coded cards automatically and sequentially starting with the leftmost coded card, the operator presses the button that is associated in an equal manner with all of the card slots. No audible information is generated for those card slots that have no coded cards installed. A means is provided for performing arithmetical operations on selected coded cards and generating audible results. Further, a means is provided for generating the corresponding audible equivalent of an arrangement of selected coded cards. In addition, a means is provided to illuminate the sensory-information representation while the unique audible information associated with the coded card is being generated by the apparatus, thus forming a link between the audible information and the sensory-information representation in visual, tactile (including braille), and/or odorous form provided on the surface of the coded card. This link becomes particularly important when multiple coded cards are installed in the housing for uses such as learning and relearning sentence structure, spelling, and arithmetic. A means is also provided for serially adding more learning-aid/teaching-apparatus housings, thereby increasing the total card-slot capacity in multiples of eight (8). This increase becomes important when the user is spelling words or constructing sentences for which more than eight (8) coded cards are required.

One of the objects of the present invention is to provide an improved card-type electronic learning aid/teaching apparatus consisting of a plurality of uniquely coded cards, each having a surface on which a sensory-information representation in visual, tactile (including braille), and/or odorous form is provided to present pictorial-symbol information and/or language-symbol information, to include imagery, alphabetic letters, phonemes, words, text, numerals, and/or arithmetical symbols in the familiar flash-card shape. This will prevent confusion of young, aphasic, visually impaired or hearing-impaired users and allow the use of the coded cards independent of the housing in a manner that is familiar to the user.

Another object of the present invention is to provide an improved card-type electronic learning aid/teaching apparatus that includes a housing device and a plurality of uniquely coded cards, each having a surface on which a sensory-information representation in visual, tactile (including braille), and/or odorous form is provided to present pictorial-symbol information and/or language-symbol information, to include imagery, alphabetic letters, phonemes, words, text, numerals, and/or arithmetical symbols, wherein the operator may cause the apparatus to generate the unique audible information, such as vocal expression and/or nonvocal sound, of any coded card by pressing a visually and functionally apparent button associated with the card slot in which the coded card is installed.

Still another object of the present invention is to provide an improved card-type electronic learning aid/teaching apparatus that includes a housing device and a plurality of uniquely coded cards, each having a surface on which a sensory-information representation in visual, tactile (including braille), and/or odorous form is provided to present pictorial symbol-information and/or language-symbol information, to include imagery, alphabetic letters, phonemes, words, text, numerals, and/or arithmetical symbols, wherein the operator can cause the apparatus to generate automatically, starting with the leftmost coded card, the unique audible information, such as vocal expression and/or nonvocal sound, of all the coded cards sequentially, by pressing a button that is associated in an equal manner with all of the card slots.

Still another object of the present invention is to provide an improved card-type electronic learning aid/teaching apparatus that includes a housing device and a plurality of uniquely coded cards, each having a surface on which a sensory-information representation in visual, tactile (including braille), and/or odorous form is provided to present pictorial symbol-information and/or language-symbol information, to include imagery, alphabetic letters, phonemes, words, text, numerals, and/or arithmetical symbols, wherein the operator can cause the apparatus to generate automatically, starting with the leftmost coded card, the unique audible information, such as vocal expression and/or nonvocal sound, of all the coded cards sequentially, with an adjustable intercard time suitable to the needs of the operator, by pressing a button that is associated in an equal manner with all of the card slots.

Still another object of the present invention is to provide an improved card-type electronic learning aid/teaching apparatus that includes a housing device and a plurality of uniquely coded cards, each having a surface on which a sensory-information representation in visual, tactile (including braille), and/or odorous form is provided to present pictorial-symbol information and/or language-symbol information, to include imagery, alphabetic letters, phonemes, words, text, numerals, and/or arithmetical symbols, wherein the sensory-information representation is illuminated as its unique audible information is being generated by the apparatus, thus forming a link between the audible information and the sensory-information representation in visual, tactile (including braille), and/or odorous form provided on the surface of the coded card.

Still another object of the present invention is to provide an improved card-type electronic learning aid/teaching apparatus that includes a housing device and a plurality of uniquely coded cards, each having a surface on which a sensory-information representation in visual, tactile (including braille), and/or odorous form is provided to present pictorial-symbol information and/or language-symbol information, to include imagery, numerals, and/or arithmetical symbols, wherein arithmetical operations are performed on selected coded cards and audible information is provided concerning solutions and comments reflecting on the operator's response to the arithmetical problems created by the selected coded cards.

Still another object of the present invention is to provide an improved card-type electronic learning aid/teaching apparatus that includes a housing device and a plurality of uniquely coded cards, each having a surface on which a sensory-information representation in visual, tactile (including braille), and/or odorous form is provided to present pictorial-symbol information and/or language-symbol information representative of a phoneme, wherein phoneme-to-word-conversion operations are performed on selected coded cards and audible information, such as vocal expression, is provided corresponding to each coded card followed by audible information corresponding to a word or fraction thereof formed by the consecutive arrangement of the same group of coded cards.

Still another object of the present invention is to provide an improved card-type electronic learning aid/teaching apparatus that includes a housing device and a plurality of uniquely coded cards, each having a surface on which a sensory-information representation in visual, tactile (including braille), and/or odorous form is provided to present pictorial-symbol information and/or language-symbol information, to include imagery, alphabetic letters, phonemes, words, text, numerals, and/or arithmetical symbols, wherein the sensory information representation attached to the surface of the coded card and the unique audible information, such as vocal expression and/or nonvocal sound, associated with the coded card may be personalized, by a supervisory person, for a specific application and/or person, including but not limited to preschool, primary-school, visually impaired, hearing-impaired, and/or aphasic persons, to enhance the educational process.

Still another object of the present invention is to provide an improved card-type electronic learning aid/teaching apparatus that includes a housing device and a plurality of uniquely coded cards, each having a surface on which a sensory-information representation in visual, tactile (including braille), and/or odorous form is provided to present pictorial-symbol information and/or language-symbol information, to include imagery, alphabetic letters, phonemes, words, text, numerals, and/or arithmetical symbols, wherein one or more expansion packs, containing additional and associated uniquely coded cards, may be added to the apparatus to increase the combination of cards that can be installed at any one time to enhance the educational process further.

Still another object of the present invention is to provide an improved card-type electronic learning aid/teaching apparatus that includes a housing device and a plurality of uniquely coded cards, each having a surface on which a sensory-information representation in visual, tactile (including braille), and/or odorous form is provided to present pictorial-symbol information and/or language-symbol information, to include imagery, alphabetic letters, phonemes, words, text, numerals, and/or arithmetical symbols, wherein one or more expansion apparatuses, containing additional card slots, may be added to the apparatus to increase the overall total card-slot capacity. This increase, for example, allows the user to construct larger sentences and spell larger words, thereby enhancing the educational process further.

Still another object of the present invention is to provide an improved card-type electronic learning aid/teaching apparatus that includes a housing device and a plurality of uniquely coded cards, each having a surface on which a sensory-information representation in visual, tactile (including braille), and/or odorous form is provided to present pictorial-symbol information and/or language-symbol information, to include imagery, alphabetic letters, phonemes, words, text, numerals, and/or arithmetical symbols, having particular but not exclusive applicability, as a mainstreaming educational aid to visually impaired, hearing-impaired, and/ or aphasic users in the learning of braille and of object, texture, and odor identification.

Still another object of the present invention is to provide an improved card-type electronic learning aid/teaching apparatus that includes a housing device and a plurality of uniquely coded cards, each having a surface on which a sensory-information representation in visual, tactile (including braille), and/or odorous form is provided to present pictorial-symbol information and/or language-symbol information, to include imagery, alphabetic letters, phonemes, words, text, numerals, and/or arithmetical symbols, having particular applicability in the educational environment to facilitate teaching and learning for multiple users.

Still another object of the present invention is to provide an improved card-type electronic learning aid/teaching apparatus that includes a housing device and a plurality of uniquely coded cards, each having a surface on which a sensory-information representation in visual, tactile (including braille), and/or odorous form is provided to present pictorial-symbol information and/or language-symbol information, to include imagery, alphabetic letters, phonemes, words, text, numerals, and/or arithmetical symbols, the operation of which is apparent and simple to young and aphasic users.

This invention will be understood more fully from the following detailed description of the preferred embodiment taken in conjunction with the drawings.

BRIEF DESCRIPTION OF THE DRAWINGS

For a more thorough understanding of the present invention, as well as of preferred modes of operation and advantages thereof, reference is made to the detailed description of a preferred embodiment when read in conjunction with the accompanying drawings, wherein:

FIG. 2 is a plan view of a sample coded card of the preferred embodiment of the present invention;

FIG. 3 is a plan view, on an enlarged scale, taken on a plane passing along section line 3—3 on FIG. 2, illustrating further structural details of a sample coded card of the preferred embodiment of the present invention;

FIG. 4 is a sectional view, on an enlarged scale, taken on a plane passing along section line 4—4 on FIG. 2, illustrating still further structural details of a sample coded card of the preferred embodiment of the present invention;

DETAILED DESCRIPTION OF THE PREFERRED EMBODIMENT

Figure 1:
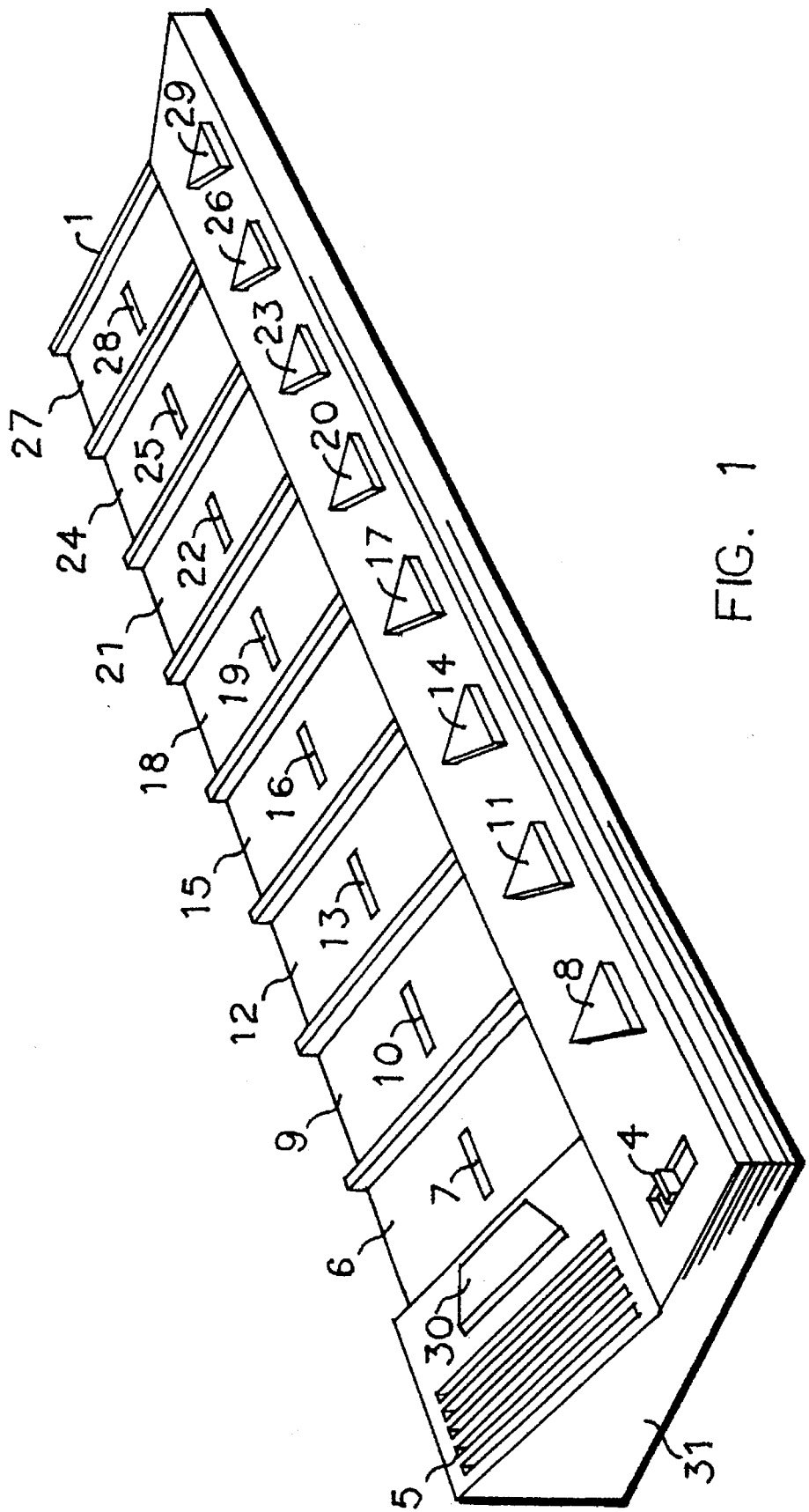
FIG. 1 is a front-perspective view of a card type of electronic learning aid/teaching apparatus in accordance with the present invention.

FIG. 1 is a front-perspective view of a card type of electronic learning aid/teaching apparatus of a type that embodies the present invention. The learning aid/teaching apparatus includes a housing device 1, which encloses the electronic circuitry preferably implemented through the use of integrated circuits (not shown in this figure), a speaker 2 (not shown in this figure), a keyboard 3 (not shown in this figure), and an on/off switch 4. The speaker opening 5 is shown, behind which the speaker 2 is mounted. In FIG. 1 are also shown, starting with the leftmost card slot, slot 1 6 with its associated slot-1 light-emitting diode 7 and slot-1 button S, slot 2 9 with its associated slot-2 light-emitting diode 10 and slot-2 button 11, slot 3 12 with its associated slot-3 light-emitting diode 13 and slot-3 button 14, slot 4 15 with its associated slot-4 light-emitting diode 16 and slot-4 button 17, slot 5 18 with its associated slot-5 light-emitting diode 19 and slot-5 button 20, slot 6 21 with its associated slot-6 light-emitting diode 22 and slot-6 button 23, slot 7 24 with its associated slot-7 light-emitting diode 25 and slot-7 button 26, and slot 8 27 with its associated slot-8 light-emitting diode 28 and slot-8 button 29. Also in FIG. 1 are shown the automatic button 30 and the removable left-end panel 31. The housing device 1 also contains the removable right-end panel 32 (not shown in this figure).

The housing device 1, left-end panel 31, and right-end panel 32 of the card type of electronic learning aid/teaching apparatus depicted in FIG. 1 are preferably made from an injection-molded plastic material, although other materials may be used. The apparatus may obtain power from either internal batteries or an external source of electricity.

The outward appearance of the card type of electronic learning aid/teaching apparatus having been described, the uniquely coded cards 33, the coding method of the uniquely coded cards 33, and the modes in which the card type of electronic learning aid/teaching apparatus operates will now be described, followed by a description of the various electronic circuits used to implement the card type of electronic learning aid/teaching apparatus of FIG. 1.

FIG. 2 is a plan view of a sample coded card 33 of the preferred embodiment of the invention. Each coded card 33 is identical in outline construction insofar as the shape is concerned and is in the general form of a rectangular panel preferably made from injection-molded plastic material, although other materials may be used. Each coded card 33 includes a light-emitting-diode focus lens 34; a sensory-information-representation area 35, on which sensory-information representations in visual, tactile (including braille), and/or odorous form are applied at the time of manufacture; a user-information area 36, where the user may, with a grease pencil, crayon, or the like, add useful information; and a code-key area 37, which is made up of individual coded keys 38 that form the unique code for each coded card 33. FIG. 2 shows eleven (11) coded keys 38 arranged in the form of a unique code representing the sensory information displayed on the surface of the coded card 33. In the preferred embodiment, each coded card 33 appears in the familiar flash-card shape, which allows their use as individual educational items independent of the housing device 1. For illustration purposes only, FIG. 2 shows a coded card 33 with the letter "T" represented in both visual and tactile form in the sensory-information-representation area 35. Coded cards 33 can be manufactured with any visual, tactile (including braille), and/or odorous representation in the sensory-information-representation area 35.

FIG. 3 is a plan view, on an enlarged scale, taken on a plane passing along section line 3—3 of FIG. 2, illustrating further structural details of a sample coded card 33 of the preferred embodiment of the present invention. FIG. 3 shows further detail of a coded key 38, in the form of an incline starting at the lower edge of the coded card 33, in the code-key area 37. For illustration purposes only, FIG. 3 shows the raised tactile dots of the braille sensory-information representation of the letter "T" in the sensory-information-representation area 35.

FIG. 4 is a sectional view, on an enlarged scale, taken on a plane passing along section line 4—4 of FIG. 2, illustrating still further structural details of a sample coded card 33 of the preferred embodiment of the present invention. FIG. 4 shows further detail of a coded key 38, in the form of an incline starting at the lower edge of the coded card 33, in the code-key area 37. Also shown in FIG. 4 is the light-emitting-diode focus lens 34. The light-emitting-diode focus lens 34 is made of clear material except for the external surface end on the sensory-information-representation area 35 and user-information area 36 side of the coded card 33, which is translucent. For illustration purposes only, FIG. 4 shows the raised tactile dots of the braille sensory-information representation of the letter "T" in the sensory-information-representation area 35.

Figure 5:
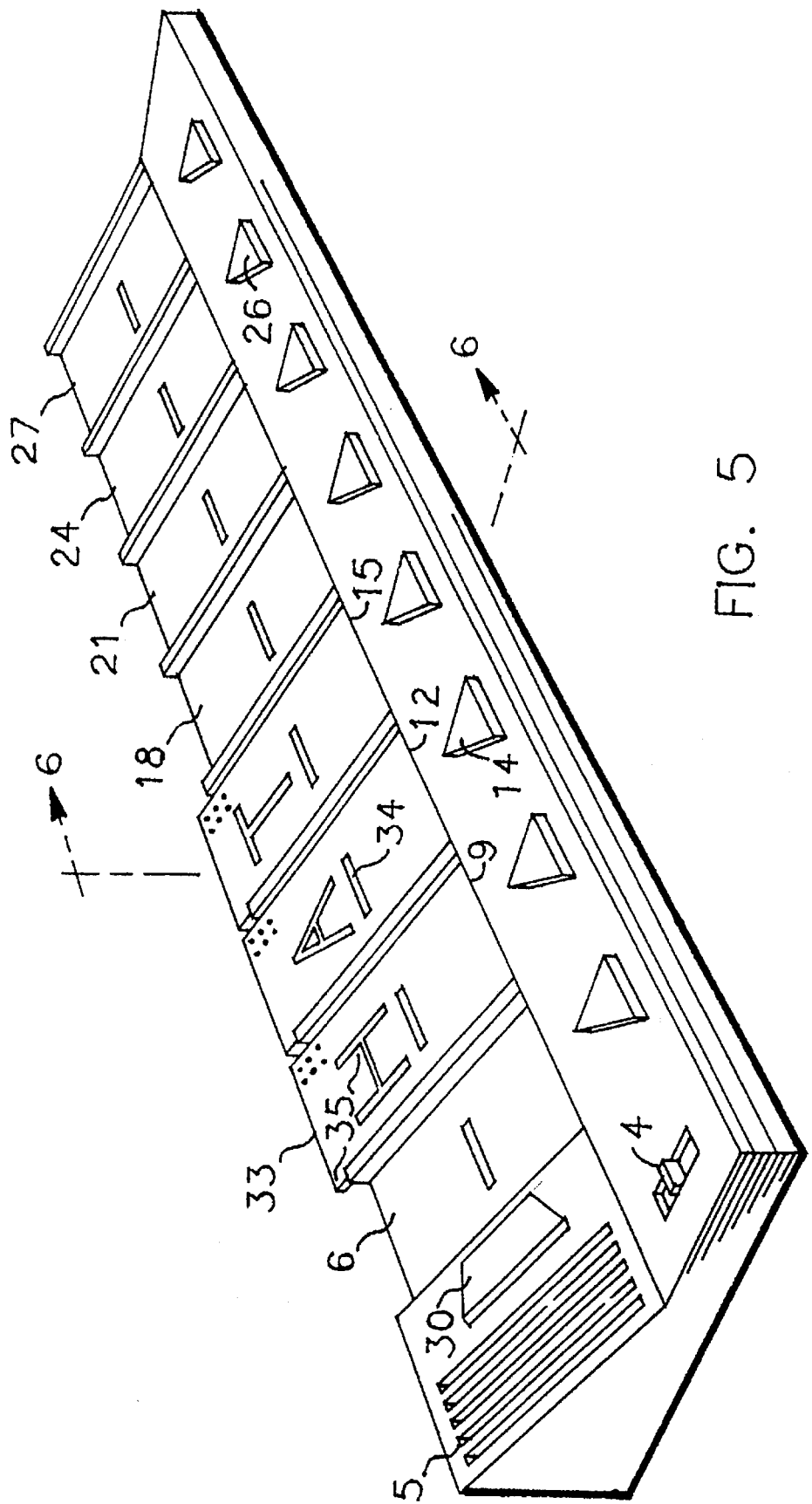
FIG. 5 is a front-perspective view of a card type of electronic learning aid/teaching apparatus in accordance with the present invention, showing three (3) coded cards installed, illustrating a typical application of the apparatus.

FIG. 5 is a front-perspective view of a card type of electronic learning aid/teaching apparatus in accordance with the present invention, showing three (3) coded cards 33 installed, illustrating a typical application of the apparatus. FIG. 5 shows the coded cards 33 installed in slot 2 9, slot 3 12, and slot 4 15. FIG. 5 also shows that there are no coded cards 33 installed in slot 1 6, slot 5 18, slot 6 21, slot 7 24, and slot 8 27. For illustration purposes only, FIG. 5 shows the coded card 33 installed in slot 2 9 with the letter "H" represented in both visual and tactile form in the sensory-information-representation area 35, the coded card 33 installed in slot 3 12 with the letter "A" represented in both visual and tactile form in the sensory-information-representation area 35, and the coded card 33 installed in slot 4 15 with the letter "T" represented in both visual and tactile form in the sensory-information-representation area 35. The installation of a coded card 33 is accomplished by sliding the desired coded card 33 into any available card slot.

MODES OF OPERATION (FIG. 5)

The card-type electronic learning aid/teaching apparatus of the present embodiment has two modes of operation, which will be described. It will be evident to those skilled in the art, however, that these modes of operation may be adjusted or expanded. As a matter of design choice, the card-type electronic learning aid/teaching apparatus of the present embodiment is provided with the following modes of operation:

The first mode, the single-card mode, may be accessed at any time after the apparatus has been energized by placing the on/off switch 4 in the "on" position. To cause the apparatus to generate unique audible information, such as vocal expression and/or nonvocal sound, associated with a particular installed coded card 33, having a surface on which a sensory-information representation is provided, the operator presses the visually and functionally distinctive button associated with the card slot in which the coded card 33 is installed. In the application depicted in FIG. 5, the operator can cause the apparatus to generate the unique audible information associated with the coded card 33, having a surface on which a sensory-information representation is provided, installed in slot 3 12 by pressing the slot-3 button 14. Once the slot-3 button 14 is pressed, the unique audible information associated with the coded card 33, having a surface on which a sensory-information representation is provided, installed in slot 3 12 is generated by the speaker 2 (not shown in this figure) through the speaker opening 5. Simultaneous to the speaker's 2 generating the unique audible information associated with the coded card 33, having a surface on which a sensory-information representation is provided, installed in slot 3 12, the slot-3 light-emitting diode 13 (not shown in this figure) is energized and transmits its light energy into the light-emitting-diode focus lens 34 of the coded card 33, having a surface on which a sensory-information representation is provided, installed in slot 3 12. It will be evident to those skilled in the art that the unique audible information associated with the coded card 33, having a surface on which a sensory-information representation is provided, installed in slot 3 12 can take many forms, including but not limited to the phoneme for the letter "A"; the pronunciation, in any spoken language, of the letter "A"; a group of words, in any audible language; and/or any nonvocal sound.

This process of pressing the visually and functionally distinctive buttons associated with the card slots in which coded cards 33 are installed can be repeated as often as and in any order the operator desires.

The second mode, the automatic mode, may also be accessed at any time after the apparatus has been energized by placing the on/off switch 4 in the "on" position. In the application depicted in FIG. 5, the operator can cause the apparatus to generate unique audible information, such as vocal expression and/or nonvocal sound, associated with all of the installed coded cards 33, each having a surface on which a sensory-information representation is provided, automatically and sequentially starting with the leftmost coded card 33, by pressing the automatic button 30. Once the automatic button 30 is pressed, the unique audible information associated with the coded card 33, having a surface on which a sensory-information representation is provided, installed in slot 2 9 is generated by the speaker 2 (not shown in this figure) through the speaker opening 5. Simultaneous to the speaker's 2 generating the unique audible information associated with the coded card 33, having a surface on which a sensory-information representation is provided, installed in slot 2 9, the slot-2 light-emitting diode 10 (not shown in this figure) is energized and transmits its light energy into the light-emitting-diode focus lens 34 of the coded card 33, having a surface on which a sensory-information representation is provided, installed in slot 2 9. After an intercard time selected by using the intercard-time control 39 (not shown in this figure) has elapsed, the unique audible information associated with the coded card 33, having a surface on which a sensory-information representation is provided, installed in slot 3 12 is generated by the speaker 2 through the speaker opening 5. Simultaneous to the speaker's 2 generating the unique audible information associated with the coded card 33, having a surface on which a sensory-information representation is provided, installed in slot 3 12, the slot-3 light-emitting diode 13 (not shown in this figure) is energized and transmits its light energy into the light-emitting-diode focus lens 34 of the coded card 33, having a surface on which a sensory-information representation is provided, installed in slot 3 12. Again, after an intercard time selected by using the intercard-time control 39 has elapsed, the unique audible information associated with the coded card 33, having a surface on which a sensory-information representation is provided, installed in slot 4 15 is generated by the speaker 2 through the speaker opening 5. Simultaneous to the speaker's 2 generating the unique audible information associated with the coded card 33, having a surface on which a sensory-information representation is provided, installed in slot 4 15, the slot-4 light-emitting diode 16 (not shown in this figure) is energized and transmits its light energy into the light-emitting-diode focus lens 34 of the coded card 33, having a surface on which a sensory-information representation is provided, installed in slot 4 15. It will be evident to those skilled in the art that the unique audible information associated with the coded cards 33, each having a surface on which a sensory-information representation is provided, installed in slot 2 9, slot 3 12, and slot 4 15 can take many forms, including but not limited to the phoneme for a letter; the pronunciation, in any spoken language, of a letter or word; a group of words, in any spoken language; and/or any nonvocal sound.

This process of pressing the automatic button 30 to cause the apparatus to generate unique audible information, such as vocal expression and/or nonvocal sound, associated with all of the installed coded cards 33, each having a surface on which a sensory-information representation is provided, automatically and sequentially starting with the leftmost coded card 33, can be repeated as often as the operator desires.

The operator may switch from the single-card mode to the automatic mode and vice versa as often as is wished by simply pressing the appropriate button.

Figure 6:
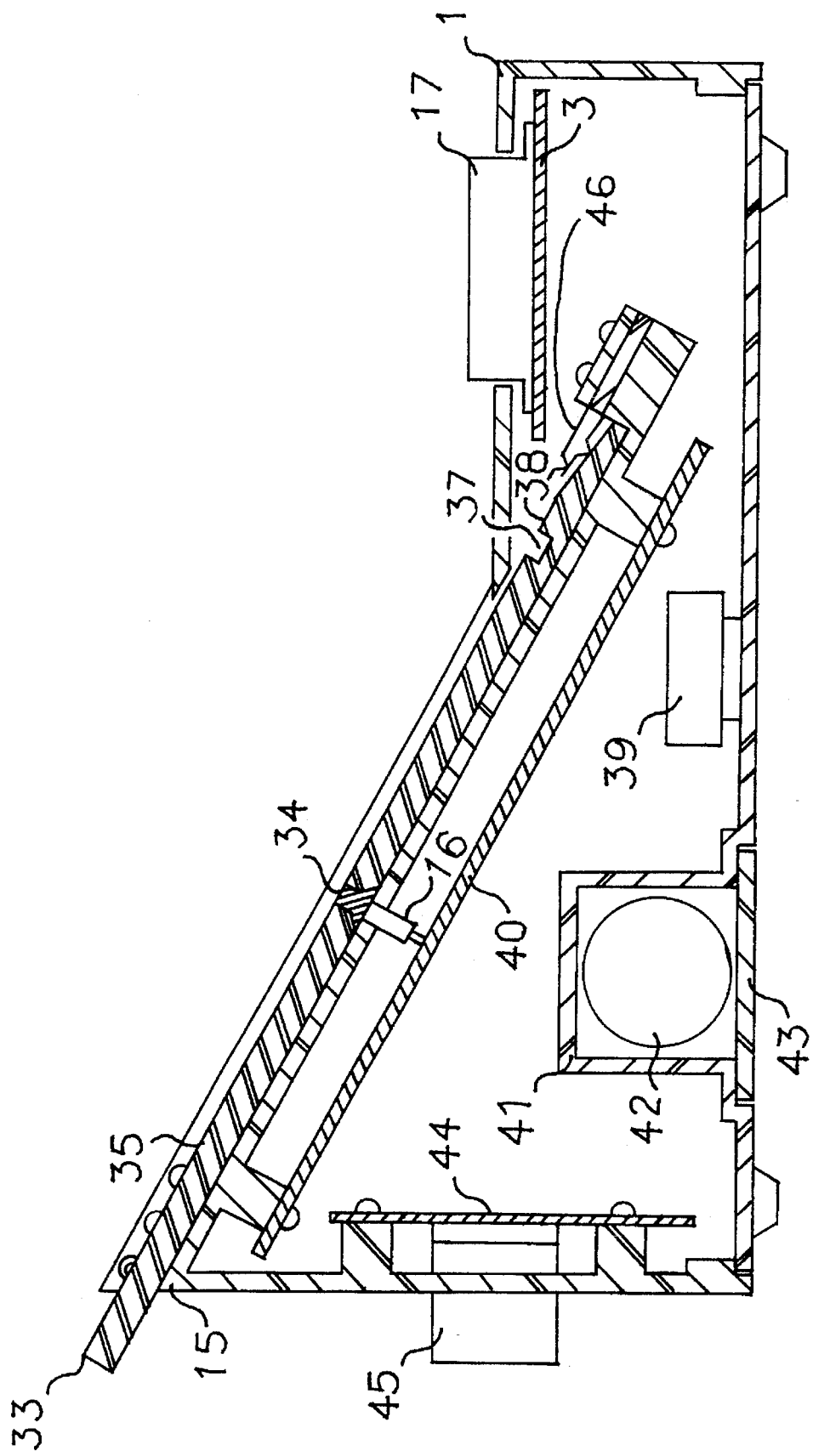
FIG. 6 is a sectional view, on an enlarged scale, taken on a plane passing along section line 6—6 on FIG. 5, illustrating internal structural details of a card type of electronic learning aid/teaching apparatus and coded card in accordance with the present invention.

FIG. 6 is a sectional view, on an enlarged scale, taken on a plane passing along section line 6—6 of FIG. 5, illustrating internal structural details of a card type of electronic learning aid/teaching apparatus in combination with a coded card 33 in accordance with the present invention. FIG. 6 shows the coded card 33 installed in slot 4 15 of the housing device 1. For illustration purposes only, FIG. 5 and FIG. 6 show the coded card 33 installed in slot 4 15 with the letter "T" represented in both visual and tactile form in the sensory information representation area 35. FIG. 6 also shows the slot-4 button 17 in conjunction with the keyboard 3; the slot-4 light-emitting diode 16, mounted on the main printed-circuit board 40, which is aligned with the light-emitting-diode focus lens 34 of the installed coded card 33; the battery housing 41, containing batteries 42 that are accessible through the battery door 43; the expansion-pack printed-circuit board 44 with an attached expansion-pack synthesizer 45; the intercard-time control 39; and the slot-4 coded-key switch assembly 46. One contact pair in the slot-4 coded-key switch assembly 46, in this illustration, is shown closed because of the presence of a coded key 38 in the code-key area 37 of the installed coded card 33. For each card slot of the housing device 1, there are a total of thirteen (13) individual contact pairs that make up the coded-key switch assembly 46. The arrangement of the coded keys 38 in the code-key area 37 of the installed coded card 33 determines which contact pairs of the coded-key switch assembly remain open and which contact pairs become closed.

BLOCK DIAGRAM (FIG. 7)

Figure 7:
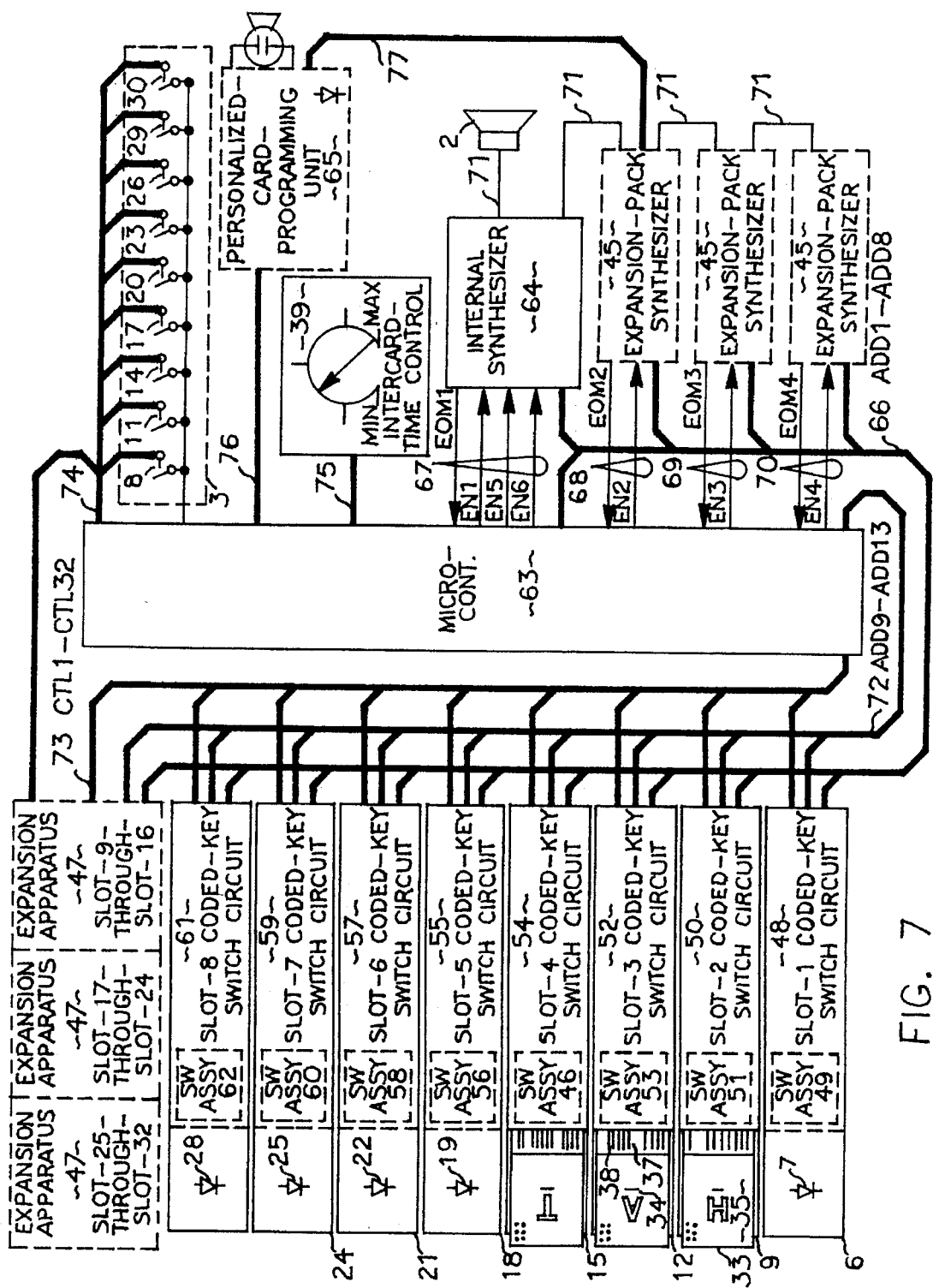
FIG. 7 is a block diagram of the major components of a card type of electronic learning aid/teaching apparatus in accordance with the present invention.

FIG. 7 is a block diagram of the preferred embodiment of the card type of electronic learning aid/teaching apparatus, illustrating the major components, the installation of a coded card 33 in slot 2 9, slot 3 12, and slot 4 15, and the functional arrangement of optional expansion-pack synthesizers 45 and optional expansion apparatuses 47. The components illustrated in FIG. 7 include slot-1 coded-key switch circuit 48, which is composed of slot-1 light-emitting diode 7 and slot-1 coded-key switch assembly 49, slot-2 coded-key switch circuit 50, which is composed of slot-2 light-emitting diode 10 (not shown in this figure) and slot-2 coded-key switch assembly 51, slot-3 coded-key switch circuit 52, which is composed of slot-3 light-emitting diode 13 (not shown in this figure) and slot-3 coded-key switch assembly 53, slot-4 coded-key switch circuit 54, which is composed of slot-4 light-emitting diode 16 (not shown in this figure) and slot-4 coded-key switch assembly 46, slot-5 coded-key switch circuit 55, which is composed of slot-5 light-emitting diode 19 and slot-5 coded-key switch assembly 56, slot-6 coded-key switch circuit 57, which is composed of slot-6 light-emitting diode 22 and slot-6 coded-key switch assembly 58, slot-7 coded-key switch circuit 59, which is composed of slot-7 light-emitting diode 25 and slot-7 coded-key switch assembly 60, and slot-8 coded-key switch circuit 61, which is composed of slot-8 light-emitting diode 28 and slot-8 coded-key switch assembly 62. Additional components illustrated in FIG. 7 include a microcontroller 63, which is preferably implemented on a single-chip integrated circuit containing a read-only memory (ROM) that contains the basic control program, a random-access memory (RAM) for temporary data storage, input/output (I/O) circuits for allowing electrical connection to external circuits, and a central processing unit (CPU). Microcontrollers and their function are known by the public at large and are not part of the present invention. Therefore, in the functional descriptions of the present invention, the internal operation of the microcontroller 63 will not be described in detail. Additional components illustrated in FIG. 7 include an internal synthesizer 64, three (3) optional expansion-pack synthesizers 45, the speaker 2, the intercard-time control 39, the keyboard 3, an optional personalized-card-programming unit 65, and three (3) optional expansion apparatuses 47. Both the internal synthesizer 64 and the optional expansion-pack synthesizers 45 contain internal audio amplifiers and addressable nonvolatile memories in which audio information unique to a functional group of coded cards 33, each having a surface on which a sensory-information representation is provided, is stored and may be converted to an electrical signal that drives the speaker 2. The keyboard 3 contains the switch contacts for the automatic button 30, slot-1 button 8, slot-2 button 11, slot-3 button 14, slot-4 button 17, slot-5 button 20, slot-6 button 23, slot-7 button 26, and slot-8 button 29. Each optional expansion apparatus 47 contains eight (8) coded-key switch circuits and a keyboard that are arranged and that function identically to the coded-key switch circuits 48, 50, 52, 54, 55, 57, 59, and 61 and keyboard 3 of the apparatus. The function of the optional expansion apparatuses 47 is to provide additional card slots, in multiples of eight (8), thereby increasing the total card capacity of the apparatus. With the on/off switch 4 (not shown in this figure) in the "off" position, the optional slot-9-through-slot-16 expansion apparatus 47 may be installed by removing the right-end panel 32 (not shown in this figure) from the housing device 1 (not shown in this figure) and then inserting the expansion apparatus 47 in its place. To install the optional slot-17-through-slot-24 expansion apparatus 47, the user removes the right-end panel of the slot-9-through-slot-16 expansion apparatus 47 and inserts the slot-17-through-slot-24 expansion apparatus 47 in its place, and so on.

It should be remembered that the number of card slots per card-type electronic learning aid/teaching apparatus, the number of optional expansion-pack synthesizers 45, the number of optional expansion apparatuses 47, and the number of card slots per expansion apparatus 47 are strictly a design choice and can be adjusted as application needs change without changing the overall intent of the invention. It should also be remembered that the decision to use the microcontroller 63 instead of discrete electronic parts or logic-integrated-circuit chips is strictly a design choice.

The internal synthesizer 64 and the optional expansion-pack synthesizers 45 are interconnected with the microcontroller 63, the coded-key switch circuits of the apparatus 48, 50, 52, 54, 55, 57, 59, and 61, and the coded-key switch circuits of the optional expansion apparatuses 47 via a data path 66. The internal synthesizer 64 is also connected to the microcontroller 63 via a control path 67. Each optional expansion-pack synthesizer 45 is also connected to the microcontroller 63 via a control path 68, 69, and 70. The internal synthesizer 64 and the optional expansion-pack synthesizers 45 share a common audio path 71 for making electrical connection to the speaker 2. The microcontroller 63 is interconnected with the coded-key switch circuits of the apparatus 48, 50, 52, 54, 55, 57, 59, and 61 and the coded-key switch circuits located in the optional expansion apparatuses 47 via a data path 72. The microcontroller 63 is also interconnected with the coded-key switch circuits of the apparatus 48, 50, 52, 54, 55, 57, 59, and 61 and the coded-key switch circuits located in the optional expansion apparatuses 47 via a control path 73. The microcontroller 63 is connected to the keyboard of the apparatus 3 and the keyboards in the optional expansion apparatuses 47 via a scan path 74. The microcontroller 63 is connected to the intercard-time control 39 via a data path 75. The microcontroller 63 is also connected to the optional personalized-card-programming unit 65 via a programming-control path 76. The optional personalized-card-programming unit 65 is connected via the programming data path 77 to the expansion-pack synthesizer 45, which is connected to the microcontroller 63 via a control path 68.

When the on/off switch 4 is moved from the "off" position to the "on" position, the microcontroller 63 accesses the power-up program in its internal ROM. One of the functions of the power-up program is to determine which internal synthesizer 64 is installed and which, if any, of the variety of optional external-pack synthesizers 45 are installed. The microcontroller 63 stores in its internal RAM a five (5)-bit code, which is unique to each type of synthesizer that may be used, representing each synthesizer detected.

SINGLE-CARD MODE OF OPERATION (FIGS. 5 AND 7)

The single-card mode of operation may be accessed at any time after the apparatus has been energized by placing the on/off switch 4 into the "on" position. To cause the apparatus to generate unique audible information, such as vocal expression and/or nonvocal sound, associated with a particular installed coded card 33, having a surface on which a sensory-information representation is provided, the operator presses the visually and functionally distinctive button associated with the card slot in which the coded card 33 is installed. Using the application depicted in FIG. 5 and in the block diagram in FIG. 7, the operator can cause the apparatus to generate the unique audible information associated with the coded card 33, having a surface on which a sensory-information representation is provided, installed in slot 3 12 by pressing the slot-3 button 14. Once the depression of the slot-3 button 14 is detected by the microcontroller 63 via the scan-path 74 interconnection, the microcontroller 63 activates control line CTL3, which is part of the control path 73 that connects the microcontroller 63 and the slot-3 coded-key switch circuit 52, and will not respond to any further keyboard 3-button presses. The activation of the control line (CTL3) connected to the slot-3 coded-key switch circuit 52 causes the slot-3 light-emitting diode 13 (not shown in these figures) to energize and transmit its light energy into the light-emitting-diode focus lens 34 of the coded card 33, having a surface on which a sensory-information representation is provided, installed in slot 3 12. The activation of the control line (CTL3) connected to the slot-3 coded-key switch circuit 52 also causes the slot-3 coded-key switch assembly 53 to generate a thirteen (13)-bit code onto the data paths 66 and 72. The content of the thirteen (13)-bit code is determined by the positions of the contact pairs of the slot-3 coded-key switch assembly 53, which result from the arrangement of the coded keys 38 in the code-key area 37 of the coded card 33 installed in slot 3 12. Eight (8) bits (ADD1–ADD8) of the thirteen (13)-bit code are transmitted via the data-path 66 interconnection to the internal synthesizer 64 and to any optional expansion-pack synthesizers 45 that may be installed in the apparatus. This eight (8)-bit code (ADD1–ADD8) is the address location within the synthesizer's nonvolatile memory where unique audible information associated with the coded card 33, having a surface on which a sensory-information representation is provided, installed in slot 3 12 is stored. The remaining five (5) bits (ADD9–ADD13) of the thirteen (13)-bit code are transmitted via the data-path 72 interconnection to the microcontroller 63. This five (5)-bit code (ADD9–ADD13) is compared by the microcontroller 63 to the five (5)-bit codes stored in the internal RAM during the power-up program. If a match is found between the ADD9–ADD13 code and any of the five (5)-bit codes stored in the internal RAM, the microcontroller 63 will enable the synthesizer defined by the five (5)-bit code via control paths EN1–EN4 67 to 70. Once enabled, the synthesizer will access from its nonvolatile memory, and generate through the speaker 2 via the common audio-path 71 interconnection, the unique audible information associated with the coded card 33, having a surface on which a sensory-information representation is provided, installed in slot 3 12, the location within the nonvolatile memory being defined by the ADD1–ADD8 code. When the synthesizer has completed the generation of the unique audible information associated with the coded card 33, having a surface on which a sensory-information representation is provided, installed in slot 3 12, an end-of-message signal is generated by the enabled synthesizer over the control path (EOM1–EOM4 67 to 70) to the microcontroller 63. The microcontroller 63 then deactivates control line CTL3, which is part of the control path 73 that connects the microcontroller 63 and the slot-3 coded-key switch circuit 52, and will now respond to any additional keyboard 3-button presses. The deactivation of the control line (CTL3) connected to the slot-3 coded-key switch circuit 52 causes the slot-3 light-emitting diode 13 to de-energize, ending transmission of its light energy into the light-emitting-diode focus lens 34 of the coded card 33, having a surface on which a sensory-information representation is provided, installed in slot 3 12. The deactivation of the control line (CTL3) connected to the slot-3 coded-key switch circuit 52 also disables the slot-3 coded-key switch assembly 53. It will be evident to those skilled in the art that the unique audible information associated with the coded card 33, having a surface on which a sensory-information representation is provided, installed in slot 3 12 can take many forms, including but not limited to the phoneme for the letter "A"; the pronunciation, in any spoken language, of the letter "A"; a group of words, in any audible language, and/or any nonvocal sound.

If a match cannot be found between the ADD9–ADD13 code and any of the five (5)-bit codes stored in the microcontroller's 63 internal RAM, the microcontroller 63 enables the internal synthesizer 64, via the control path EN1/EN5 67. The enabling of both the EN1 and EN5 control lines to the internal synthesizer 64 causes it to ignore the ADD1–ADD8 address code on the data path 66 and instead access from its nonvolatile memory, and generate through the speaker 2 via the common audio-path 71 interconnection, audible information indicating that the synthesizer that contains the unique audible information associated with the coded card 33, having a surface on which a sensory-information representation is provided, installed in slot 3 12 is not installed in the apparatus at the present time. When the internal synthesizer 64 has completed the generation of audible information indicating that the synthesizer that contains the unique audible information associated with the coded card 33, having a surface on which a sensory-information representation is provided, installed in slot 3 12 is not installed in the apparatus at the present time, an end-of-message signal is generated by the internal synthesizer 64 over control path EOM1 67 to the microcontroller 63. The microcontroller 63 then deactivates control line CTL3, which is part of the control path 73 that connects the microcontroller 63 and the slot-3 coded-key switch circuit 52, and will now respond to any additional keyboard 3-button presses. The deactivation of the control line (CTL3) connected to the slot-3 coded-key switch circuit 52 causes the slot-3 light-emitting diode 13 to de-energize, ending transmission of its light energy into the light-emitting-diode focus lens 34 of the coded card 33, having a surface on which a sensory-information representation is provided, installed in slot 3 12. The deactivation of the control line (CTL3) connected to the slot-3 coded-key switch circuit 52 also disables the slot-3 coded-key switch assembly 53.

If the operator presses a visually and functionally distinctive button associated with a card slot in which no coded card 33 is installed, the apparatus will generate no audible information. Per the application depicted in FIG. 5 and the block diagram depicted in FIG. 7, the following will occur if the operator, for example, presses the slot-7 button 26: Once the depression of the slot-7 button 26 is detected by the microcontroller 63 via the scan-path 74 interconnection, the microcontroller 63 activates control line CTL7, which is part of the control path 73 that connects the microcontroller 63 and the slot-7 coded-key switch circuit 59, and will not respond to any further keyboard 3-button presses. The activation of the control line (CTL7) connected to the slot-7 coded-key switch circuit 59 causes the slot-7 coded-key switch assembly 60 to generate a thirteen (13)-bit code onto the data paths 66 and 72. Because there is no coded card 33 installed in slot 7 24, all of the contact pairs of the slot-7 coded-key switch assembly 60 are in the open position, causing the content of the thirteen (13)-bit code to be 0000000000000. The microcontroller 63 is programmed to respond to 0000000000000 on the ADD1–ADD8 data path 66 and ADD9–ADD13 data path 72 as a no-coded-card 33-installed indication. Therefore, the microcontroller 63 does not enable any of the synthesizers and, consequently, no audible information is generated by the speaker 2. Upon detecting that there is no coded card 33 installed in slot 7 24, the microcontroller 63 deactivates control line CTL7, which is part of the control path 73 that connects the microcontroller 63 and the slot-7 coded-key switch circuit 59, and will now respond to any additional keyboard 3-button presses. The deactivation of the control line (CTL7) connected to the slot-7 coded-key switch circuit 59 disables the slot-7 coded-key switch assembly 60.

AUTOMATIC MODE OF OPERATION (FIGS. 5 AND 7)

The automatic mode of operation may be accessed at any time after the apparatus has been energized by placing the on/off switch 4 into the "on" position. To cause the apparatus to generate unique audible information, such as vocal expression and/or nonvocal sound, associated with all of the installed coded cards 33, each having a surface on which a sensory-information representation is provided, automatically and sequentially starting with the leftmost coded card 33, the operator presses the automatic button 30. Using the application depicted in FIG. 5 and in the block diagram in FIG. 7, the operator can cause the apparatus to generate unique audible information associated with all of the installed coded cards 33, each having a surface on which a sensory-information representation is provided, automatically and sequentially starting with the leftmost coded card 33 by pressing the automatic button 30. Once the depression of the automatic button 30 is detected by the microcontroller 63 via the scan-path 74 interconnection, the microcontroller 63 reads and stores in its internal RAM the position of the intercard-time control 39, via the data-path 75 interconnection, and activates control line CTL1, which is part of the control path 73 that connects the microcontroller 63 and the slot-1 coded-key switch circuit 48, and will not respond to any further keyboard 3-button presses. The activation of the control line (CTL1) connected to the slot-1 coded-key switch circuit 48 causes the slot-1 coded-key switch assembly 49 to generate a thirteen (13)-bit code onto the data paths 66 and 72. Because there is no coded card 33 installed in slot 1 6, all of the contact pairs of the slot-1 coded-key switch assembly 49 are in the open position, causing the content of the thirteen (13)-bit code to be 0000000000000. The microcontroller 63 is programmed to respond to 0000000000000 on the ADD1–ADD8 data path 66 and ADD9–ADD13 data path 72 as a no-coded-card 33-installed indication. Therefore, the microcontroller 63 does not enable any of the synthesizers and, consequently, no audible information is generated by the speaker 2. Upon detection that there is no coded card 33 installed in slot 1 6, the microcontroller 63 deactivates control line CTL1, which is part of the control path 73 that connects the microcontroller 63 and the slot-coded-key switch circuit 48. The deactivation of the control line (CTL1) connected to the slot-1 coded-key switch circuit 48 disables the slot-1 coded-key switch assembly 49. The microcontroller 63 then activates control line CTL2, which is part of the control path 73 that connects the microcontroller 63 and the slot-2 coded-key switch circuit 50. The activation of the control line (CTL2) connected to the slot-2 coded-key switch circuit 50 causes the slot-2 light-emitting diode 10 (not shown in these figures) to energize and transmit its light energy into the light-emitting-diode focus lens 34 of the coded card 33, having a surface on which a sensory-information representation is provided, installed in slot 2 9. The activation of the control line (CTL2) connected to the slot-2 coded-key switch circuit 50 also causes the slot-2 coded-key switch assembly 51 to generate a thirteen (13)-bit code onto the data paths 66 and 72. The content of the thirteen (13)-bit code is determined by the positions of the contact pairs of the slot-2 coded-key switch assembly 51, which result from the arrangement of the coded keys 38 in the code-key area 37 of the coded card 33 installed in slot 2 9. Eight (8) bits (ADD1–ADD8) of the thirteen (13)-bit code are transmitted via the data-path 66 interconnection to the internal synthesizer 64 and to any optional expansion-pack synthesizers 45 that may be installed in the apparatus. This eight (8)-bit code (ADD1–ADD8) is the address location within the synthesizer's nonvolatile memory where unique audible information associated with the coded card 33, having a surface on which a sensory-information representation is provided, installed in slot 2 9 is stored. The remaining five (5)-bit code (ADD9–ADD13) is compared by the microcontroller 63 to the five (5)-bit codes stored in the internal RAM during the power-up program. If a match is found between the ADD9–ADD13 code and any of the five (5)-bit codes stored in the internal RAM, the microcontroller 63 enables the synthesizer defined by the five (5)-bit code via control paths EN1–EN4 67 to 70. Once enabled, the synthesizer accesses from its nonvolatile memory, and generates through the speaker 2 via the common audio-path 70 interconnection, the unique audible information associated with the coded card 33, having a surface on which a sensory-information representation is provided, installed in slot 2 9, the location within the nonvolatile memory being defined by the ADD1–ADD8 code. When the synthesizer has completed the generation of the unique audible information associated with the coded card 33, having a surface on which a sensory-information representation is provided, installed in slot 2 9, an end-of-message signal is generated by the enabled synthesizer over one of the control paths (EOM1–EOM4 67 to 70) to the microcontroller 63. The microcontroller 63 then deactivates control line CTL2, which is part of the control path 73 that connects the microcontroller 63 and the slot-2 coded-key switch circuit 50. The deactivation of the control line (CTL2) connected to the slot-2 coded-key switch circuit 50 causes the slot-2 light-emitting diode 10 to de-energize, ending transmission of its light energy into the light-emitting-diode focus lens 34 of the coded card 33, having a surface on which a sensory-information representation is provided, installed in slot 2 9. The deactivation of the control line (CTL2) connected to the slot-2 coded-key switch circuit 50 also disables the slot-2 coded-key switch assembly 51.

If a match cannot be found between the ADD9–ADD13 code and any of the five (5)-bit codes stored in the microcontroller's 63 internal RAM, the microcontroller 63 enables the internal synthesizer 64 via the control path EN1/EN5 67. The enabling of both the EN1 and EN5 control lines to the internal synthesizer 64 causes it to ignore the ADD1–ADD8 address code on the data path 66 and instead access from its nonvolatile memory, and generate through the speaker 2 via the common audio-path 71 interconnection, audible information indicating that the synthesizer that contains the unique audible information associated with the coded card 33, having a surface on which a sensory-information representation is provided, installed in slot 2 9 is not installed in the apparatus at the present time. When the internal synthesizer 64 has completed the generation of audible information indicating that the synthesizer that contains the unique audible information associated with the coded card 33, having a surface on which a sensory-information representation is provided, installed in slot 2 9 is not installed in the apparatus at the present time, an end-of-message signal is generated by the internal synthesizer 64 over control path EOM1 67 to the microcontroller 63. The microcontroller 63 then deactivates control line CTL2, which is part of the control path 73 that connects the microcontroller 63 and the slot-2 coded-key switch circuit 50. The deactivation of the control line (CTL2) connected to the slot-2 coded-key switch circuit 50 causes the slot-2 light-emitting diode 10 to de-energize, ending transmission of its light energy into the light-emitting-diode focus lens 34 of the coded card 33, having a surface on which a sensory-information representation is provided, installed in slot 2 9. The deactivation of the control line (CTL2) connected to the slot-2 coded-key switch circuit 50 also disables the slot-2 coded-key switch assembly 51.

After the deactivation of the control line (CTL2) connected to the slot-2 coded-key switch circuit 50, the microcontroller 63 pauses for a time proportional to the RAM-stored position of the intercard-time control 39. After the intercard-time pause, the microcontroller 63 activates control line CTL3, which is part of the control path 73 that connects the microcontroller 63 and the slot-3 coded-key switch circuit 52. The activation of the control line (CTL3) connected to the slot-3 coded-key switch circuit 52 causes the slot-3 light-emitting diode 13 (not shown in these figures) to energize and transmit its light energy into the light-emitting-diode focus lens 34 of the coded card 33, having a surface on which a sensory-information representation is provided, installed in slot 3 12. The activation of the control line (CTL3) connected to the slot-3 coded-key switch circuit 52 also causes the slot-3 coded-key switch assembly 53 to generate a thirteen (13)-bit code onto the data paths 66 and 72. The content of the thirteen (13)-bit code is determined by the positions of the contact pairs of the slot-3 coded-key switch assembly 53, which result from the arrangement of the coded keys 38 in the code-key area 37 of the coded card 33 installed in slot 3 12. Eight (8) bits (ADD1–ADD8) of the thirteen (13)-bit code are transmitted via the data-path 66 interconnection to the internal synthesizer 64 and to any optional expansion-pack synthesizers 45 that may be installed in the apparatus. This eight (8)-bit code (ADD1–ADD8) is the address location within the synthesizer's nonvolatile memory where unique audible information associated with the coded card 33, having a surface on which a sensory-information representation is provided, installed in slot 3 12 is stored. The remaining five (5)-bit code (ADD9–ADD13) is compared by the microcontroller 63 to the five (5)-bit codes stored in the internal RAM during the power-up program. If a match is found between the ADD9–ADD13 code and any of the five (5)-bit codes stored in the internal RAM, the microcontroller 63, enables the synthesizer defined by the five (5)-bit code via control paths EN1–EN4 67 to 70. The process of generating unique audible information associated with the coded card 33, having a surface on which a sensory-information representation is provided, installed in slot 3 12 is the same process as described for slot 2 9 above. When the synthesizer has completed the generation of the unique audible information associated with the coded card 33, having a surface on which a sensory-information representation is provided, installed in slot 3 12, an end-of-message signal is generated by the enabled synthesizer over one of the control paths (EOM1–EOM4 67 to 70) to the microcontroller 63. The microcontroller 63 then deactivates control line CTL3, which is part of the control path 73 that connects the microcontroller 63 and the slot-3 coded-key switch circuit 52. The deactivation of the control line (CTL3) connected to the slot-3 coded-key switch circuit 52 causes the slot-3 light-emitting diode 13 to de-energize, ending transmission of its light energy into the light-emitting-diode focus lens 34 of the coded card 33, having a surface on which a sensory-information representation is provided, installed in slot 3 12. The deactivation of the control line (CTL3) connected to the slot-3 coded-key switch circuit 52 also disables the slot-3 coded-key switch assembly 53.

After the deactivation of the control line (CTL3) connected to the slot-3 coded-key switch circuit 52, the microcontroller 63 pauses for a time proportional to the RAM-stored position of the intercard-time control 39. After the intercard-time pause, the microcontroller 63 activates control line CTL4, which is part of the control path 73 that connects the microcontroller 63 and the slot-4 coded-key switch circuit 54. The activation of the control line (CTL4) connected to the slot-4 coded-key switch circuit 54 causes the slot-4 light-emitting diode 16 (not shown in these figures) to energize and transmit its light energy into the light-emitting-diode focus lens 34 of the coded card 33, having a surface on which a sensory-information representation is provided, installed in slot 4 15. The activation of the control line (CTL4) connected to the slot-4 coded-key switch circuit 54 also causes the slot-4 coded-key switch assembly 46 to generate a thirteen (13)-bit code onto the data paths 66 and 72. The content of the thirteen (13)-bit code is determined by the positions of the contact pairs of the slot-4 coded-key switch assembly 46, which result from the arrangement of the coded keys 38 in the code-key area 37 of the coded card 33 installed in slot 4 15. Eight (8) bits (ADD1–ADD8) of the thirteen (13)-bit code are transmitted via the data-path 66 interconnection to the internal synthesizer 64 and to any optional expansion-pack synthesizers 45 that may be installed in the apparatus. This eight (8)-bit code (ADD1–ADD8) is the address location within the synthesizer's nonvolatile memory where unique audible information associated with the coded card 33, having a surface on which a sensory-information representation is provided, installed in slot 4 15 is stored. The remaining five (5)-bit code (ADD9–ADD13) is compared by the microcontroller 63 to the five (5)-bit codes stored in the internal RAM during the power-up program. If a match is found between the ADD9–ADD13 code and any of the five (5)-bit codes stored in the internal RAM, the microcontroller 63 enables the synthesizer defined by the five (5)-bit code via control paths EN1–EN4 67 to 70. The process of generating unique audible information associated with the coded card 33, having a surface on which a sensory-information representation is provided, installed in slot 4 15 is the same as the process described for slot 2 9 above. When the synthesizer has completed the generation of the unique audible information associated with the coded card 33, having a surface on which a sensory-information representation is provided, installed in slot 4 15, an end-of-message signal is generated by the enabled synthesizer over one of the control paths (EOM1–EOM4 67 to 70) to the microcontroller 63. The microcontroller 63 then deactivates control line CTL4, which is part of the control path 73 that connects the microcontroller 63 and the slot-4 coded-key switch circuit 54. The deactivation of the control line (CTL4) connected to the slot-4 coded-key switch circuit 54 causes the slot-4 light-emitting diode 16 to de-energize, ending transmission of its light energy into the light-emitting-diode focus lens 34 of the coded card 33, having a surface on which a sensory-information representation is provided, installed in slot 4 15. The deactivation of the control line (CTL4) connected to the slot-4 coded-key switch circuit 54 also disables the slot-4 coded-key switch assembly 46.

After the deactivation of the control line (CTL4) connected to the slot-4 coded-key switch circuit 54, the microcontroller 63 pauses for a time proportional to the RAM-stored position of the intercard-time control 39. After the intercard-time pause, the microcontroller 63 activates control line CTL5, which is part of the control path 73 that connects the microcontroller 63 and the slot-5 coded-key switch circuit 55. The activation of the control line (CTL5) connected to the slot-5 coded-key switch circuit 55 causes the slot-5 coded-key switch assembly 56 to generate a thirteen (13)-bit code onto the data paths 66 and 72. Because there is no coded card 33 installed in slot 5 18, all of the contact pairs of the slot-5 coded-key switch assembly 56 are in the open position, causing the content of the thirteen (13)-bit code to be 0000000000000. The microcontroller 63 is programmed to respond to 0000000000000 on the ADD1–ADD8 data path 66 and ADD9–ADD13 data path 72 as a no-coded-card 33-installed indication. Therefore, the microcontroller 63 does not enable any of the synthesizers and, consequently, no audible information is generated by the speaker 2. Upon detecting that there is no coded card 33 installed in slot 5 18, the microcontroller 63 deactivates control line CTL5, which is part of the control path 73 that connects the microcontroller 63 and the slot-5 coded-key switch circuit 55. The deactivation of the control line (CTL5) connected to the slot-5 coded-key switch circuit 55 disables the slot-5 coded-key switch assembly 56. The microcontroller 63 then activates control line CTL6, which is part of the control path 73 that connects the microcontroller 63 and the slot-6 coded-key switch circuit 57. Since there are no coded cards 33 installed in the remaining slots, the microcontroller 63 processes slot 6 21 through slot 32 in the same manner in which slot 5 18 was processed above. Whether or not any of the expansion apparatuses 47 is installed, the microcontroller 63 automatically and sequentially activates control lines CTL1 through CTL32 when in the automatic mode of operation. The thirteen (13)-bit code generated onto the data paths 66 and 72 when a control line is activated for a card slot in an expansion apparatus 47 that is not installed is the same as the no-coded-card 33-installed indication. Therefore, the microcontroller 63 does not enable any of the synthesizers and, consequently, no audible information is generated by the speaker 2.

After the deactivation of the control line (CTL32) connected to the slot-32 coded-key switch circuit (not shown in these figures), the apparatus is out of the automatic mode of operation and will now respond to any additional keyboard 3-button presses. It will be evident to those skilled in the art that the unique audible information associated with the coded cards 33, each having a surface on which a sensory-information representation is provided, installed in slot 2 9, slot 3 12, and slot 4 15 can take many forms, including but not limited to the phoneme for a letter; the pronunciation, in any spoken language, of a letter or word; a group of words, in any spoken language; and/or any nonvocal sound. It should also be evident to those skilled in the art that the microcontroller 63 can be programmed, when in the automatic mode, so that the operator can cause the apparatus to generate automatically the unique audible information, such as vocal expression and/or nonvocal sound, of all the installed coded cards 33, each having a surface on which a sensory-information representation is provided, in any sequential order.

It should be remembered that the number of card slots per card-type electronic learning aid/teaching apparatus, the number of optional expansion-pack synthesizers 45, and the number of optional expansion apparatuses 47 used are strictly a design choice and, as application needs change, can be adjusted without changing the overall invention.

This process of pressing the automatic button 30 to cause the apparatus to generate unique audible information, such as vocal expression and/or nonvocal sound, associated with all of the installed coded cards 33, each having a surface on which a sensory-information representation is provided, automatically and sequentially starting with the leftmost coded card 33 can be repeated as often as the operator desires.

The operator may switch from the single-card mode of operation to the automatic mode of operation and vice versa as often as he or she wishes, simply by pressing the appropriate button.

Figure 8:
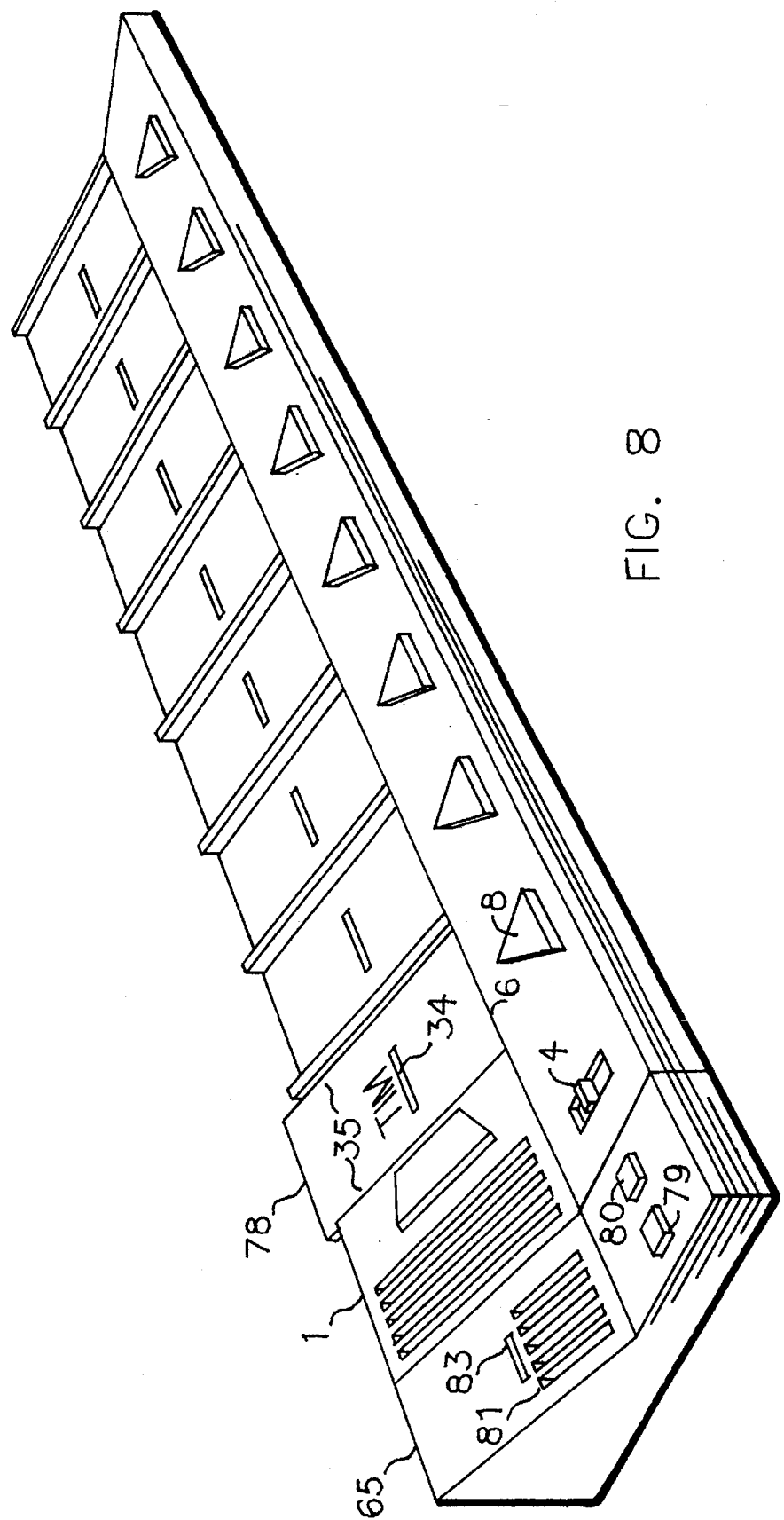
FIG. 8 is a front-perspective view of a card type of electronic learning aid/teaching apparatus in accordance with the present invention, showing the attached optional personalized-card-programming unit, illustrating a typical personalized-card-programming application.

FIG. 8 is a front-perspective view of a card type of electronic learning aid/teaching apparatus in accordance with the present invention, showing the attached optional personalized-card-programming unit 65 and a personalized coded card 78 installed, illustrating a typical personalized-coded-card 78 programming application. Personalized coded cards 78 are physically identical to coded cards 33. The only difference between a personalized coded card 78 and a coded card 33 is that the user must provide the sensory-information representation in visual, tactile (including braille), and/or odorous form in the sensory-information-representation area 35 for the personalized coded card 78, whereas on the coded card 33 the sensory-information-representation area 35 information is entered at the time of manufacture. The personalized-card-programming unit 65 allows the programming of an expansion-pack synthesizer 45 (not shown in this figure) with unique audible information associated with the installed personalized coded card 78 having a surface on which a sensory-information representation is attached. This unique audible information, tailored to a specific user or application, can take many forms, including but not limited to phonemes, pronunciation of words in any spoken language, and/or any nonvocal sound. FIG. 8 shows the personalized coded card 78 installed in slot 1 6 of the housing device 1. The installation of the personalized coded card 78 is accomplished by sliding the card into slot 1 6 of the housing device 1. For illustration purposes only, FIG. 8 shows the personalized coded card 78 installed in slot 1 6 with the letters for the name "TIM" represented in visual form in the sensory-information-representation area 35. Personalized coded cards 78 may contain any visual, tactile (including braille), and/or odorous sensory-information representation in the sensory-information-representation area 35. The sensory-information representation in the sensory-information-representation area 35 may be attached to the personalized coded card 78 by the same person who will program the expansion-pack synthesizer 45. FIG. 8 shows that the optional personalized-card-programming unit 65 is composed of a program-on/off button 79, a programming-active button 80, a microphone opening 81 behind which a microphone 82 (not shown in this figure) is mounted, and a programmer light-emitting diode 83.

With the on/off switch 4 in the "off" position, the optional personalized-card-programming unit 65 may be installed by removing the left-end panel 31 (not shown in this figure) from the housing device 1 and then inserting the personalized-card-programming unit 65 in its place.

PERSONALIZED-CODED-CARD PROGRAMMING (FIGS. 8 AND 9)

Figure 9:
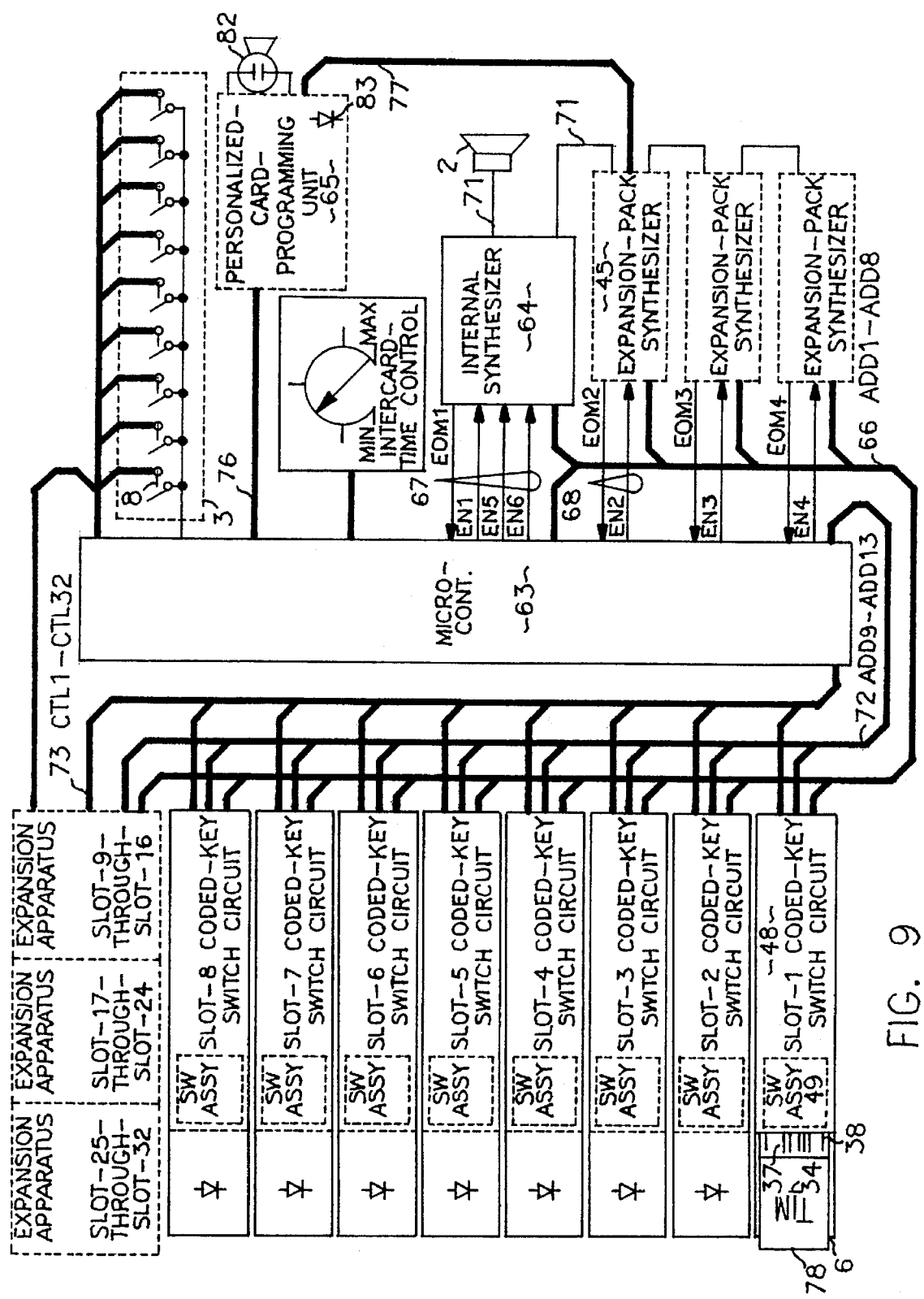
FIG. 9 is a block diagram of a card type of electronic learning aid/teaching apparatus in accordance with the present invention, showing the attached optional personalized-card-programming unit, illustrating a typical personalized-card-programming application.

When the on/off switch 4 is moved from the "off" position to the "on" position, the microcontroller 63 accesses the power-up program in its internal ROM. One of the functions of the power-up program is to determine which internal synthesizer 64 is installed and which, if any, of the variety of optional external-pack synthesizers 45 are installed. The microcontroller 63 stores in its internal RAM a five (5)-bit code, which is unique to each type of synthesizer that may be used, representing each synthesizer detected. When a personalized coded card 78 is being programmed, an external-pack synthesizer 45 must be installed in the area on the expansion-pack printed-circuit board 44 (not shown in these figures) that connects to the microcontroller 63 via control path EN2-EOM2 68. Using the application depicted in FIG. 8 and in the block diagram in FIG. 9, the user can program the installed expansion-pack synthesizer 45 with unique audible information associated with the sensory-information representation in the sensory-information-representation area 35 of the personalized coded card 78 installed in slot 1 6 of the housing device 1 by pressing the program-on/off button 79. Once the depression of the program-on/off button 79 is detected by the microcontroller 63 via the programming control path 76 interconnection, the microcontroller 63 activates control line CTL1, which is part of the control path 73 that connects the microcontroller 63 and the slot-1 coded-key switch circuit 48, and will not respond to any keyboard 3-button button presses. The activation of the control line (CTL1) connected to the slot-1 coded-key switch circuit 48 causes the slot-1 light-emitting diode 7 (not shown in these figures) to energize and transmit its light energy into the light-emitting-diode focus lens 34 of the personalized coded card 78, having a surface on which a sensory-information representation is provided, installed in slot 1 6. The activation of the control line (CTL1) connected to the slot-1 coded-key switch circuit 48 also causes the slot-1 coded-key switch assembly 49 to generate a thirteen (13)-bit code onto the data paths 66 and 72. The content of the thirteen (13)-bit code is determined by the positions of the contact pairs of the slot-1 coded-key switch assembly 49, which result from the arrangement of the coded keys 38 in the code-key area 37 of the personalized coded card 78 installed in slot 1 6. Eight (8) bits (ADD1–ADD8) of the thirteen (13)-bit code are transmitted via the data-path 66 interconnection to the expansion-pack synthesizer 45 installed in the area on the expansion-pack printed-circuit board 44 that connects to the microcontroller 63 via control path EN2–EOM2 68. This eight (8)-bit code (ADD1–ADD8) is the address location within the expansion-pack synthesizer's 45 nonvolatile memory where the unique audible information associated with the sensory-information representation in the sensory-information-representation area 35 of the personalized coded card 78 installed in slot 1 6 is to be stored. The remaining five (5) bits (ADD9–ADD13) of the thirteen (13)-bit code are transmitted via the data-path 72 interconnection to the microcontroller 63. This five (5)-bit code (ADD9–ADD13) is compared by the microcontroller 63 with the five (5)-bit code of the expansion-pack synthesizer 45 installed in the area on the expansion-pack printed-circuit board 44 that is interconnected to the microcontroller 63 via control path EN2–EOM2 68, stored in the internal RAM during the power-up program. If a match is found between the ADD9–ADD13 code and the five (5)-bit code stored in the internal RAM, the microcontroller 63 enables the expansion-pack synthesizer 45 via control path EN2 68 and signals, via the programming control path 76, the personalized-card-programming unit 65 to energize the programmer light-emitting diode 83 and to place, via the programming data-path 77 interconnection, the enabled expansion-pack synthesizer 45 into the program mode. The illumination of the programmer light-emitting diode 83 provides a visual indication that the programming sequence may continue. The operator then holds down the programming-active button 80, which signals, via the programming data-path 77 interconnection, the enabled expansion-pack synthesizer 45 to begin the programming sequence and at the same time verbalize the unique audible information associated with the sensory information representation in visual, tactile (including braille), and/or odorous form in the sensory-information-representation area 35 of the personalized coded card 78 installed in slot 1 6 through the microphone opening 81 into the microphone 82. The audible information entering the microphone 82 is converted into an electrical signal and transmitted over the programming data path 77 and stored in the nonvolatile memory of the expansion-pack synthesizer 45. The location within the nonvolatile memory of the expansion-pack synthesizer 45 is defined by the eight (8)-bit code ADD1–ADD8. Once the verbalization of the unique audible information is complete, the operator releases the programming-active button 80, which causes the programmer light-emitting diode 83 to de-energize. The release of the programming-active button 80 signals the expansion-pack synthesizer 45, via the programming data path 77, to exit the program mode. Once the release of the programming-active button 80 is detected by the microcontroller 63 via the programming-control-path 76 interconnection, the microcontroller 63 deactivates control line CTL1, which is part of the control path 73 that connects the microcontroller 63 and the slot-1 coded-key switch circuit 48, and will now respond to any additional keyboard 3- or program-on/off 79-button presses. The deactivation of the control line (CTL1) connected to the slot-1 coded-key switch circuit 48 causes the slot-1 light-emitting diode 7 to de-energize, ending transmission of its light energy into the light-emitting-diode focus lens 34 of the personalized coded card 78, having a surface on which a sensory-information representation is attached, installed in slot 1 6. The deactivation of the control line (CTL1) connected to the slot-1 coded-key switch circuit 48 also disables the slot-1 coded-key switch assembly 49.

If a match cannot be found between the ADD9–ADD13 code and the five (5)-bit code of the expansion-pack synthesizer 45 installed in the area on the expansion-pack printed-circuit board 44 that is interconnected to the microcontroller 63 via control path EN2–EOM2 68, stored in the microcontroller's 63 internal RAM during the power-up program, the microcontroller 63 enables the internal synthesizer 64 via control path EN1/EN6 67. The enabling of both the EN1 and EN6 control lines to the internal synthesizer 64 will cause it to ignore the ADD1–ADD8 address code on the data path 66 and instead access from its nonvolatile memory, and generate through the speaker 2 via the common audio-path 71 interconnection, audible information indicating that the programming of a personalized coded card 78 cannot take place at the present time, as there is a mismatch between the installed personalized coded card 78 and the expansion-pack synthesizer 45. When the internal synthesizer 64 has completed the generation of audible information indicating that the programming of a personalized-coded card 78 cannot take place at the present time because of a mismatch between the installed personalized coded card 78 and the expansion-pack synthesizer 45, an end-of-message signal is generated by the internal synthesizer 64 over control path EOM1 67 to the microcontroller 63. The microcontroller 63 then deactivates control line CTL1, which is part of the control path 73 that connects the microcontroller 63 and the slot-1 coded-key switch circuit 48, and will now respond to any additional keyboard 3- or program-on/off 79-button presses. The deactivation of the control line (CTL1) connected to the slot-1 coded-key switch circuit 48 causes the slot-1 light-emitting diode 7 to de-energize, ending transmission of its light energy into the light-emitting-diode focus lens 34 of the personalized coded card 78, having a surface on which a sensory-information representation is attached, installed in slot 1 6. The deactivation of the control line (CTL1) connected to the slot-1 coded-key switch circuit 48 also disables the slot-1 coded-key switch assembly 49.

Confirmation of the programming of the expansion-pack synthesizer 45 with the unique audible information associated with the sensory-information representation in visual, tactile (including braille), and/or odorous form in the sensory-information-representation area 35 of the personalized coded card 78 installed in slot 1 6 can be acquired by pressing the slot-1 button 8, which will cause the apparatus to function in the single-card mode of operation.

Once the above programming has taken place, the personalized coded card 78 may be removed from slot 1 6. The personalized coded card 78 will now function identically to a coded card 33 and may be installed in any card slot.

Figure 10:
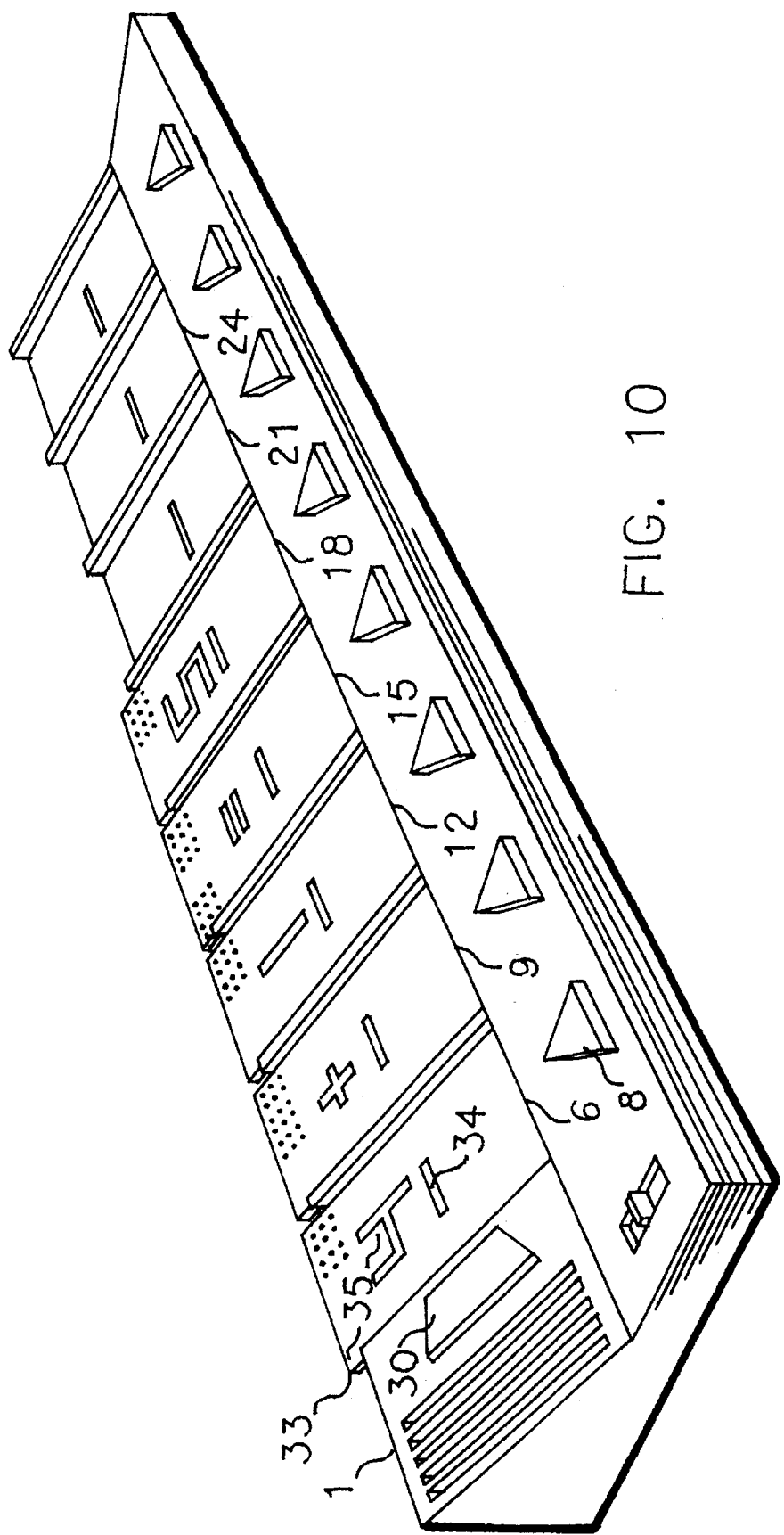
FIG. 10 is a front-perspective view of a card type of electronic learning aid/teaching apparatus in accordance with the present invention, showing five (5) coded cards installed, illustrating a typical arithmetical-operation application.

FIG. 10 is a front-perspective view of a card type of electronic learning aid/teaching apparatus in accordance with the present invention, showing five (5) coded cards 33 installed, illustrating a typical arithmetical-operation application. FIG. 10 shows the coded cards 33 installed in slot 1 6, slot 2 9, slot 3 12, slot 4 15, and slot 5 18. For illustration purposes only, FIG. 10 shows the coded card 33 installed in slot 1 6 with the number 4 represented in both visual and tactile form in the sensory-information-representation area 35, the coded card 33 installed in slot 2 9 with the plus sign (+) represented in both visual and tactile form in the sensory-information-representation area 35, the coded card 33 installed in slot 3 12 with the number (1) represented in both visual and tactile form in the sensory-information-representation area 35, the coded card 33 installed in slot 4 15 with the equals sign (=) represented in both visual and tactile form in the sensory-information-representation area 35, and the coded card 33 installed in slot 5 18 with the number (5) represented in both visual and tactile form in the sensory-information-representation area 35. The installation of a coded card 33 is accomplished by sliding the coded card 33 into the desired slot of the housing device 1. The card type of electronic learning aid/teaching apparatus of the present invention can perform arithmetical operations and provide audible information concerning solutions to and comments reflecting on the operator's response to the arithmetical problems formed by a consecutive arrangement of coded cards 33 installed in the housing device 1 depicting numbers and arithmetical symbols.

ARITHMETICAL OPERATION (FIGS. 10 AND 11)

In the single-card mode of operation, no arithmetical operations are performed on the installed coded cards 33. To cause the apparatus to generate unique audible information, such as vocal expression and/or nonvocal sound, associated with a particular installed coded card 33 having a surface on which a sensory-information representation is provided, the operator presses the visually and functionally distinctive button associated with the card slot in which a coded card 33 is installed. Using the application depicted in FIG. 10 and in the block diagram in FIG. 11, the operator can cause the apparatus to generate the unique audible information associated with the coded card 33, having a surface on which a sensory-information representation is provided, installed in slot 1 6 by pressing the slot-1 button 8. Once the depression of the slot-1 button 8 is detected by the microcontroller 63, the apparatus operates in the single-card mode by causing the slot-1 light-emitting diode 7 (not shown in these figures) to energize and transmit its light energy into the light-emitting-diode focus lens 34 of the coded card 33, having a surface on which a sensory-information representation is provided, installed in slot 1 6, and the microcontroller 63 also causes the enabled synthesizer to access from its nonvolatile memory, and generate through the speaker 2 via the common audio-path 71 interconnection, the unique audible information associated with the coded card 33, having a surface on which a sensory-information representation is provided, installed in slot 1 6. When the synthesizer has completed the generation of the unique audible information associated with the coded card 33, having a surface on which a sensory-information representation is provided, installed in slot 1 6, the microcontroller 63 causes the slot-1 light-emitting diode 7 to de-energize, ending transmission of its light energy into the light-emitting-diode focus lens 34 of the coded card 33, having a surface on which a sensory-information representation is provided, installed in slot 1 6. It will be evident to those skilled in the art that the unique audible information associated with the coded card 33, having a surface on which a sensory-information representation is provided, installed in slot 1 6 can take many forms, including but not limited to pronunciation, in any spoken language, of the number "4"; a group of words, in any audible language; and/or any nonvocal sound.

It is in the automatic mode of operation that the card type of electronic learning aid/teaching apparatus can perform arithmetical operations on the installed coded cards 33. To cause the apparatus to generate unique audible information, such as vocal expression and/or nonvocal sound, associated with each of the installed coded cards 33, each having a surface on which a sensory-information representation is provided, and to perform arithmetical operations and provide audible information concerning solutions to and comments reflecting on the operator's response to the arithmetical problems formed by a consecutive arrangement of coded cards 33 depicting numbers and arithmetical symbols, automatically and sequentially starting with the leftmost coded card 33, the operator presses the automatic button 30. Using the application depicted in FIG. 10 and in the block diagram in FIG. 11, the operator can cause the apparatus to generate unique audible information associated with each of the installed coded cards 33, each having a surface on which a sensory-information representation is provided, and to perform arithmetical operations and provide audible information concerning solutions to and comments reflecting on the operator's response to the arithmetical problems formed by a consecutive arrangement of coded cards 33 depicting numbers and arithmetical symbols, automatically and sequentially starting with the leftmost coded card 33, by pressing the automatic button 30. Once the depression of the automatic button 30 is detected by the microcontroller 63 via the scan-path 74 interconnection, the microcontroller 63 reads, and stores in its internal RAM, the position of the intercard-time control 39 via the data-path 75 interconnection and activates control line CTL1, which is part of the control path 73 that connects the microcontroller 63 and the slot-1 coded-key switch circuit 48, and will not respond to any further keyboard 3-button presses. The activation of the control line (CTL1) connected to the slot-1 coded-key switch circuit 48 causes the slot-1 light-emitting diode 7 (not shown in these figures) to energize and transmit its light energy into the light-emitting-diode focus lens 34 of the coded card 33, having a surface on which a sensory-information representation is provided, installed in slot 1 6. The activation of the control line (CTL1) connected to the slot-1 coded-key switch circuit 48 also causes the slot-1 coded-key switch assembly 49 to generate a thirteen (13)-bit code onto the data paths 66 and 72. The content of the thirteen (13)-bit code is determined by the positions of the contact pairs of the slot-1 coded-key switch assembly 49, which result from the arrangement of the coded keys 38 in the code-key area 37 of the coded card 33 installed in slot 1 6. Eight (8) bits (ADD1–ADD8) of the thirteen (13)-bit code are transmitted via the data-path 66 interconnection to the microcontroller 63, to the internal synthesizer 64, and to any optional expansion-pack synthesizers 45 that may be installed in the apparatus. This eight (8)-bit code (ADD1–ADD8) is the address location within the synthesizer's nonvolatile memory where unique audible information associated with the coded card 33, having a surface on which a sensory-information representation is provided, installed in slot 1 6 is stored. The eight (8)-bit code (ADD1–ADD8) also represents the magnitude of the number "4" depicted in both visual and tactile form in the sensory-information-representation area 35 of the coded card 33 installed in slot 1 6. The remaining five (5) bits (ADD9–ADD13) of the thirteen (13)-bit code are transmitted via the data-path 72 interconnection to the microcontroller 63. The five (5)-bit code (ADD9–ADD13) generated as a result of the coded card 33 installed in slot 1 6 is interpreted by the microcontroller 63 as a command that an arithmetical operation will take place and to store the eight (8)-bit code (ADD1–ADD8) generated as a result of the coded card 33 installed in slot 1 6 in its internal RAM. The five (5)-bit code (ADD9–ADD13) is also compared by the microcontroller 63 to the five (5)-bit codes stored in the internal RAM during the power-up program. If a match is found between the ADD9–ADD13 code and any of the five (5)-bit codes stored in the internal RAM, the microcontroller 63 enables the synthesizer defined by the five (5)-bit code via control paths EN1–EN4 67 to 70. Once enabled, the synthesizer accesses from its nonvolatile memory, and generates through the speaker 2 via the common audio-path 71 interconnection, the unique audible information associated with the coded card 33, having a surface on which a sensory-information representation is provided, installed in slot 1 6, the location within the nonvolatile memory being defined by the ADD1–ADD8 code. When the synthesizer has completed the generation of the unique audible information associated with the coded card 33, having a surface on which a sensory-information representation is provided, installed in slot 1 6, an end-of-message signal is generated by the enabled synthesizer over one of the control paths (EOM1–EOM4 67 to 70) to the microcontroller 63. The microcontroller 63 then deactivates control line CTL1, which is part of the control path 73 that connects the microcontroller 63 and the slot-1 coded-key switch circuit 48. The deactivation of the control line (CTL1) connected to the slot-1 coded-key switch circuit 48 causes the slot-1 light-emitting diode 7 to de-energize, ending transmission of its light energy into the light-emitting-diode focus lens 34 of the coded card 33, having a surface on which a sensory-information representation is provided, installed in slot 1 6. The deactivation of the control line (CTL1) connected to the slot-1 coded-key switch circuit 48 also disables the slot-1 coded key switch assembly 49.

After the deactivation of the control line (CTL1) connected to the slot-1 coded-key switch circuit 48, the microcontroller 63 pauses for a time proportional to the RAM-stored position of the intercard-time control 39. After the intercard-time pause, the microcontroller 63 activates control line CTL2, which is part of the control path 73 that connects the microcontroller 63 and the slot-2 coded-key switch circuit 50. The activation of the control line (CTL2) connected to the slot-2 coded-key switch circuit 50 causes the slot-2 light-emitting diode 10 (not shown in these figures) to energize and transmit its light energy into the light-emitting-diode focus lens 34 of the coded card 33, having a surface on which a sensory-information representation is provided, installed in slot 2 9. The activation of the control line (CTL2) connected to the slot-2 coded-key switch circuit 50 also causes the slot-2 coded-key switch assembly 51 to generate a thirteen (13)-bit code onto the data paths 66 and 72. The content of the thirteen (13)-bit code is determined by the positions of the contact pairs of the slot-2 coded-key switch assembly 51, which result from the arrangement of the coded keys 38 in the code-key area 37 of the coded card 33 installed in slot 2 9. Eight (8) bits (ADD1–ADD8) of the thirteen (13)-bit code are transmitted via the data-path 66 interconnection to the microcontroller 63, the internal synthesizer 64, and any optional expansion-pack synthesizers 45 that may be installed in the apparatus. This eight (8)-bit code (ADD1–ADD8) is the address location within the synthesizer's nonvolatile memory where unique audible information associated with the coded card 33, having a surface on which a sensory-information representation is provided, installed in slot 2 9 is stored. The eight (8)-bit code (ADD1–ADD8) also represents to the microcontroller 63 arithmetical addition operation, represented by the plus sign ("+"), depicted in both visual and tactile form in the sensory-information-representation area 35 of the coded card 33 installed in slot 2 9. The remaining five (5) bits (ADD9–ADD13) of the thirteen (13)-bit code are transmitted via the data-path 72 interconnection to the microcontroller 63. The five (5)-bit code (ADD9–ADD13) generated as a result of the coded card 33 installed in slot 2 9 is interpreted by the microcontroller 63 as a command that an arithmetical operation, the operation being defined by the current eight (8)-bit (ADD1–ADD8) code present on the data-path 66, will take place between the RAM-stored eight (8)-bit code representing the magnitude of the number "4" depicted in both visual and tactile form in the sensory information representation area 35 of the coded card 33 installed in slot 1 6 and the eight (8)-bit code representing the magnitude of the number of the next coded card 33. The five (5)-bit code (ADD9–ADD13) is also compared by the microcontroller 63 to the five (5)-bit codes stored in the internal RAM during the power-up program. If a match is found between the ADD9–ADD13 code and any of the five (5)-bit codes stored in the internal RAM, the microcontroller 63 enables the synthesizer defined by the five (5)-bit code via control paths EN1–EN4 67 to 70. Once enabled, the synthesizer accesses from its nonvolatile memory, and generates through the speaker 2 via the common audio-path 71 interconnection, the unique audible information associated with the coded card 33, having a surface on which a sensory-information representation is provided, installed in slot 2 9, the location within the nonvolatile memory being defined by the ADD1–ADD8 code. When the synthesizer has completed the generation of the unique audible information associated with the coded card 33, having a surface on which a sensory-information representation is provided, installed in slot 2 9, an end-of-message signal is generated by the enabled synthesizer over one of the control paths (EOM1–EOM4 67 to 70) to the microcontroller 63. The microcontroller 63 then deactivates control line CTL2, which is part of the control path 73 that connects the microcontroller 63 and the slot-2 coded-key switch circuit 50. The deactivation of the control line (CTL2) connected to the slot-2 coded-key switch circuit 50 causes the slot-2 light-emitting diode 10 to de-energize, ending transmission of its light energy into the light-emitting-diode focus lens 34 of the coded card 33, having a surface on which a sensory-information representation is provided, installed in slot 2 9. The deactivation of the control line (CTL2) connected to the slot-2 coded-key switch circuit 50 also disables the slot-2 coded-key switch assembly 51.

After the deactivation of the control line (CTL2) connected to the slot-2 coded-key switch circuit 50, the microcontroller 63 pauses for a time proportional to the RAM-stored position of the intercard-time control 39. After the intercard-time pause, the microcontroller 63 activates control line CTL3, which is part of the control path 73 that connects the microcontroller 63 and the slot-3 coded-key switch circuit 52. The activation of the control line (CTL3) connected to the slot-3 coded-key switch circuit 52 causes the slot-3 light-emitting diode 13 (not shown in these figures) to energize and transmit its light energy into the light-emitting-diode focus lens 34 of the coded card 33, having a surface on which a sensory-information representation is provided, installed in slot 3 12. The activation of the control line (CTL3) connected to the slot-3 coded-key switch circuit 52 also causes the slot-3 coded-key switch assembly 53 to generate a thirteen (13)-bit code onto the data paths 66 and 72. The content of the thirteen (13)-bit code is determined by the positions of the contact pairs of the slot-3 coded-key switch assembly 53, which result from the arrangement of the coded keys 38 in the code-key area 37 of the coded card 33 installed in slot 3 12. Eight (8) bits (ADD1–ADD8) of the thirteen (13)-bit code are transmitted via the data-path 66 interconnection to the microcontroller 63, the internal synthesizer 64, and any optional expansion-pack synthesizers 45 that may be installed in the apparatus. This eight (8)-bit code (ADD1–ADD8) is the address location within the synthesizer's nonvolatile memory where unique audible information associated with the coded card 33, having a surface on which a sensory-information representation is provided, installed in slot 3 12, is stored. The eight (8)-bit code (ADD1–ADD8) also represents the magnitude of the number "1" depicted in both visual and tactile form in the sensory-information-representation area 35 of the coded card 33 installed in slot 3 12. The remaining five (5) bits (ADD9–ADD13) of the thirteen (13)-bit code are transmitted via the data-path 72 interconnection to the microcontroller 63. The five (5)-bit code (ADD9–ADD13) generated as a result of the coded card installed in slot 3 12 is interpreted by the microcontroller 63 as a command that an arithmetical operation, the type of operation defined by the coded card 33 installed in slot 2 9, will take place, and the addition of the eight (8)-bit code (ADD1–ADD8) representing the magnitude of the number "1" depicted in both visual and tactile form in the sensory-information-representation area 35 of the coded card 33 installed in slot 3 12 to the RAM-stored eight (8)-bit code representing the magnitude of the number "4" depicted in both visual and tactile form in the sensory-information-representation area 35 of the coded card 33 installed in slot 1 6 takes place with the sum of the two (2) magnitudes being stored in the internal RAM of the microcontroller 63. The five (5)-bit code (ADD9–ADD13) is also compared by the microcontroller 63 to the five (5)-bit codes stored in the internal RAM during the power-up program. If a match is found between the ADD9–ADD13 code and any of the five (5)-bit codes stored in the internal RAM, the microcontroller 63 enables the synthesizer defined by the five (5)-bit code via control paths EN1–EN4 67 to 70. Once enabled, the synthesizer accesses from its nonvolatile memory, and generates through the speaker 2 via the common audio-path 71 interconnection, the unique audible information associated with the coded card 33, having a surface on which a sensory-information representation is provided, installed in slot 3 12, the location within the nonvolatile memory being defined by the ADD1–ADD8 code. When the synthesizer has completed the generation of the unique audible information associated with the coded card 33, having a surface on which a sensory-information representation is provided, installed in slot 3 12, an end-of-message signal is generated by the enabled synthesizer to the microcontroller 63 over one of the control paths (EOM1–EOM4 67 to 70). The microcontroller 63 then deactivates control line CTL3, which is part of the control path 73 that connects the microcontroller 63 and the slot-3 coded-key switch circuit 52. The deactivation of the control line (CTL3) connected to the slot-3 coded-key switch circuit 52 causes the slot-3 light-emitting diode 13 to de-energize, ending transmission of its light energy into the light-emitting-diode focus lens 34 of the coded card 33, having a surface on which a sensory-information representation is provided, installed in slot 3 12. The deactivation of the control line (CTL3) connected to the slot-3 coded-key switch circuit 52 also disables the slot-3 coded-key switch assembly 53.

After the deactivation of the control line (CTL3) connected to the slot-3 coded-key switch circuit 52, the microcontroller 63 pauses for a time proportional to the RAM-stored position of the intercard-time control 39. After the intercard-time pause, the microcontroller 63 activates control line CTL4, which is part of the control path 73 that connects the microcontroller 63 and the slot-4 coded-key switch circuit 54. The activation of the control line (CTL4) connected to the slot-4 coded-key switch circuit 54 causes the slot-4 light-emitting diode 16 (not shown in these figures) to energize and transmit its light energy into the light-emitting-diode focus lens 34 of the coded card 33, having a surface on which a sensory-information representation is provided, installed in slot 4 15. The activation of the control line (CTL4) connected to the slot-4 coded-key switch circuit 54 also causes the slot-4 coded-key switch assembly 46 to generate a thirteen (13)-bit code onto the data paths 66 and 72. The content of the thirteen (13)-bit code is determined by the positions of the contact pairs of the slot-4 coded-key switch assembly 46, which result from the arrangement of the coded keys 38 in the code-key area 37 of the coded card 33 installed in slot 4 15. Eight (8) bits (ADD1–ADD8) of the thirteen (13)-bit code are transmitted via the data-path 66 interconnection to the microcontroller 63, the internal synthesizer 64, and any optional expansion-pack synthesizers 45 that may be installed in the apparatus. This eight (8)-bit code (ADD1–ADD8) is the address location within the synthesizer's nonvolatile memory where unique audible information associated with the coded card 33, having a surface on which a sensory-information representation is provided, installed in slot 4 15 is stored. The eight (8)-bit code (ADD1–ADD8) also represents to the microcontroller 63 arithmetical operation, represented by the equal sign ("="), depicted in both visual and tactile form in the sensory-information-representation area 35 of the coded card 33 installed in slot 4 15. The remaining five (5) bits (ADD9–ADD13) of the thirteen (13)-bit code are transmitted via the data-path 72 interconnection to the microcontroller 63. The five (5)-bit code (ADD9–ADD13) generated as a result of the coded card 33 installed in slot 4 15 is interpreted by the microcontroller 63 as a command that an arithmetical operation, the type of operation being defined by the current eight (8)-bit (ADD1–ADD8) code, will take place to determine if the RAM-stored eight (8)-bit summation code, the summation operation being defined by the "+"-coded card 33 installed in slot 2 9, of the two (2) eight (8)-bit codes representing the magnitude of the number "4" depicted in both visual and tactile form in the sensory-information-representation area 35 of the coded card 33 installed in slot 1 6, and the magnitude of the number "1" depicted in both visual and tactile form in the sensory-information-representation area 35 of the coded card 33 installed in slot 3 12, is equal to the eight (8)-bit code representing the magnitude of the number of the coded card 33 installed in the next card slot, slot 5 18. The five (5)-bit code (ADD9–ADD13) is also compared by the microcontroller to the five (5)-bit codes stored in the internal RAM during the power-up program. If a match is found between the ADD9–ADD13 code and any of the five (5)-bit codes stored in the internal RAM, the microcontroller 63 enables the synthesizer defined by the five (5)-bit code via control paths EN1–EN4 67 to 70. Once enabled, the synthesizer accesses from its nonvolatile memory, and generates through the speaker 2 via the common audio-path 71 interconnection, the unique audible information associated with the coded card 33, having a surface on which a sensory-information representation is provided, installed in slot 4 15, the location within the nonvolatile memory being defined by the ADD1–ADD8 code. When the synthesizer has completed the generation of the unique audible information associated with the coded card 33, having a surface on which a sensory-information representation is provided, installed in slot 4 15, an end-of-message signal is generated by the enabled synthesizer to the microcontroller 63 over one of the control paths (EOM1–EOM4 67 to 70). The microcontroller 63 then deactivates control line CTL4, which is part of the control path 73 that connects the microcontroller 63 and the slot-4 coded-key switch circuit 54. The deactivation of the control line (CTL4) connected to the slot-4 coded-key switch circuit 54 causes the slot-4 light-emitting diode 16 to de-energize, ending transmission of its light energy into the light-emitting-diode focus lens 34 of the coded card 33, having a surface on which a sensory-information representation is provided, installed in slot 4 15. The deactivation of the control line (CTL4) connected to the slot-4 coded-key switch circuit 54 also disables the slot-4 coded-key switch assembly 46.

After the deactivation of the control line (CTL4) connected to the slot-4 coded-key switch circuit 54, the microcontroller 63 pauses for a time proportional to the RAM-stored position of the intercard-time control 39. After the intercard-time pause, the microcontroller 63 activates control line CTL5, which is part of the control path 73 that connects the microcontroller 63 and the slot-5 coded-key switch circuit 55. The activation of the control line (CTL5) connected to the slot-5 coded-key switch circuit 55 causes the slot-5 light-emitting diode 19 (not shown in these figures) to energize and transmit its light energy into the light-emitting-diode focus lens 34 of the coded card 33, having a surface on which a sensory-information representation is provided, installed in slot 5 18. The activation of the control line (CTL5) connected to the slot-5 coded-key switch circuit 55 also causes the slot-5 coded-key switch assembly 56 to generate a thirteen (13)-bit code onto the data paths 66 and 72. The content of the thirteen (13)-bit code is determined by the positions of the contact pairs of the slot-5 coded-key switch assembly 56, which result from the arrangement of the coded keys 38 in the code-key area 37 of the coded card 33 installed in slot 5 18. Eight (8) bits (ADD1–ADD8) of the thirteen (13)-bit code are transmitted via the data-path 66 interconnection to the microcontroller 63, the internal synthesizer 64, and any optional expansion-pack synthesizers 45 that may be installed in the apparatus. This eight (8)-bit code (ADD1–ADD8) is the address location within the synthesizer's nonvolatile memory where unique audible information associated with the coded card 33, having a surface on which a sensory-information representation is provided, installed in slot 5 18 is stored. The eight (8)-bit code (ADD1–ADD8) also represents the magnitude of the number "5" depicted in both visual and tactile form in the sensory-information-representation area 35 of the coded card 33 installed in slot 5 18. The remaining five (5) bits (ADD9–ADD13) of the thirteen (13)-bit code are transmitted via the data-path 72 interconnection to the microcontroller 63. The five (5)-bit code (ADD9–ADD13) generated as a result of the coded card 33 installed in slot 5 18 is interpreted by the microcontroller 63 as a command that an arithmetical operation will take place to determine whether the eight (8)-bit code (ADD1–ADD8) representing the magnitude of the number "5", depicted in both visual and tactile form in the sensory-information-representation area 35 of the coded card 33 installed in slot 5 18, is equal to the RAM-stored eight (8)-bit summation code of the two (2) eight (8)-bit codes representing the magnitude of the number "4" depicted in both visual and tactile form in the sensory-information-representation area 35 of the coded card 33 installed in slot 1 6 and the magnitude of the number "1" depicted in both visual and tactile form in the sensory-information-representation area 35 of the coded card 33 installed in slot 3 12. The five (5)-bit code (ADD9–ADD13) is also compared by the microcontroller 63 to the five (5)-bit codes stored in the internal RAM during the power-up program. If a match is found between the ADD9–ADD13 code and any of the five (5)-bit codes stored in the internal RAM, the microcontroller 63 enables the synthesizer defined by the five (5)-bit code via control paths EN1–EN4 67 to 70. Once enabled, the synthesizer accesses from its nonvolatile memory, and generates through the speaker 2 via the common audio-path 71 interconnection, the unique audible information associated with the coded card 33, having a surface on which a sensory-information representation is provided, installed in slot 5 18, the location within the nonvolatile memory being defined by the ADD1–ADD8 code. When the synthesizer has completed the generation of the unique audible information associated with the coded card 33, having a surface on which a sensory-information representation is provided, installed in slot 5 18, an end-of-message signal is generated by the enabled synthesizer to the microcontroller 63 over one of the control paths (EOM1–EOM4 67 to 70). The microcontroller then deactivates control line CTL5, which is part of the control path 73 that connects the microcontroller 63 and the slot-5 coded-key switch circuit 55. The deactivation of the control line (CTL5) connected to the slot-5 coded-key switch circuit 55 causes the slot-5 light-emitting diode 19 to de-energize, ending transmission of its light energy into the light-emitting-diode focus lens 34 of the coded card 33, having a surface on which a sensory-information representation is provided, installed in slot 5 18. The deactivation of the control line (CTL5) connected to the slot-5 coded-key switch circuit 55 also disables the slot-5 coded-key switch assembly 56.

If the eight (8)-bit code (ADD1–ADD8) representing the magnitude of the number "5" depicted in both visual and tactile form in the sensory-information-representation area 35 of the coded card 33 installed in slot 5 18 is found to be equal to the RAM-stored eight (8)-bit summation code, the summation operation being defined by the "+"-coded card 33 installed in slot 2 9, of the two (2) eight (8)-bit codes representing the magnitude of the number "4" depicted in both visual and tactile form in the sensory-information-representation area 35 of the coded card 33 installed in slot 1 6 and the magnitude of the number "1" depicted in both visual and tactile form in the sensory-information-representation area 35 of the coded card 33 installed in slot 3 12, the microcontroller 63 generates a unique eight (8)-bit code (ADD1–ADD8) onto the data path 66 and enables the internal synthesizer 64 via control path EN1 67. Once enabled, the internal synthesizer 64 accesses from its nonvolatile memory, and generates through the speaker 2 via the common audio-path 71 interconnection, audible information reflecting on the operator's response to the arithmetical problem, the location within the nonvolatile memory being defined by the ADD1–ADD8 code generated by the microcontroller 63.

If the eight (8)-bit code (ADD1–ADD8) representing the magnitude of the number depicted in visual and/or tactile form in the sensory-information-representation area 35 of the coded card 33 installed in slot 5 18 is found not to be equal to the RAM-stored eight (8)-bit summation code of the two (2) eight (8)-bit codes representing the magnitude of the number "4" depicted in both visual and tactile form in the sensory-information-representation area 35 of the coded card 33 installed in slot 1 6 and the magnitude of the number "1" depicted in both visual and tactile form in the sensory-information-representation area 35 of the coded card 33 installed in slot 3 12, the microcontroller 63 generates a unique eight (8)-bit code (ADD1–ADD8) onto the data-path 66 and enables the internal synthesizer 64 via control path EN1 67. Once enabled, the internal synthesizer 64 accesses from its nonvolatile memory, and generates through the speaker 2 via the common audio-path 71 interconnection, audible information reflecting on the operator's response to the arithmetical problem, the location within the nonvolatile memory being defined by the ADD1–ADD8 code generated by the microcontroller 63.

When the internal synthesizer 64 has completed the generation of the audible information reflecting on the operator's response to the arithmetical problem formed by the consecutive arrangement of coded cards 33 depicting numbers and arithmetical symbols, an end-of-message signal is generated by the internal synthesizer 64 to the microcontroller 63 over control path EOM1 67. The microcontroller 63 then pauses for a time proportional to the RAM-stored position of the intercard-time control 39. After the intercard-time pause, the microcontroller 63 activates control line CTL6, which is part of the control path 73 that connects the microcontroller 63 and the slot-6 coded-key switch circuit 57. The activation of the control line (CTL6) connected to the slot-6 coded-key switch circuit 57 causes the slot-6 coded-key switch assembly 58 to generate a thirteen (13)-bit code onto the data paths 66 and 72. Because there is no coded card 33 installed in slot 6 21, all of the contact pairs of the slot-6 coded-key switch assembly 58 are in the open position, causing the content of the thirteen (13)-bit code to be 0000000000000. The microcontroller 63 is programmed to respond to 0000000000000 on the ADD1–ADD8 data path 66 and ADD9–ADD13 data path 72 as a no-coded-card 33-installed indication. Therefore, the microcontroller 63 does not enable any of the synthesizers and, consequently, no audible information is generated by the speaker 2. Upon detection that there is no coded card 33 installed in slot 6 21, the microcontroller 63 deactivates control line CTL6, which is part of the control path 73 that connects the microcontroller 63 and the slot-6 coded-key switch circuit 57. The deactivation of the control line (CTL6) connected to the slot-6 coded-key switch circuit 57 disables the slot-6 coded-key switch assembly 58. The microcontroller 63 then activates control line CTL7, which is part of the control path 73 that connects the microcontroller 63 and the slot-7 coded-key switch circuit 59. Since there are no coded cards 33 installed in the remaining slots, the microcontroller 63 processes slot 7 24 through slot 32 in the same manner in which slot 6 21 was processed above. Whether or not any of the expansion apparatuses 47 are installed, the microcontroller 63 automatically and sequentially activates control lines CTL1 through CTL32 when in the automatic mode of operation. The thirteen (13)-bit code generated onto the data paths 66 and 72 when a control line is activated for a card slot in an expansion apparatus 47 that is not installed is the same as the no-coded-card 33-installed indication. Therefore, the microcontroller 63 does not enable any of the synthesizers and, consequently, no audible information is generated by the speaker 2.

After the deactivation of the control line CTL32 connected to the slot-32 coded-key switch circuit (not shown in these figures), the apparatus is out of the automatic mode of operation and will now respond to any additional keyboard 3-button presses.

If no coded card 33 is installed in slot 5 18 when the control line (CTL5) connected to the slot-5 coded-key switch circuit 55 becomes active, the slot-5 coded-key switch assembly 56 generates a no-coded-card 33-installed thirteen (13)-bit code (0000000000000) onto the data paths 66 and 72. The microcontroller 63 is programmed to respond to a no-coded-card 33-installed code, when immediately preceded by the eight (8)-bit code (ADD1–ADD8) representing the equals-sign ("=") arithmetical operation, by generating onto the data path 66 the RAM-stored eight (8)-bit summation code of the two (2) eight (8)-bit codes representing the magnitude of the number "4" depicted in both visual and tactile form in the sensory-information-representation area 35 of the coded card 33 installed in slot 1 6 and the magnitude of the number "1" depicted in both visual and tactile form in the sensory-information-representation area 35 of the coded card 33 installed in slot 3 12 and enabling the internal synthesizer 64 via control path EN1 67. Once enabled, the internal synthesizer 64 accesses from its nonvolatile memory, and generates through the speaker 2 via the common audio-path 71 interconnection, audible information equivalent to the summation code of the two (2) eight (8)-bit codes representing the magnitude of the number "4" depicted in both visual and tactile form in the sensory-information-representation area 35 of the coded card 33 installed in slot 1 6 and the magnitude of the number "1" depicted in both visual and tactile form in the sensory-information-representation area 35 of the coded card 33 installed in slot 3 12, the location within the nonvolatile memory being defined by the ADD1–ADD8 code generated by the microcontroller 63. When the internal synthesizer 64 has completed the generation of the unique audible information equivalent to the summation code, an end-of-message signal is generated by the internal synthesizer 64 to the microcontroller 63 over control path EOM1 67. The microcontroller 63 then deactivates control line CTL5, which is part of the control path 73 that connects the microcontroller 63 and the slot-5 coded-key switch circuit 55. The deactivation of the control line (CTL5) connected to the slot-5 coded-key switch circuit 55 causes the slot-5 light-emitting diode 19 to de-energize. The deactivation of the control line (CTL5) connected to the slot-5 coded-key switch circuit 55 also disables the slot-5 coded-key switch assembly 56. Since there are no coded cards 33 installed in the remaining slots, the microcontroller 63 processes slot 6 21 through slot 32 in the same manner as above. Whether or not any of the expansion apparatuses 47 are installed, the microcontroller 63 automatically and sequentially activates control lines CTL1 through CTL32 when in the automatic mode of operation.

Figure 11:
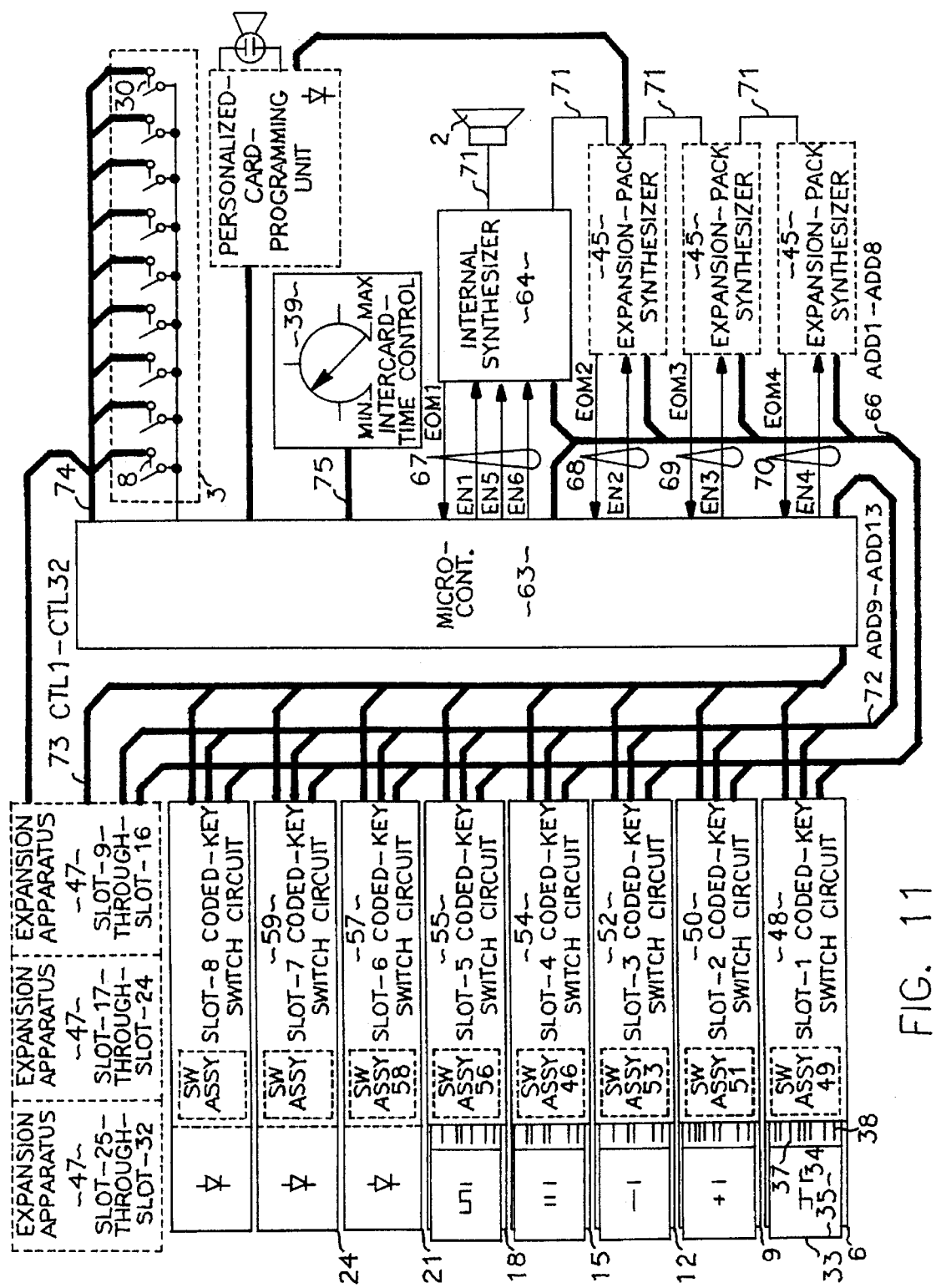
FIG. 11 is a block diagram of a card type of electronic learning aid/teaching apparatus in accordance with the present invention, showing five (5) coded cards installed, illustrating a typical arithmetical-operation application.

For illustration purposes only, FIG. 10 and FIG. 11 show the coded cards 33 installed in the housing device 1 forming the arithmetical addition formula of "4+1=5." It will be evident to those skilled in the art that any comparable formula, expressing arithmetic operations such as but not limited to division, multiplication, or subtraction, and any complex combinations of operations, may be formed with the coded cards 33.

Figure 12:
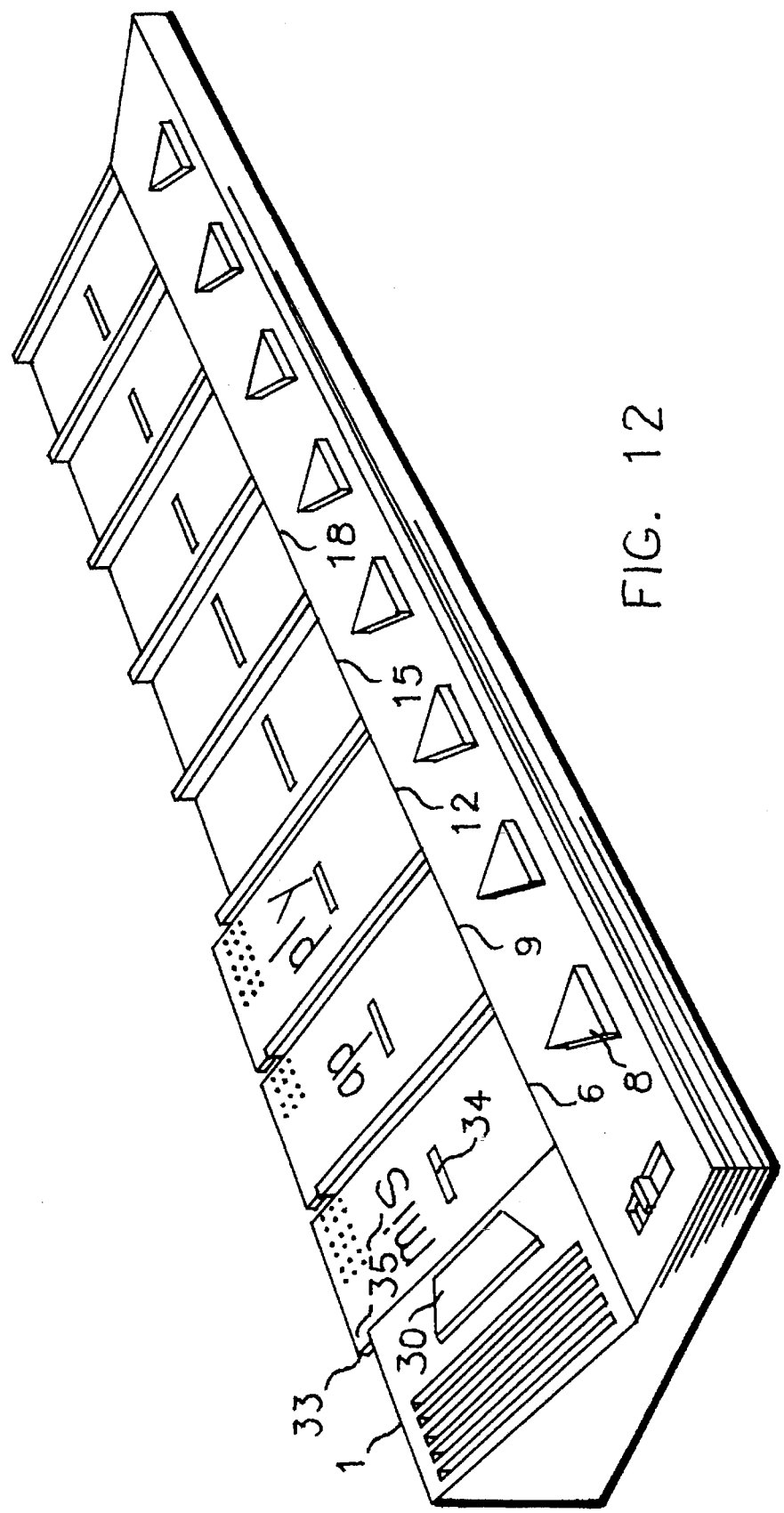
FIG. 12 is a front-perspective view of a card type of electronic learning aid/teaching apparatus in accordance with the present invention, showing three coded cards installed, illustrating a typical phoneme-to-word conversion application.

FIG. 12 is a front-perspective view of a card type of electronic learning aid/teaching apparatus in accordance with the present invention, showing three (3) coded cards 33 installed, illustrating a typical phoneme-to-word conversion application. FIG. 12 shows the coded cards 33 installed in slot 1 6, slot 2 9, and slot 3 12. For illustration purposes only, FIG. 12 shows the sensory-information representation, in both visual and tactile form, in the sensory-information-representation area 35 on the coded card 33 installed in slot 1 6 with the language-symbol-information presentation of the syllable "mis", on the coded card 33 installed in slot 2 9 with the language-symbol-information presentation of the syllable "ap", and on the coded card 33 installed in slot 3 12 with the language-symbol-information presentation of the syllable "ply". The installation of a coded card 33 is accomplished by sliding the coded card 33 into the desired slot of the housing device 1. The card type of electronic learning aid/teaching apparatus of the present invention can perform phoneme-to-word conversion and provide audible information corresponding to the word or fraction thereof formed by the consecutive arrangement of a group of coded cards 33, depicting phonemes, installed in the housing device 1.

PHONEME-TO-WORD CONVERSION (FIGS. 12 AND 13)

In the single-card mode of operation, no phoneme-to-word conversions are performed on the installed coded cards 33. To cause the apparatus to generate unique audible information, such as vocal expression in a human language of a phoneme, associated with a particular installed coded card 33 having a surface on which a sensory-information representation in visual and/or tactile form is provided, presenting language-symbol information of the phoneme type, the operator presses the visually and functionally distinctive button associated with the card slot in which a coded card 33 is installed. Using the application depicted in FIG. 12 and in the block diagram in FIG. 13, the operator can cause the apparatus to generate the unique audible information associated with the coded card 33, having a surface on which a sensory-information representation in visual and tactile form is provided, installed in slot 1 6 by pressing the slot-1 button 8. Once the depression of the slot-1 button 8 is detected by the microcontroller 63, the apparatus operates in the single-card mode by causing the slot-1 light-emitting diode 7 (not shown in these figures) to energize and transmit its light energy into the light-emitting-diode focus lens 34 of the coded card 33, having a surface on which a sensory-information representation in visual and tactile form is provided, installed in slot 1 6, and the microcontroller 63 also causes the enabled synthesizer to access from its nonvolatile memory, and generate through the speaker 2 via the common audio-path 71 interconnection, the unique audible information associated with the coded card 33, having a surface on which a sensory-information representation in visual and tactile form is provided, installed in slot 1 6. When the synthesizer has completed the generation of the unique audible information associated with the coded card 33, having a surface on which a sensory-information representation in visual and tactile form is provided, installed in slot 1 6, the microcontroller 63 will cause the slot-1 light-emitting diode 7 to de-energize, ending transmission of its light energy into the light-emitting-diode focus lens 34 of the coded card 33, having a surface on which a sensory-information representation in visual and tactile form is provided, installed in slot 1 6. It will be evident to those skilled in the art that the unique audible information associated with the coded card 33, having a surface on which a sensory-information representation in visual and tactile form is provided, installed in slot 1 6 can take many forms, including but not limited to the phoneme pronunciation, in any spoken language, of the syllable "mis".

In the automatic mode of operation, the card type of electronic learning aid/teaching apparatus can perform phoneme-to-word conversion on the installed coded cards 33. To cause the apparatus to generate unique audible information, in the form of vocal expression in the spoken language of a phoneme, associated with each of the installed coded cards 33, each having a surface on which a sensory-information representation in visual and/or tactile form is provided, and to perform the phoneme-to-word conversion operation and provide audible information corresponding to the word or fraction thereof formed by the consecutive arrangement of a group of coded cards 33 depicting phonemes, automatically and sequentially starting with the leftmost coded card 33, the operator presses the automatic button 30. Using the application depicted in FIG. 12 and in the block diagram in FIG. 13, the operator can cause the apparatus to generate unique audible information associated with each of the installed coded cards 33, each having a surface on which a sensory-information representation in visual and tactile form is provided, and to perform the phoneme-to-word conversion operation and provide audible information corresponding to the word or fraction thereof formed by the consecutive arrangement of a group of coded cards 33 depicting phonemes, automatically and sequentially starting with the leftmost coded card 33, by pressing the automatic button 30. Once the depression of the automatic button 30 is detected by the microcontroller 63 via the scan-path 74 interconnection, the microcontroller 63 reads and stores in its internal RAM the position of the intercard-time control 39 via the data-path 75 interconnection and activates control line CTL1, which is part of the control path 73 that connects the microcontroller 63 and the slot-1 coded-key switch circuit 48, and will not respond to any further keyboard 3-button presses. The activation of the control line (CTL1) connected to the slot-1 coded-key switch circuit 48 causes the slot-1 light-emitting diode 7 (not shown in these figures) to energize and transmit its light energy into the light-emitting-diode focus lens 34 of the coded card 33, having a surface on which a sensory-information representation in visual and tactile form is provided, installed in slot 1 6. The activation of the control line (CTL1) connected to the slot-1 coded-key switch circuit 48 also causes the slot-1 coded-key switch assembly 49 to generate a thirteen (13)-bit code onto the data paths 66 and 72. The content of the thirteen (13)-bit code is determined by the positions of the contact pairs of the slot-1 coded-key switch assembly 49, which result from the arrangement of the coded keys 38 in the code-key area 37 of the coded card 33 installed in slot 1 6. Eight (8) bits (ADD1–ADD8) of the thirteen (13)-bit code are transmitted via the data-path 66 interconnection to the microcontroller 63, to the internal synthesizer 64, and to any optional expansion-pack synthesizers 45 that may be installed in the apparatus. This eight (8)-bit code (ADD1–ADDS) is the address location within the synthesizer's nonvolatile memory where unique audible information associated with the coded card 33, having a surface on which a sensory-information representation in visual and tactile form is provided, installed in slot 1 6 is stored. The remaining five (5) bits (ADD9–ADD13) of the thirteen (13)-bit code are transmitted via the data-path 72 interconnection to the microcontroller 63. The five (5)-bit code (ADD9–ADD13) generated as a result of the coded card 33 installed in slot 1 6 is interpreted by the microcontroller 63 as a command that a phoneme-to-word conversion operation will take place and to store the eight (8)-bit code (ADD1–ADD8) generated by the coded card 33 installed in slot 1 6 in its internal RAM. The five (5)-bit code (ADD9–ADD13) is also compared by the microcontroller 63 to the five (5)-bit codes stored in the internal RAM during the power-up program. If a match is found between the ADD9–ADD13 code and any of the five (5)-bit codes stored in the internal RAM, the microcontroller 63 enables the synthesizer defined by the five (5)-bit code via control paths EN1–EN4 67 to 70. Once enabled, the synthesizer accesses from its nonvolatile memory, and generates through the speaker 2 via the common audio-path 71 interconnection, the unique audible information associated with the coded card 33, having a surface on which a sensory-information representation in visual and tactile form is provided, installed in slot 1 6, the location within the nonvolatile memory being defined by the ADD1–ADD8 code. When the synthesizer has completed the generation of the unique audible information associated with the coded card 33, having a surface on which a sensory-information representation in visual and tactile form is provided, installed in slot 1 6, an end-of-message signal is generated by the enabled synthesizer over one of the control paths (EOM1–EOM4 67 to 70) to the microcontroller 63. The microcontroller 63 then deactivates control line CTL1, which is part of the control path 73 that connects the microcontroller 63 and the slot-1 coded-key switch circuit 48. The deactivation of the control line (CTL1) connected to the slot-1 coded-key switch circuit 48 causes the slot-1 light-emitting diode 7 to de-energize, ending transmission of its light energy into the light-emitting-diode focus lens 34 of the coded card 33, having a surface on which a sensory-information representation in visual and tactile form is provided, installed in slot 1 6. The deactivation of the control line (CTL1) connected to the slot-1 coded-key switch circuit 48 also disables the slot-1 coded-key switch assembly 49.

After the deactivation of the control line (CTL1) connected to the slot-1 coded-key switch circuit 48, the microcontroller 63 pauses for a time proportional to the RAM-stored position of the intercard-time control 39. After the intercard-time pause, the microcontroller 63 activates control line CTL2, which is part of the control path 73 that connects the microcontroller 63 and the slot-2 coded-key switch circuit 50. The activation of the control line (CTL2) connected to the slot-2 coded-key switch circuit 50 causes the slot-2 light-emitting diode 10 (not shown in these figures) to energize and transmit its light energy into the light-emitting-diode focus lens 34 of the coded card 33, having a surface on which a sensory-information representation in visual and tactile form is provided, installed in slot 2 9. The activation of the control line (CTL2) connected to the slot-2 coded-key switch circuit 50 also causes the slot-2 coded-key switch assembly 51 to generate a thirteen (13)-bit code onto the data paths 66 and 72. The content of the thirteen (13)-bit code is determined by the positions of the contact pairs of the slot-2 coded-key switch assembly 51, which result from the arrangement of the coded keys 38 in the code-key area 37 of the coded card 33 installed in slot 2 9. Eight (8) bits (ADD1–ADD8) of the thirteen (13)-bit code are transmitted via the data-path 66 interconnection to the microcontroller 63, the internal synthesizer 64, and any optional expansion-pack synthesizers 45 that may be installed in the apparatus. This eight (8)-bit code (ADD1–ADD8) is the address location within the synthesizer's nonvolatile memory where unique audible information associated with the coded card 33, having a surface on which a sensory-information representation in visual and tactile form is provided, installed in slot 2 9 is stored. The remaining five (5) bits (ADD9–ADD13) of the thirteen (13)-bit code are transmitted via the data-path 72 interconnection to the microcontroller 63. The five (5)-bit code (ADD9–ADD13) generated as a result of the coded card 33 installed in slot 2 9 is interpreted by the microcontroller 63 as a command that a phoneme-to-word conversion operation will take place and to store the eight (8)-bit code (ADD1–ADD8) generated by the coded card 33 installed in slot 2 9 in its internal RAM along with the eight (8)-bit code (ADD1–ADD8) generated by the coded card 33 installed in slot 1 6. The five (5)-bit code (ADD9–ADD13) is also compared by the microcontroller 63 to the five (5)-bit codes stored in the internal RAM during the power-up program. If a match is found between the ADD9–ADD13 code and any of the five (5)-bit codes stored in the internal RAM, the microcontroller 63 enables the synthesizer defined by the five (5)-bit code via control paths EN1–EN4 67 to 70. Once enabled, the synthesizer accesses from its nonvolatile memory, and generates through the speaker 2 via the common audio-path 71 interconnection, the unique audible information associated with the coded card 33, having a surface on which a sensory-information representation in visual and tactile form is provided, installed in slot 2 9, the location within the nonvolatile memory being defined by the ADD1–ADD8 code. When the synthesizer has completed the generation of the unique audible information associated with the coded card 33, having a surface on which a sensory-information representation in visual and tactile form is provided, installed in slot 2 9, an end-of-message signal is generated by the enabled synthesizer over one of the control paths (EOM1–EOM4 67 to 70) to the microcontroller 63. The microcontroller 63 then deactivates control line CTL2, which is part of the control path 73 that connects the microcontroller 63 and the slot-2 coded-key switch circuit 50. The deactivation of the control line (CTL2) connected to the slot-2 coded-key switch circuit 50 causes the slot-2 light-emitting diode 10 to de-energize, ending transmission of its light energy into the light-emitting-diode focus lens 34 of the coded card 33, having a surface on which a sensory-information representation in visual and tactile form is provided, installed in slot 2 9. The deactivation of the control line (CTL2) connected to the slot-2 coded-key switch circuit 50 also disables the slot-2 coded-key switch assembly 51.

After the deactivation of the control line (CTL2) connected to the slot-2 coded-key switch circuit 50, the microcontroller 63 pauses for a time proportional to the RAM-stored position of the intercard-time control 39. After the intercard-time pause, the microcontroller 63 activates control line CTL3, which is part of the control path 73 that connects the microcontroller 63 and the slot-3 coded-key switch circuit 52. The activation of the control line (CTL3) connected to the slot-3 coded-key switch circuit 52 causes the slot-3 light-emitting diode 13 (not shown in these figures) to energize and transmit its light energy into the light-emitting-diode focus lens 34 of the coded card 33, having a surface on which a sensory-information representation in visual and tactile form is provided, installed in slot 3 12. The activation of the control line (CTL3) connected to the slot-3 coded-key switch circuit 52 also causes the slot-3 coded-key switch assembly 53 to generate a thirteen (13)-bit code onto the data paths 66 and 72. The content of the thirteen (13)-bit code is determined by the positions of the contact pairs of the slot-3 coded-key switch assembly 53, which result from the arrangement of the coded keys 38 in the code-key area 37 of the coded card 33 installed in slot 3 12. Eight (8) bits (ADD1–ADD8) of the thirteen (13)-bit code are transmitted via the data-path 66 interconnection to the microcontroller 63, the internal synthesizer 64, and any optional expansion-pack synthesizers 45 that may be installed in the apparatus. This eight (8)-bit code (ADD1–ADD8) is the address location within the synthesizer's nonvolatile memory where unique audible information associated with the coded card 33, having a surface on which a sensory-information representation in visual and tactile form is provided, installed in slot 3 12 is stored. The remaining five (5) bits (ADD9–ADD13) of the thirteen (13)-bit code are transmitted via the data-path 72 interconnection to the microcontroller 63. The five (5)-bit code (ADD9–ADD13) generated as a result of the coded card 33 installed in slot 3 12 is interpreted by the microcontroller 63 as a command that a phoneme-to-word conversion operation will take place and to store the eight (8)-bit code (ADD1–ADD8) generated by the coded card 33 installed in slot 3 12 in its internal RAM along with the eight (8)-bit code (ADD1–ADD8) generated by the coded card 33 installed in slot 1 6 and the eight (8)-bit code (ADD1–ADD8) generated by the coded card 33 installed in slot 2 9. The five (5)-bit code (ADD9–ADD13) is also compared by the microcontroller 63 to the five (5)-bit codes stored in the internal RAM during the power-up program. If a match is found between the ADD9–ADD13 code and any of the five (5)-bit codes stored in the internal RAM, the microcontroller 63 enables the synthesizer defined by the five (5)-bit code via control paths EN1–EN4 67 to 70. Once enabled, the synthesizer accesses from its nonvolatile memory, and generates through the speaker 2 via the common audio-path 71 interconnection, the unique audible information associated with the coded card 33, having a surface on which a sensory-information representation in visual and tactile form is provided, installed in slot 3 12, the location within the nonvolatile memory being defined by the ADD1–ADD8 code. When the synthesizer has completed the generation of the unique audible information associated with the coded card 33, having a surface on which a sensory-information representation in visual and tactile form is provided, installed in slot 3 12, an end-of-message signal is generated by the enabled synthesizer over one of the control paths (EOM1–EOM4 67 to 70) to the microcontroller 63. The microcontroller 63 then deactivates control line CTL3, which is part of the control path 73 that connects the microcontroller 63 and the slot-3 coded-key switch circuit 52. The deactivation of the control line (CTL3) connected to the slot-3 coded-key switch circuit 52 causes the slot-3 light-emitting diode 13 to de-energize, ending transmission of its light energy into the light-emitting-diode focus lens 34 of the coded card 33, having a surface on which a sensory-information representation in visual and tactile form is provided, installed in slot 3 12. The deactivation of the control line (CTL3) connected to the slot-3 coded-key switch circuit 52 also disables the slot-3 coded-key switch assembly 53.

After the deactivation of the control line (CTL3) connected to the slot-3 coded-key switch circuit 52, the microcontroller 63 pauses for a time proportional to the RAM-stored position of the intercard-time control 39. After the intercard-time pause, the microcontroller 63 activates control line CTL4, which is part of the control path 73 that connects the microcontroller 63 and the slot-4 coded-key switch circuit 54. The activation of the control line (CTL4) connected to the slot-4 coded-key switch circuit 54 causes the slot-4 coded-key switch assembly 46 to generate a thirteen (13)-bit code onto the data paths 66 and 72. Because there is no coded card 33 installed in slot 4 15, all of the contact pairs of the slot-4 coded-key switch assembly 46 are in the open position, causing the content of the thirteen (13)-bit code to be 0000000000000. The microcontroller 63 is programmed to respond to 0000000000000 on the ADD1–ADD8 data path 66 and ADD9–ADD13 data path 72 as a no-coded-card 33-installed indication. Therefore, the microcontroller 63 does not enable any of the synthesizers and, consequently, no audible information is generated by the speaker 2 Upon detection that there is no coded card 33 installed in slot 4 15, the microcontroller 63 ends the storage of the eight (8)-bit codes (ADD1–ADD8) in its internal RAM and also stores in another location of its RAM the fact that the phoneme-to-word conversion operation is composed of three (3) syllables. Upon detection that there is no coded card 33 installed in slot 4 15, the microcontroller 63 also deactivates control line CTL4, which is part of the control path 73 that connects the microcontroller 63 and the slot-4 coded-key switch circuit 54. The deactivation of the control line (CTL4) connected to the slot-4 coded-key switch circuit 54 disables the slot-4 coded-key switch assembly 46. The microcontroller 63 then activates control line CTL5, which is part of the control path 73 that connects the microcontroller 63 and the slot-5 coded-key switch circuit 55. Since there are no coded cards 33 installed in the remaining slots, the microcontroller 63 processes slot 5 18 through slot 32 (not shown in these figures) in the same manner in which slot 4 15 was processed above. Whether or not any of the expansion apparatuses 47 are installed, the microcontroller 63 automatically and sequentially activates control lines CTL1 through CTL32 when in the automatic mode of operation. The thirteen (13)-bit code generated onto the data paths 66 and 72 when a control line is activated for a card slot in an expansion apparatus 47 that is not installed is the same as the no-coded-card 33-installed indication. Therefore, the microcontroller 63 does not enable any of the synthesizers and, consequently, no audible information is generated by the speaker 2.

After the deactivation of the control line (CTL32) connected to the slot-32 coded-key switch circuit (not shown in these figures), the microcontroller 63 replaces the magnitude of the original RAM-stored intercard time with a magnitude one-half as large, which now becomes the new intercard time, and activates control line CTL1, which is part of the control path 73 that connects the microcontroller 63 and the slot-1 coded-key switch circuit 48. The activation of the control line (CTL1) connected to the slot-1 coded-key switch circuit 48 causes the slot-1 light-emitting diode 7 to energize and transmit its light energy into the light-emitting-diode focus lens 34 of the coded card 33, having a surface on which a sensory-information representation in visual and tactile form is provided, installed in slot 1 6. The activation of the control line (CTL1) connected to the slot-1 coded-key switch circuit 48 also causes the slot-1 coded-key switch assembly 49 to generate a thirteen (13)-bit code onto the data paths 66 and 72. The content of the thirteen (13)-bit code is determined by the positions of the contact pairs of the slot-1 coded-key switch assembly 49, which result from the arrangement of the coded keys 38 in the code-key area 37 of the coded card 33 installed in slot 1 6. Eight (8) bits (ADD1–ADD8) of the thirteen (13)-bit code are transmitted via the data-path 66 interconnection to the microcontroller 63, to the internal synthesizer 64, and to any optional expansion-pack synthesizers 45 that may be installed in the apparatus. This eight (8)-bit code (ADD1–ADD8) is the address location within the synthesizer's nonvolatile memory where unique audible information associated with the coded card 33, having a surface on which a sensory-information representation in visual and tactile form is provided, installed in slot 1 6 is stored. The remaining five (5) bits (ADD9–ADD13) of the thirteen (13)-bit code are transmitted via the data-path 72 interconnection to the microcontroller 63. The five (5)-bit code (ADD9–ADD13) generated as a result of the coded card 33 installed in slot 1 6 is interpreted by the microcontroller 63 as a command that a phoneme-to-word conversion operation is taking place. The microcontroller 63 then enables the synthesizer defined by the five (5)-bit code via control paths EN1–EN4 67 to 70. Once enabled, the synthesizer accesses from its nonvolatile memory, and generates through the speaker 2 via the common audio-path 71 interconnection, the unique audible information associated with the coded card 33, having a surface on which a sensory-information representation in visual and tactile form is provided, installed in slot 1 6, the location within the nonvolatile memory being defined by the ADD1–ADD8 code. When the synthesizer has completed the generation of the unique audible information associated with the coded card 33, having a surface on which a sensory-information representation in visual and tactile form is provided, installed in slot 1 6, an end-of-message signal is generated by the enabled synthesizer over one of the control paths (EOM1–EOM4 67 to 70) to the microcontroller 63. The microcontroller 63 then deactivates control line CTL1, which is part of the control path 73 that connects the microcontroller 63 and the slot-1 coded-key switch circuit 48. The deactivation of the control line (CTL1) connected to the slot-1 coded-key switch circuit 48 causes the slot-1 light-emitting diode 7 to de-energize, ending transmission of its light energy into the light-emitting-diode focus lens 34 of the coded card 33, having a surface on which a sensory-information representation in visual and tactile form is provided, installed in slot 1 6. The deactivation of the control line (CTL1) connected to the slot-1 coded-key switch circuit 48 also disables the slot-1 coded-key switch assembly 49.

After the deactivation of the control line (CTL1) connected to the slot-1 coded-key switch circuit 48, the microcontroller 63 pauses for a time proportional to the new RAM-stored intercard time, which is half the time of the original intercard time. After the intercard-time pause, the microcontroller 63 activates control line CTL2, which is part of the control path 73 that connects the microcontroller 63 and the slot-2 coded-key switch circuit 50. The activation of the control line (CTL2) connected to the slot-2 coded-key switch circuit 50 causes the slot-2 light-emitting diode 10 to energize and transmit its light energy into the light-emitting-diode focus lens 34 of the coded card 33, having a surface on which a sensory-information representation in visual and tactile form is provided, installed in slot 2 9. The activation of the control line (CTL2) connected to the slot-2 coded-key switch circuit 50 also causes the slot-2 coded-key switch assembly 51 to generate a thirteen (13)-bit code onto the data paths 66 and 72. The content of the thirteen (13)-bit code is determined by the positions of the contact pairs of the slot-2 coded-key switch assembly 51, which result from the arrangement of the coded keys 38 in the code-key area 37 of the coded card 33 installed in slot 2 9. Eight (8) bits (ADD1–ADD8) of the thirteen (13)-bit code are transmitted via the data-path 66 interconnection to the microcontroller 63, the internal synthesizer 64, and any optional expansion-pack synthesizers 45 that may be installed in the apparatus. This eight (8)-bit code (ADD1–ADD8) is the address location within the synthesizer's nonvolatile memory where unique audible information associated with the coded card 33, having a surface on which a sensory-information representation in visual and tactile form is provided, installed in slot 2 9 is stored. The remaining five (5) bits (ADD9–ADD13) of the thirteen (13)-bit code are transmitted via the data-path 72 interconnection to the microcontroller 63. The five (5)-bit code (ADD9–ADD13) generated as a result of the coded card installed in slot 2 9 is interpreted by the microcontroller 63 as a command that a phoneme-to-word conversion operation is taking place. The microcontroller 63 then enables the synthesizer defined by the five (5)-bit code via control paths EN1–EN4 67 to 70. Once enabled, the synthesizer accesses from its nonvolatile memory, and generates through the speaker 2 via the common audio-path 71 interconnection, the unique audible information associated with the coded card 33, having a surface on which a sensory-information representation in visual and tactile form is provided, installed in slot 2 9, the location within the nonvolatile memory being defined by the ADD1–ADD8 code. When the synthesizer has completed the generation of the unique audible information associated with the coded card 33, having a surface on which a sensory-information representation in visual and tactile form is provided, installed in slot 2 9, an end-of-message signal is generated by the enabled synthesizer over one of the control paths (EOM1–EOM4 67 to 70) to the microcontroller 63. The microcontroller 63 then deactivates control line CTL2, which is part of the control path 73 that connects the microcontroller 63 and the slot-2 coded-key switch circuit 50. The deactivation of the control line (CTL2) connected to the slot-2 coded-key switch circuit 50 causes the slot-2 light-emitting diode 10 to de-energize, ending transmission of its light energy into the light-emitting-diode focus lens 34 of the coded card 33, having a surface on which a sensory-information representation in visual and tactile form is provided, installed in slot 2 9. The deactivation of the control line (CTL2) connected to the slot-2 coded-key switch circuit 50 also disables the slot-2 coded-key switch assembly 51.

After the deactivation of the control line (CTL2) connected to the slot-2 coded-key switch circuit 50, the microcontroller 63 pauses for a time proportional to the new RAM-stored intercard time, which is half the time of the original intercard time. After the intercard-time pause, the microcontroller 63 activates control line CTL3, which is part of the control path 73 that connects the microcontroller 63 and the slot-3 coded-key switch circuit 52. The activation of the control line (CTL3) connected to the slot-3 coded-key switch circuit 52 causes the slot-3 light-emitting diode 13 to energize and transmit its light energy into the light-emitting-diode focus lens 34 of the coded card 33, having a surface on which a sensory-information representation in visual and tactile form is provided, installed in slot 3 12. The activation of the control line (CTL3) connected to the slot-3 coded-key switch circuit 52 also causes the slot-3 coded-key switch assembly 53 to generate a thirteen (13)-bit code onto the data paths 66 and 72. The content of the thirteen (13)-bit code is determined by the positions of the contact pairs of the slot-3 coded-key switch assembly 53, which result from the arrangement of the coded keys 38 in the code-key area 37 of the coded card 33 installed in slot 3 12. Eight (8) bits (ADD1–ADD8) of the thirteen (13)-bit code are transmitted via the data-path 66 interconnection to the microcontroller 63, the internal synthesizer 64, and any optional expansion-pack synthesizers 45 that may be installed in the apparatus. This eight (8)-bit code (ADD1–ADD8) is the address location within the synthesizer's nonvolatile memory where unique audible information associated with the coded card 33, having a surface on which a sensory-information representation in visual and tactile form is provided, installed in slot 3 12 is stored. The remaining five (5) bits (ADD9–ADD13) of the thirteen (13)-bit code are transmitted via the data-path 72 interconnection to the microcontroller 63. The five (5)-bit code (ADD9–ADD13) generated as a result of the coded card 33 installed in slot 3 12 is interpreted by the microcontroller 63 as a command that a phoneme-to-word conversion operation is taking place. The microcontroller 63 then enables the synthesizer defined by the five (5)-bit code via control paths EN1–EN4 67 to 70. Once enabled, the synthesizer accesses from its nonvolatile memory, and generates through the speaker 2 via the common audio-path 71 interconnection, the unique audible information associated with the coded card 33, having a surface on which a sensory-information representation in visual and tactile form is provided, installed in slot 3 12, the location within the nonvolatile memory being defined by the ADD1–ADD8 code. When the synthesizer has completed the generation of the unique audible information associated with the coded card 33, having a surface on which a sensory-information representation in visual and tactile form is provided, installed in slot 3 12, an end-of-message signal is generated by the enabled synthesizer over one of the control paths (EOM1–EOM4 67 to 70) to the microcontroller 63. The microcontroller 63 then deactivates control line CTL3, which is part of the control path 73 that connects the microcontroller 63 and the slot-3 coded-key switch circuit 52. The deactivation of the control line (CTL3) connected to the slot-3 coded-key switch circuit 52 causes the slot-3 light-emitting diode 13 to de-energize, ending transmission of its light energy into the light-emitting-diode focus lens 34 of the coded card 33, having a surface on which a sensory-information representation in visual and tactile form is provided, installed in slot 3 12. The deactivation of the control line (CTL3) connected to the slot-3 coded-key switch circuit 52 also disables the slot-3 coded-key switch assembly 53.

After the deactivation of the control line (CTL3) connected to the slot-3 coded-key switch circuit 52, the microcontroller 63 pauses for a time proportional to the new RAM-stored intercard time, which is half the time of the original intercard time. After the intercard-time pause, the microcontroller 63 activates control line CTL4, which is part of the control path 73 that connects the microcontroller 63 and the slot-4 coded-key switch circuit 54. The activation of the control line (CTL4) connected to the slot-4 coded-key switch circuit 54 causes the slot-4 coded-key switch assembly 46 to generate a thirteen (13)-bit code onto the data paths 66 and 72. Because there is no coded card 33 installed in slot 4 15, all of the contact pairs of the slot-4 coded-key switch assembly 46 are in the open position, causing the content of the thirteen (13)-bit code to be 0000000000000. The microcontroller 63 is programmed to respond to 0000000000000 on the ADD1–ADD8 data path 66 and ADD9–ADD13 data path 72 as a no-coded-card 33-installed indication. Therefore, the microcontroller 63 does not enable any of the synthesizers and, consequently, no audible information is generated by the speaker 2. Upon detection that there is no coded card 33 installed in slot 4 15, the microcontroller 63 also deactivates control line CTL4, which is part of the control path 73 that connects the microcontroller 63 and the slot-4 coded-key switch circuit 54. The deactivation of the control line (CTL4) connected to the slot-4 coded-key switch circuit 54 disables the slot-4 coded-key switch assembly 46. The microcontroller 63 then activates control line CTL5, which is part of the control path 73 that connects the microcontroller 63 and the slot-5 coded-key switch circuit 55. Since there are no coded cards 33 installed in the remaining slots, the microcontroller 63 processes slot 5 18 through slot 32 in the same manner in which slot 4 15 was processed above. Whether or not any of the expansion apparatuses 47 are installed, the microcontroller 63 automatically and sequentially activates control lines CTL1 through CTL32 when in the automatic mode of operation. The thirteen (13)-bit code generated onto the data paths 66 and 72 when a control line is activated for a card slot in an expansion apparatus 47 that is not installed is the same as the no-coded-card 33-installed indication. Therefore, the microcontroller 63 does not enable any of the synthesizers and, consequently, no audible information is generated by the speaker 2.

After the deactivation of the control line (CTL32) connected to the slot-32 coded-key switch circuit, the microcontroller 63 replaces the magnitude of the current RAM-stored intercard time with a magnitude one-half as large, which now becomes the new intercard time and is one quarter the original intercard time. The process of sequentially accessing the unique audible information associated with the coded cards 33, each having a surface on which a sensory-information representation in visual and tactile form is provided, installed in the card slots while pausing after each access and then repeating the entire access sequence over again with a new intercard time of one half the intercard time of the last access sequence is repeated until the magnitude of the intercard time is one thirty-second of the magnitude of the original intercard time, yielding five complete access sequences.

After the deactivation of the control line (CTL32) connected to the slot-32 coded-key switch circuit, at the completion of the fifth access sequence, the microcontroller 63 generates a unique eight (8)-bit code (ADD1–ADD8), determined by the three (3) RAM-stored eight (8)-bit codes representative of the coded cards 33 installed in slot 1 6, slot 2 9, and slot 3 12, onto the data path 66 and enables the synthesizer via the control paths EN1–EN4 67 to 70. Once enabled, the synthesizer accesses from its nonvolatile memory, and generates through the speaker 2 via the common audio-path 71 interconnection, audible information corresponding to the word "misapply", formed by the consecutive arrangement of the inserted coded cards 33, each having a surface on which a sensory-information representation in visual and tactile form is provided. When the synthesizer has completed the generation of the audible information corresponding to the word "misapply", formed by the consecutive arrangement of the inserted coded cards 33, each having a surface on which a sensory-information representation in visual and tactile form is provided, an end-of-message signal is generated by the enabled synthesizer over one of the control paths (EOM1–EOM4 67 to 70) to the microcontroller 63. The apparatus is now out of the phoneme-to-word-conversion automatic mode of operation and will now respond to any additional keyboard 3-button presses.

Figure 13:
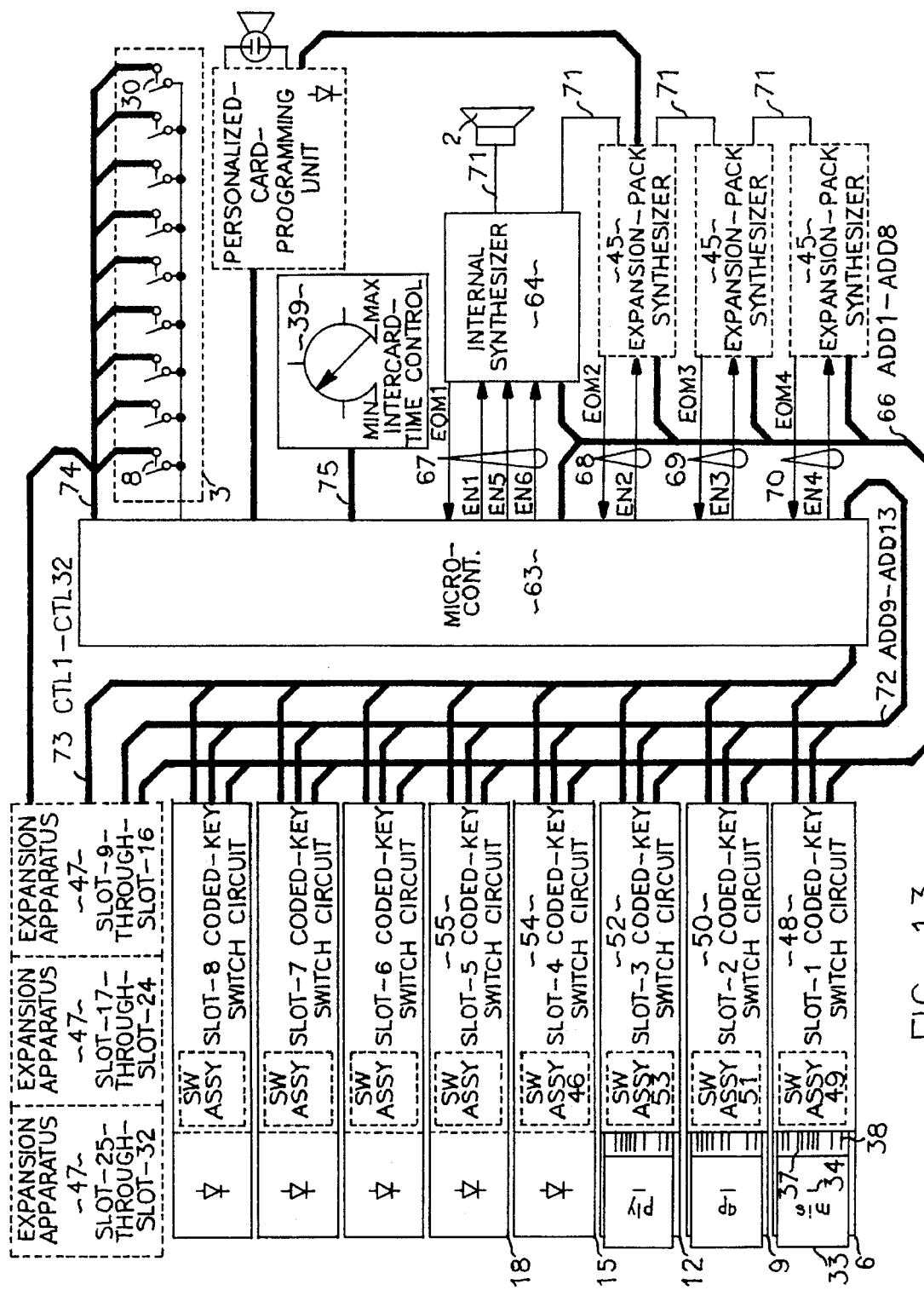
FIG. 13 is a block diagram of a card type of electronic learning aid/teaching apparatus in accordance with the present invention, showing three (3) coded cards installed, illustrating a typical phoneme-to-word conversion application.

For illustration purposes only, FIG. 12 and FIG. 13 show the coded cards 33 installed in the housing device i forming the word "misapply". It will be evident to those skilled in the art that any comparable word or fraction thereof may be formed with the coded cards 33. It will also be equally evident to those skilled in the art that any number of coded cards 33 may be used to form a word or fraction thereof.

Figure 14:
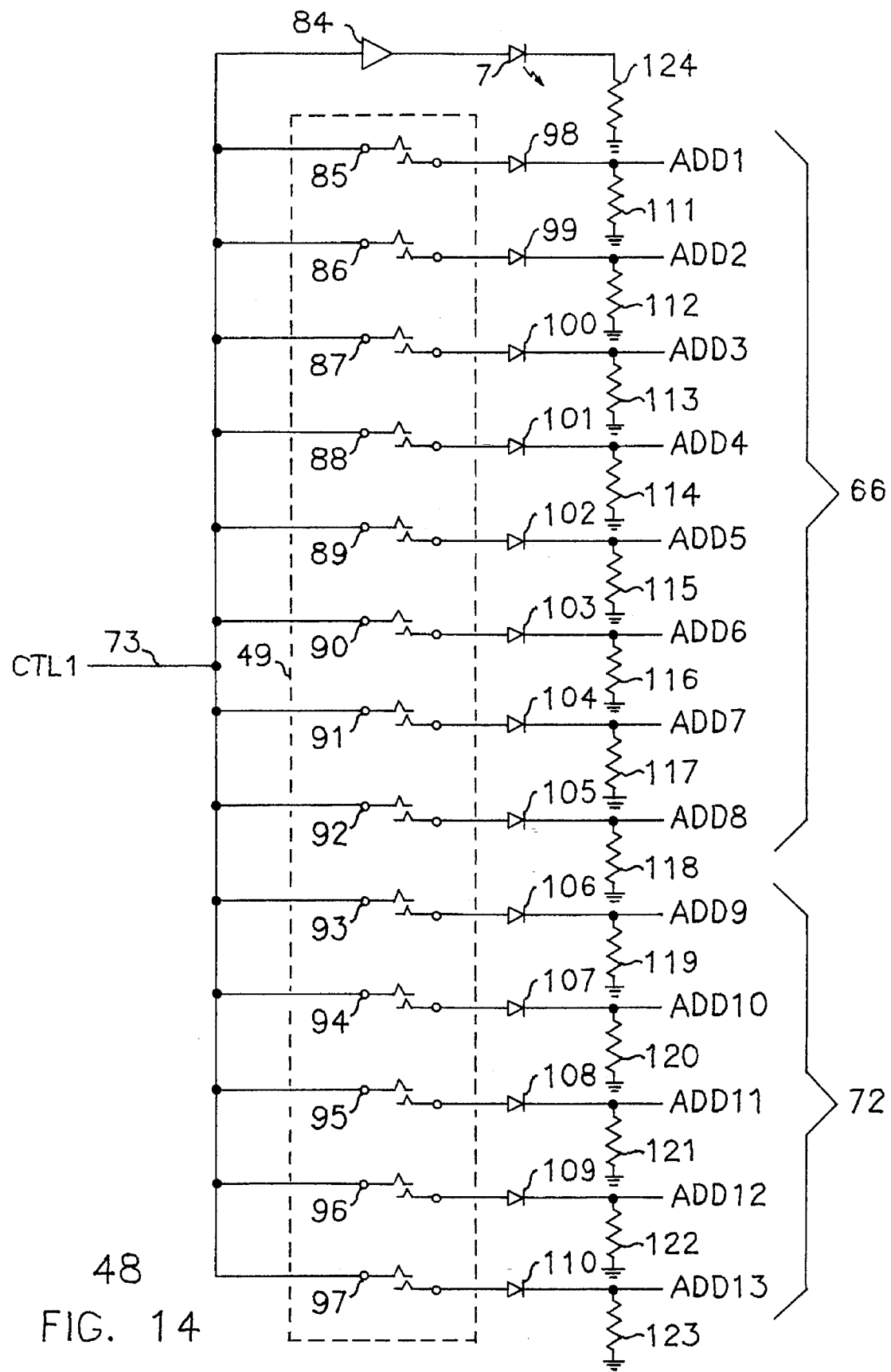
FIG. 14 is a schematic diagram of the slot-1 coded key-switch circuit of a card type of electronic learning aid/teaching apparatus in accordance with the present invention.

FIG. 14 is a schematic diagram of the slot-1 coded-key switch circuit 48 of the card-type of electronic learning aid/teaching apparatus in accordance with the present invention. The major components illustrated in FIG. 14 include the slot-1 light-emitting diode 7, a buffer 84, and the slot-1 coded-key switch assembly 49, which is composed of switches SW1 85, SW2 86, SW3 87, SW4 88, SW5 89, SW6 90, SW7 91, SW8 92, SW9 93, SW10 94, SW11 95, SW12 96, and SW13 97.

CTL1, which is part of the control-path 73 interconnection to the microcontroller 63 (not shown in this figure), provides the input signal to the slot-1 coded-key switch circuit 48. The output signal of the slot-1 coded-key switch circuit 48 is a thirteen (13)-bit code generated onto the data paths 66 and 72, which are interconnected to the outputs of the seven (7) remaining coded-key switch circuits 50, 52, 54, 55, 57, 59, and 61 (not shown in this figure), the outputs of the coded-key switch circuits, located in any installed optional expansion apparatuses 47 (not shown in this figure), the microcontroller 63, the internal synthesizer 64 (not shown in this figure), and any installed optional expansion-pack synthesizers 45 (not shown in this figure).

When control line CTL1, which is part of the control path 73 that connects the microcontroller 63 and the slot-1 coded-key switch circuit 48, becomes active, whether in the single-card mode of operation or the automatic mode of operation, it will cause the slot-1 coded-key switch assembly 49 to generate a thirteen (13)-bit code, through the SW1–SW13 steering diodes 98 to 110 and across the ADD1–ADD13 pull-down resistors 111 to 123, onto the data paths 66 and 72 and cause the slot-1 light-emitting diode 7 to energize. The content of the thirteen (13)-bit code is determined by the positions of the contact pairs that form switches SW1 through SW13 85 to 97 of the slot-1 coded-key switch assembly 49, which result from the arrangement of the coded keys 38 (not shown in this figure) in the code-key area 37 (not shown in this figure) of the coded card 33 (not shown in this figure) installed in slot 1 6. If no coded card 33 is installed in slot 1 6, all contact pairs that form switches SW1 through SW13 85 to 97 will remain in the open position, causing the content of the thirteen (13)-bit code to be 0000000000000 because of the ADD1–ADD13 pull-down resistors 111 to 123. The microcontroller 63 is programmed to respond to 0000000000000 on the ADD1–ADD8 data path 66 and ADD9–ADD13 data path 72 as a no-coded-card 33-installed indication. When control line CTL1, which is part of the control path 73 that connects the microcontroller 63 and the slot-1 coded-key switch circuit 48, becomes active, the slot-1 light-emitting diode 7 is energized by the buffer 84 through the current-limiting resistor 124.

It should be remembered that the seven (7) remaining coded-key switch circuits 50, 52, 54, 55, 57, 59, and 61 and the coded-key switch circuits located in any installed optional expansion apparatuses 47 operate identically to the slot-1 coded-key switch circuit 48. It should also be remembered that the decision to use switches formed by contact pairs to generate the thirteen (13)-bit code from the installed coded card 33 instead of optical, magnetic, or other means is strictly a design choice.

What is claimed is:

1. A card type of electronic learning aid/teaching apparatus comprising a plurality of card means;

each of said card means having a surface on which a sensory-information representation in visual, tactile, and/or odorous form is provided to present pictorial-symbol information and/or language-symbol information, to include imagery, alphabetic letters, phonemes, words, text, numerals, and/or arithmetical symbols;

coding means associated with each of said plurality of card means, identifying said sensory-information representation;

a first housing means having a plurality of card slots in combination with a visually and functionally distinctive button associated with each said card slot wherein one of a plurality of said card means may be inserted in each of said card slots;

decoding means for reading said coding means;

operator-input means whereby an input signal is generated as a result of selection by the operator, by the pressing of one of said visually and functionally distinctive buttons;

a memory means containing audio information as vocal expression and/or nonvocal sound corresponding to each of said plurality of card means;

a control means associated with said decoding means reacting to said input signal, by the pressing of one of said visually and functionally distinctive buttons thereby accessing from said memory means said audio information corresponding to said particular card means; and output means associated with said memory means and said control means for converting said audio information, as vocal expression and/or nonvocal sound, into sensory-output information representative of a particular one of said card means.

2. The card type of electronic learning aid/teaching apparatus as set forth in claim 1, further including:

a sensory-information-illumination means reacting to said input signal, by the pressing of one of said visually and functionally distinctive buttons.

3. The card type of electronic learning aid/teaching apparatus as set forth in claim 2, further including:

said control means for the coordination of said sensory-information-illumination means and said output means.

4. The card type of electronic learning aid/teaching apparatus as set forth in claim 1, further including:

a plurality of personalized card means, each formed in an identical physical form to said card means;

each of said personalized card means having a surface for the deposition of a personalized sensory-information representation in visual, tactile, and/or odorous form to present pictorial-symbol information and/or language-symbol information, to include imagery, alphabetic letters, phonemes, words, text, numerals, and/or arithmetical symbols;

said coding means associated with each of said plurality of personalized card means, identifying said personalized sensory-information representation;

a programming means whereby personalized audio information as vocal expression and/or nonvocal sound corresponding to each of said plurality of personalized card means can be stored into said memory means; and said programming means comprising:

a second housing means that is physically attachable to said first housing means;

an electroacoustic-transducer means responsive to personalized audible information that generates equivalent personalized audio-information signals for storage into said memory means;

a personalized control means coordinating said equivalent personalized audio-information signal with the storage function of said memory means; and a functional interconnection means between said first housing means and said second housing means.

5. The card type of electronic learning aid/teaching apparatus as set forth in claim 4, further including:

said decoding means for reading said coding means;

said operator-input means whereby an input signal is generated as a result of selection by the operator, by the pressing of one of said visually and functionally distinctive buttons;

said control means associated with said decoding means reacting to said input signal, by the pressing of one of said visually and functionally distinctive buttons thereby accessing from said memory means said personalized audio information corresponding to said particular personalized card means; and said output means associated with said memory means and said control means for converting said personalized audio information, as vocal expression and/or nonvocal sound, into said sensory-output information representative of a particular one of said personalized card means.

6. The card type of electronic learning aid/teaching apparatus as set forth in claim 5, wherein:

said coding means associated with each of said card means comprises a code-key area;

said code-key area includes a plurality of raised code keys uniquely arranged with respect to each individual said card means and identifying said card means;

said code keys are uniquely arranged with respect to each individual said card means defining a distinctive pattern of keys thereon;

said decoding means is associated with each of said card slots;

said decoding means comprises a switch-assembly means positioned in each of said card slots;

said switch-assembly means is arranged in functional association with said code-key area of inserted said card means into said card slot; and said switch-assembly means comprises a plurality of switches, each positioned to being in the open position or the closed position depending on said unique arrangement of said code keys in said code-key area on inserted said card means in registration to said switch-assembly means located in arrangement with said card slot.

7. The card type of electronic learning aid/teaching apparatus as set forth in claim 1, further including:

a plurality of memory-expansion means containing additional audio information as vocal expression and/or nonvocal sound corresponding to each additional said plurality of card means; and said first housing means having a capacity physically and functionally to accommodate a plurality of said memory-expansion means.

8. The card type of electronic learning aid/teaching apparatus as set forth in claim 1, further including:

a third housing means having a plurality of additional card slots in combination with a visually and functionally distinctive button associated with each said additional card slot wherein one of a plurality of said card means may be inserted in each of said additional card slots; and said first housing means having a capacity physically and functionally to accommodate a plurality of said third housing means.

9. The card type of electronic learning aid/teaching apparatus as set forth in claim 1, further including a plurality of personalized card means in an identical physical form to said cards means;

each of said personalized card means having a surface for the deposition of a personalized sensory-information representation in visual, tactile, and/or odorous form to present pictorial-symbol information and/or language-symbol information, to include imagery, alphabetic letters, phonemes, words, text, numerals, and/or arithmetical symbols;

said coding means associated with each of said plurality of personalized card means, identifying said personalized sensory-information representation;

a programming means whereby personalized audio information as vocal expression and/or nonvocal sound corresponding to each of said plurality of personalized card means can be stored into said memory means;

said programming means comprising:

a second housing means that is physically attachable to said first housing means;

an electroacoustic-transducer means responsive to personalized audible information, as vocal expression and/or nonvocal sound, that generates equivalent personalized audio-information signals for storage into said memory means;

a personalized control means coordinating said equivalent personalized audio-information signal with the storage function of said memory means; and a functional-interconnection means between said first housing means and said second housing means;

said decoding means for reading said coding means;

said operator-input means whereby an input signal is generated as a result of selection by the operator, by the pressing of one of said visually and functionally distinctive buttons;

said control means associated with said decoding means reacting to said input signal by the pressing of one of said visually and functionally distinctive buttons thereby accessing from said memory means said personalized audio information corresponding to said particular personalized card means;

said output means associated with said memory means and said control means for converting said personalized audio information, as vocal expression and/or nonvocal sound, into said sensory-output information representative of a particular one of said personalized card means;

a sensory-information-illumination means reacting to said input signal, by the pressing of one of said visually and functionally distinctive buttons thereby illuminating said particular sensory-information representation;

a personalized-sensory-information-illumination means in addition reacting to said input signal, by the pressing of one of said visually and functionally distinctive buttons thereby illuminating said particular personalized sensory-information representation;

said control means for the coordination of said sensory-information-illumination means and said personalized-sensory-information-illumination means with said output means;

said coding means associated with each of said card means and personalized card means comprising a code-key area;

said code-key area including a plurality of raised code keys uniquely arranged with respect to each individual said card means and said personalized card means and identifying said card means and said personalized card means;

said code keys uniquely arranged with respect to each individual said card means and said personalized card means defining a distinctive pattern of keys thereon;

said decoding means associated with each of said card slots;

said decoding means comprising a switch-assembly means positioned in each of said card slots;

said switch-assembly means arranged in functional association with said code-key area of said card means and said personalized card means inserted into said card slot;

said switch-assembly means comprising a plurality of switches, each positioned to being in the open position or the closed position depending on said unique arrangement of said code keys in said code-key area on said inserted card means and said inserted personalized card means in registration to said switch-assembly means located in arrangement with said card slot;

a plurality of memory-expansion means containing additional audio information as vocal expression and/or nonvocal sound corresponding to each additional said plurality of card means and said plurality of personalized card means;

said first housing means having a capacity physically and functionally to accommodate a plurality of said memory-expansion means;

a third housing means having a plurality of additional card slots in combination with a visually and functionally distinctive button associated with each said additional card slot wherein one of a plurality of card means or personalized card means may be inserted in each of said additional card slots; and said first housing means having a capacity physically and functionally to accommodate a plurality of said third housing means.

10. A card type of electronic learning aid/teaching apparatus comprising a plurality of card means;

said card means divided into a plurality of types including a first, second, third, and fourth card means;

a plurality of said first card means having a surface on which a sensory-information representation in visual, tactile, and/or odorous form is provided to present pictorial-symbol information and/or language-symbol information, to include imagery, alphabetic letters, phonemes, words, text, numerals, and/or arithmetical symbols;

coding means associated with each of said plurality of first card means, identifying said card means as said first card means and identifying said sensory-information representation;

a first housing means having a plurality of card slots in combination with a visually and functionally distinctive button associated in an equal manner with all of said card slots wherein one of a plurality of said card means may be inserted in each of said card slots;

decoding means for reading said coding means;

operator-input means whereby an input signal is generated as a result of selection by the operator, by the pressing of said visually and functionally distinctive button;

a memory means containing audio information as vocal expression and/or nonvocal sound corresponding to each of said plurality of first card means;

a control means associated with said decoding means reacting to said input signal, by the pressing of said visually and functionally distinctive button thereby sequentially accessing from said memory means said audio information corresponding to each inserted said first card means; and output means associated with said memory means and said control means for converting said audio information, as vocal expression and/or nonvocal sound, into sensory-output information representative of each sequentially accessed said first card means.

11. The card type of electronic learning aid/teaching apparatus as set forth in claim 10, further including:

a sensory-information-illumination means reacting to said input signal, by the pressing of said visually and functionally distinctive button thereby sequentially illuminating each inserted said sensory-information representation.

12. The card type of electronic learning aid/teaching apparatus as set forth in claim 11, further including:

said control means for the coordination of said sensory-information-illumination means and said output means.

13. The card type of electronic learning aid/teaching apparatus as set forth in claim 10, further including:

a manually adjustable intercard-time means to define the intercard time between the access from said memory means of said audio information corresponding to said first card means and the access from said memory means of said audio information corresponding to the next said first card means.

14. The card type of electronic learning aid/teaching apparatus as set forth in claim 10, further including:

a plurality of said second card means having a surface on which a sensory-information representation in visual, tactile, and/or odorous form is provided to present pictorial-symbol information and/or language-symbol information representative of a phoneme;

said coding means associated with each of said plurality of second card means, identifying said card means as said second card means and identifying said sensory-information representation;

said decoding means for reading said coding means;

said memory means containing audio information as a vocal expression of the phoneme type corresponding to each of said plurality of second card means;

said memory means in addition containing audio information as a vocal expression corresponding to a word or fraction thereof formed by a consecutive arrangement of a group of said second card means;

said control means associated with said decoding means reacting to said input signal, by the pressing of said visually and functionally distinctive button thereby sequentially accessing from said memory means said audio information corresponding to each inserted said second card means and automatically repeating the sequential accessing of each inserted said second card means while reducing the access time between said second card means at the start of each access sequence and after a finite number of access sequences of said memory means of said audio information corresponding to each of said second card means, said audio information corresponding to a word or fraction thereof formed by the consecutive arrangement of the group of inserted said second card means is accessed from said memory means;

said output means associated with said memory means and said control means for converting said audio information, as a vocal expression of the phoneme type, into sensory-output information representative of each sequentially accessed said second card means; and said output means in addition associated with said memory means and said control means for converting said audio information, as a vocal expression, into sensory-output information corresponding to a word or fraction thereof formed by a consecutive arrangement of a group of said second card means.

15. The card type of electronic learning aid/teaching apparatus as set forth in claim 14, further including:

a sensory-information-illumination means reacting to said input signal, by the pressing of said visually and functionally distinctive button thereby sequentially illuminating each inserted said sensory-information representation.

16. The card type of electronic learning aid/teaching apparatus as set forth in claim 15, further including:

said control means for the coordination of said sensory-information-illumination means and said output means.

17. The card type of electronic learning aid/teaching apparatus as set forth in claim 14, further including:

a manually adjustable intercard-time means to define the intercard time between the initial sequential access from said memory means of said audio information corresponding to said second card means and the access from said memory means of said audio information corresponding to the next said second card means.

18. The card type of electronic learning aid/teaching apparatus as set forth in claim 10, further including:

a plurality of said third card means having a surface on which a sensory-information representation in visual, tactile, and/or odorous form is provided to present pictorial-symbol information and/or language-symbol information representative of a numeral and/or arithmetical symbol;

said coding means associated with each of said plurality of third card means, identifying said card means as said third card means and identifying said sensory-information representation;

said decoding means for reading said coding means;

said memory means containing audio information as vocal expression and/or nonvocal sound corresponding to each of said plurality of third card means;

said memory means in addition containing audio information as vocal expression concerning solutions to a plurality of arithmetical problems formed by a consecutive arrangement of a group of said third card means;

said memory means in addition containing audio information as vocal expressions representing comments reflecting on the operator's response to said arithmetical problems formed by a consecutive arrangement of a group of said third card means;

said control means associated with said decoding means reacting to said input signal, by the pressing of said visually and functionally distinctive button thereby sequentially accessing from said memory means said audio information corresponding to each inserted said third card means;

a logic means including arithmetical-problem-solution means for performing the arithmetical problem created through the sequential access, caused by said input signal, by the pressing of said visually and functionally distinctive button associated in an equal manner with all of said card slots, of a consecutive arrangement of a group of said third card means;

a comparator means associated with said arithmetical-problem-solution means and said decoding means for determining the accuracy of the solution to the arithmetical problem created through the sequential access, caused by said input signal, by the pressing of said visually and functionally distinctive button associated in an equal manner with all of said card slots, of a consecutive arrangement of a group of said third card means;

said logic means in addition accessing from said memory means said audio information concerning a solution to the arithmetical problem created through the sequential access, caused by said input signal, by the pressing of said visually and functionally distinctive button associated in an equal manner with all of said card slots, of a consecutive arrangement of a group of said third card means;

said logic means in addition accessing from said memory means said audio information representing comments reflecting on the operator's response to the arithmetical problem created through the sequential access, caused by said input signal, by the pressing of said visually and functionally distinctive button associated in an equal manner with all of said card slots, of a consecutive arrangement of a group of said third card means;

said output means associated with said memory means and said control means for converting said audio information, as vocal expression and/or nonvocal sound, into sensory-output information representative of each sequentially accessed said third card means;

said output means associated with said memory means and said logic means for converting said audio information, as a vocal expression concerning solutions to said arithmetical problems created through the sequential access of the consecutive arrangement of a group of said third card means, into sensory-output information representative of the consecutive arrangement of a group of sequentially accessed said third card means; and said output means associated with said memory means and said logic means for converting said audio information, as a vocal expression representing comments reflecting on the operator's response to said arithmetical problems created through the sequential access of the consecutive arrangement of a group of said third card means, into sensory-output information representative of the consecutive arrangement of a group of sequentially accessed said third card means.

19. The card type of electronic learning aid/teaching apparatus as set forth in claim 18, further including:

a sensory-information-illumination means reacting to said input signal, by the pressing of said visually and functionally distinctive button associated in an equal manner with all of said card slots, of a multiple of said third card means thereby sequentially illuminating each inserted said sensory-information representation.

20. The card type of electronic learning aid/teaching apparatus as set forth in claim 19, further including:

said control means for the coordination of said sensory-information-illumination means and said output means.

21. The card type of electronic learning aid/teaching apparatus as set forth in claim 18, further including:

a manually adjustable intercard-time means to define the intercard time between the access from said memory means of said audio information corresponding to said third card means and the access from said memory means of said audio information corresponding to the next said third card means.

22. The card type of electronic learning aid/teaching apparatus as set forth in claim 10, further including:

a plurality of said fourth card means having a surface for the deposition of a sensory-information representation in visual, tactile, and/or odorous form to present pictorial-symbol information and/or language-symbol information, to include imagery, alphabetic letters, phonemes, words, text, numerals, and/or arithmetical symbols;

said coding means associated with each of said plurality of fourth card means, identifying said card means as said fourth card means and identifying said sensory-information representation;

a programming means whereby audio information as vocal expression and/or nonvocal sound corresponding to each of said plurality of fourth card means can be stored into said memory means; and said programming means comprises:

a second housing means that is physically attachable to said first housing means;

an electroacoustic-transducer means responsive to audible information, as vocal expression and/or nonvocal sound, that generates equivalent audio-information signals for storage into said memory means;

said control means coordinating said equivalent audio-information signal as generated by said electroacoustic-transducer means with the storage function of said memory means; and a functional-interconnection means between said first housing means and said second housing means.

23. The card type of electronic learning aid/teaching apparatus as set forth in claim 22, further including:

said decoding means for reading said coding means;

said control means associated with said decoding means reacting to said input signal, by the pressing of said visually and functionally distinctive button thereby sequentially accessing from said memory means said audio information corresponding to each inserted said fourth card means; and said output means associated with said memory means and said control means for converting said audio information, as vocal expression and/or nonvocal sound, into sensory-output information representative of each sequentially accessed said fourth card means.

24. The card type of electronic learning aid/teaching apparatus as set forth in claim 23, further including:

a sensory-information-illumination means reacting to said input signal, by the pressing of said visually and functionally distinctive button thereby sequentially illuminating each inserted said sensory-information representation.

25. The card type of electronic learning aid/teaching apparatus as set forth in claim 24, further including:

said control means for the coordination of said sensory-information-illumination means and said output means.

26. The card type of electronic learning aid/teaching apparatus as set forth in claim 23, further including:

a manually adjustable intercard-time means to define the intercard time between the access from said memory means of said audio information corresponding to said fourth card means and the access from said memory means of said audio information corresponding to the next said fourth card means.

27. The card type of electronic learning aid/teaching apparatus as set forth in claim 10, further including:

said first housing means having a plurality of said card slots in combination with a visually and functionally distinctive button associated with each said card slot wherein one of a plurality of said card means may be inserted in each of said card slots;

said operator-input means whereby an input signal is generated as a result of selection by the operator, by the pressing of one of said visually and functionally distinctive buttons associated with each said card slot;

said control means associated with said decoding means reacting to said input signal by the pressing of one of said visually and functionally distinctive buttons thereby accessing from said memory means said audio information corresponding to said particular card means; and said output means associated with said memory means and said control means for converting said audio information, as vocal expression and/or nonvocal sound, into sensory-output information representative of a particular one of said card means.

28. The card type of electronic learning aid/teaching apparatus as set forth in claim 10, wherein:

said coding means associated with each of said card means comprises a code-key area;

said code-key area includes a plurality of raised code keys uniquely arranged with respect to each individual said card means and identifying said card means;

said raised code keys in addition identify the said type of card means of each of said plurality of card means;

said code keys are uniquely arranged with respect to each individual said card means defining a distinctive pattern of keys thereon;

said decoding means is associated with each of said card slots;

said decoding means comprises a switch-assembly means positioned in each of said card slots;

said switch-assembly means is arranged in functional association with said code-key area of inserted said card means into said card slot; and said switch assembly means comprising a plurality of switches, each positioned to being in the open position or the closed position depending on said unique arrangement of said code keys in said code-key area on inserted said card means in registration to said switch-assembly means located in arrangement with said card slot.

29. The card type of electronic learning aid/teaching apparatus as set forth in claim 10, further including:
- a plurality of memory-expansion means containing additional audio information as vocal expression and/or nonvocal sound corresponding to each additional said plurality of card means; and
- said first housing means having a capacity physically and functionally to accommodate a plurality of said memory-expansion means.

30. The card type of electronic learning aid/teaching apparatus as set forth in claim 10, further including:
- a third housing means having a plurality of additional card slots where one of a plurality of card means may be inserted in each of said additional card slots; and
- said first housing means having a capacity physically and functionally to accommodate a plurality of said third housing means.

31. The card type of electronic learning aid/teaching apparatus as set forth in claim 10, further including:
- a plurality of said second card means having a surface on which a sensory-information representation in visual, tactile, and/or odorous form is provided to present pictorial-symbol information and/or language-symbol information representative of a phoneme;
- said coding means associated with each of said plurality of second card means, identifying said card means as said second card means and identifying said sensory-information representation;
- said decoding means for reading said coding means;
- a plurality of said third card means having a surface on which a sensory-information representation in visual, tactile, and/or odorous form is provided to present pictorial-symbol information and/or language-symbol information representative of a numeral and/or arithmetical symbol;
- said coding means associated with each of said plurality of third card means, identifying said card means as said third card means and identifying said sensory-information representation;
- said decoding means for reading said coding means;
- a plurality of said fourth card means having a surface for the deposition of a sensory-information representation in visual, tactile, and/or odorous form to present pictorial-symbol information and/or language-symbol information, to include imagery, alphabetic letters, phonemes, words, text, numerals, and/or arithmetical symbols;
- said coding means associated with each of said plurality of fourth card means, identifying said card means as said fourth card means and identifying said sensory-information representation;
- said decoding means for reading said coding means;
- said first housing means having a plurality of said card slots in combination with a visually and functionally distinctive button associated with each said card slot wherein one of a plurality of said card means may be inserted into each of said card slots;
- said operator-input means whereby an input signal is generated as a result of selection by the operator, by the pressing of one of said visually and functionally distinctive buttons associated with each card slot;
- said memory means containing audio information as a vocal expression of the phoneme type corresponding to each of said plurality of second card means;
- said memory means in addition containing audio information as a vocal expression corresponding to a word or fraction thereof formed by a consecutive arrangement of a group of said second card means;
- said memory means containing audio information as vocal expression and/or nonvocal sound corresponding to each of said plurality of third card means;
- said memory means in addition containing audio information as vocal expression concerning solutions to a plurality of arithmetical problems formed by a consecutive arrangement of a group of said third card means;
- said memory means in addition containing audio information as vocal expressions representing comments reflecting on the operator's response to said arithmetical problems formed by a consecutive arrangement of a group of said third card means;
- said memory means in addition containing audio information as vocal expression and/or nonvocal sound corresponding to each of said plurality of said fourth card means;
- a programming means whereby audio information as vocal expression and/or nonvocal sound corresponding to each of said plurality of fourth card means can be stored into said memory means;
- said programming means comprises:
  - a second housing means that is physically attachable to said first housing means;
  - an electroacoustic-transducer means responsive to audible information, as vocal expression and/or nonvocal sound, that generates equivalent audio-information signals for storage into said memory means;
  - said control means coordinating said equivalent audio-information signal as generated by said electroacoustic-transducer means with the storage function of said memory means; and
  - a functional-interconnection means between said first housing means and said second housing means;
- said control means associated with said decoding means reacting to said input signal, by the pressing of said visually and functionally distinctive button associated in an equal manner with all of said card slots, of a multiple of said second card means by sequentially accessing from said memory means said audio information corresponding to each inserted said second card means and automatically repeating the sequential accessing of each inserted said second card means while reducing the access time between said second card means at the start of each access sequence and after a finite number of access sequences of said memory means of said audio information corresponding to each of said second card means, said audio information corresponding to a word or fraction thereof formed by the consecutive arrangement of the group of inserted said second card means is accessed from said memory means;
- said control means associated with said decoding means reacting to said input signal, by the pressing of said visually and functionally distinctive button associated in an equal manner with all of said card slots, of a multiple of said third card means by sequentially accessing from said memory means said audio information corresponding to each inserted said third card means;
- said control means associated with said decoding means reacting to said input signal, by the pressing of said visually and functionally distinctive button associated in an equal manner with all of said card slots, of a multiple of said fourth card means by sequentially accessing from said memory means said audio information corresponding to each inserted said fourth card means;

said control means associated with said decoding means reacting to said input signal, by the pressing of one of said visually and functionally distinctive buttons associated with each of said card slots, thereby accessing from said memory means said audio information corresponding to said particular card means;

a logic means including arithmetical-problem-solution means for performing the arithmetical problem created through the sequential access, caused by said input signal, by the pressing of said visually and functionally distinctive button associated in an equal manner with all of said card slots, of a consecutive arrangement of a group of said third card means;

a comparator means associated with said arithmetical-problem-solution means and said decoding means for determining the accuracy of the solution to the arithmetical problem created through the sequential access, caused by said input signal, by the pressing of said visually and functionally distinctive button associated in an equal manner with all of said card slots, of a consecutive arrangement of a group of said third card means;

said logic means in addition accessing from said memory means said audio information concerning a solution to the arithmetical problem created through the sequential access, caused by said input signal, by the pressing of said visually and functionally distinctive button associated in an equal manner with all of said card slots, of a consecutive arrangement of a group of said third card means;

said logic means in addition accessing from said memory means said audio information representing comments reflecting on the operator's response to the arithmetical problem created through the sequential access, caused by said input signal, by the pressing of said visually and functionally distinctive button associated in an equal manner with all of said card slots, of a consecutive arrangement of a group of said third card means;

a manually adjustable intercard-time means to define the intercard time between the initial sequential access from said memory means of said audio information corresponding to said card means and the access from said memory means of said audio information corresponding to the next said card means;

said output means associated with said memory means and said control means for converting said audio information, as a vocal expression of the phoneme type, into sensory-output information representative of each sequentially accessed said second card means;

said output means in addition associated with said memory means and said control means for converting said audio information, as a vocal expression, into sensory-output information corresponding to a word or fraction thereof formed by a consecutive arrangement of a group of said second card means;

said output means associated with said memory means and said control means for converting said audio information, as vocal expression and/or nonvocal sound, into sensory-output information representative of each sequentially accessed said third card means;

said output means associated with said memory means and said logic means for converting said audio information, as a vocal expression concerning solutions to said arithmetical problems created through the sequential access of the consecutive arrangement of a group of said third card means into sensory-output information representative of the consecutive arrangement of a group of sequentially accessed said third card means;

said output means associated with said memory means and said logic means for converting said audio information, as a vocal expression representing comments reflecting on the operator's response to said arithmetical problems created through the sequential access of the consecutive arrangement of a group of said third card means into sensory-output information representative of the consecutive arrangement of a group of sequentially accessed said third card means;

said output means associated with said memory means and said control means for converting said audio information, as vocal expression and/or nonvocal sound, into sensory-output information representative of each sequentially accessed said fourth card means;

said output means associated with said memory means and said control means for converting said audio information, as vocal expression and/or nonvocal sound, into sensory-output information representative of a particular one of said card means;

a sensory-information-illumination means reacting to said input signal, by the pressing of said visually and functionally distinctive button associated in an equal manner with all of said card slots, thereby sequentially illuminating each inserted said sensory-information representation;

said sensory-information-illumination means in addition reacting to said input signal, by the pressing of one of said visually and functionally distinctive buttons associated with each said card slot, thereby illuminating said particular sensory-information representation;

said control means for the coordination of said sensory-information-illumination means and said output means;

said coding means associated with each of said card means comprises a code-key area;

said code-key area includes a plurality of raised code keys uniquely arranged with respect to each individual said card means and identifying said card means;

said raised code keys in addition identifying the said type of card means of each of said plurality of card means;

said code keys are uniquely arranged with respect to each individual said card means defining a distinctive pattern of keys thereon;

said decoding means is associated with each of said card slots;

said decoding means comprising a switch-assembly means positioned in each of said card slots;

said switch-assembly means arranged in functional association with said code-key area of inserted said card means into said card slot;

said switch-assembly means comprising a plurality of switches, each positioned to being in the open position or the closed position depending on said unique arrangement of said code keys in said code-key area on inserted said card means in registration to said switch-assembly means located in arrangement with said card slot;

a plurality of memory-expansion means containing additional audio information as vocal expression and/or nonvocal sound corresponding to each additional said plurality of card means;

said first housing means having a capacity physically and functionally to accommodate a plurality of said memory-expansion means;

a third housing means having a plurality of additional card slots in combination with a visually and functionally distinctive button associated with each said additional card slot wherein one of a plurality of card means may be inserted in each of said additional card slots; and said first housing means having a capacity physically and functionally to accommodate a plurality of said third housing means.

32. An electronic learning aid/teaching apparatus comprising a plurality of sensory-information representations;

a memory means containing audio information as vocal expression and/or nonvocal sound corresponding to each of said plurality of sensory-information representations;

said memory means in addition containing audio information as vocal expression corresponding to a word or fraction thereof formed by a consecutive arrangement of a group of said sensory-information representations;

said memory means in addition containing audio information as vocal expression concerning solutions to a plurality of arithmetical problems formed by a consecutive arrangement of a group of said sensory-information representations;

said memory means in addition containing audio information as vocal expressions representing comments reflecting on the said arithmetical problems formed by a consecutive arrangement of a group of said sensory-information representations and the operator's response to said arithmetical problems;

said electronic learning aid/teaching apparatus possessing the ability of entering said audio information from a source external to said apparatus into said memory means corresponding to each of said plurality of sensory-information representations;

said electronic learning aid/teaching apparatus possessing the ability of being operable in a plurality of modes of operation to include the first and second modes of operation;

said electronic learning aid/teaching apparatus possessing the ability to interpret said plurality of sensory-information representations into a plurality of functional categories for unique treatment to include the first, second, and third functional categories;

an operator-input means whereby an input signal is generated as a result of selection by the operator of a particular one of said plurality of sensory-information representations when said electronic learning aid/teaching apparatus is in said first mode of operation;

said operator-input means whereby an input signal is generated as a result of selection by the operator of a multiple of said plurality of sensory-information representations when said electronic learning aid/teaching apparatus is in said second mode of operation;

a control means for selectively accessing said audio information from said memory means in an operating order defined by said operating mode of said electronic learning aid/teaching apparatus and said functional-category of selected said sensory-information representations;

said control means in addition reacting to said input signal generated in response to operator selection of a particular one of said plurality of sensory-information representations when said electronic learning aid/teaching apparatus is in said first mode of operation by accessing from said memory means said audio information corresponding to said particular sensory-information representation;

a sensory-information-illumination means reacting to said input signal generated in response to operator selection of a particular one of said plurality of sensory-information representations when said electronic learning aid/teaching apparatus is in said first mode of operation by illuminating said particular sensory-information representation;

said control means in addition reacting to said input signal generated in response to operator selection of a multiple of said plurality of sensory-information representations that have been interpreted by said electronic learning aid/teaching apparatus as said first functional-category representations when said electronic learning aid/teaching apparatus is in said second mode of operation by sequentially accessing from said memory means said audio information corresponding to each of said sensory-information representations;

said control means in addition reacting to said input signal generated in response to operator selection of a multiple of said plurality of sensory-information representations that have been interpreted by said electronic learning aid/teaching apparatus as said first functional-category representations when said electronic learning aid/teaching apparatus is in said second mode of operation by adjusting the time between the access from said memory means of said audio information corresponding to said sensory-information representations to a time defined by an intercard-time means;

said control means in addition reacting to said input signal generated in response to operator selection of a multiple of said plurality of sensory-information representations that have been interpreted by said electronic learning aid/teaching apparatus as said second functional-category representations when said electronic learning aid/teaching apparatus is in said second mode of operation by sequentially accessing from said memory means said audio information corresponding to each of said sensory-information representations, and automatically repeating the sequential accessing of each of said sensory-information representations while reducing the access time between said sensory-information representations at the start of each sequence, and after a finite number of access sequences of said memory means, said audio information corresponding to a word or fraction thereof formed by the consecutive arrangement of a group of said sensory-information representations is accessed from said memory means;

said control means in addition reacting to said input signal generated in response to operator selection of a multiple of said plurality of sensory-information representations that have been interpreted by said electronic learning aid/teaching apparatus as said second functional-category representations when said electronic learning aid/teaching apparatus is in said second mode of operation by adjusting the initial time between the sequential access from said memory means to a time defined by said intercard-time means;

said control means in addition reacting to said input signal generated in response to operator selection of a multiple of said plurality of sensory-information representations that have been interpreted by said electronic learning aid/teaching apparatus as said third functional-category representations when said electronic learning aid/teaching apparatus is in said second mode of operation by sequentially accessing from said memory means said audio information corresponding to each of said sensory-information representations;

said control means in addition reacting to said input signal generated in response to operator selection of a multiple of said plurality of sensory-information representations that have been interpreted by said electronic learning aid/teaching apparatus as said third functional-category representations when said electronic learning aid/teaching apparatus is in said second mode of operation by adjusting the time between the access from said memory means to a time defined by said intercard-time means;

said sensory-information-illumination means reacting to said input signal generated in response to operator selection of a multiple of said plurality of sensory-information representations when said electronic learning aid/teaching apparatus is in said second mode of operation by sequentially illuminating each of said sensory-information representations;

a logic means including arithmetical-problem-solution means for performing the arithmetical problem created through the sequential access, caused by said input signal generated in response to operator selection, of a consecutive arrangement of a group of said plurality of sensory-information representations that have been interpreted by said electronic learning aid/teaching apparatus as said third functional-category representations when said electronic learning aid/teaching apparatus is in said second mode of operation;

a comparator means associated with said arithmetical-problem-solution means and said sensory-information representations for determining the accuracy of the solution to the arithmetical problem created through the sequential access, caused by said input signal generated in response to operator selection, of a consecutive arrangement of a group of said plurality of sensory-information representations that have been interpreted by said electronic learning aid/teaching apparatus as said third functional-category representations when said electronic learning aid/teaching apparatus is in said second mode of operation;

said logic means including said arithmetical-problem-solution means in addition accessing from said memory means said audio information concerning a solution to the arithmetical problem created through the sequential access, caused by said input signal generated in response to operator selection, of a consecutive arrangement of a group of said plurality of sensory-information representations that have been interpreted by said electronic learning aid/teaching apparatus as said third functional-category representations when said electronic learning aid/teaching apparatus is in said second mode of operation;

said logic means including said arithmetical-problem-solution means in addition for accessing from said memory means said audio information representing comments reflecting on the operator's response to the arithmetical problem created through the sequential access, caused by said input signal generated in response to operator selection, of a consecutive arrangement of a group of said plurality of sensory-information representations that have been interpreted by said electronic learning aid/teaching apparatus as said third functional-category representations when said electronic learning aid/teaching apparatus is in said second mode of operation;

an output means associated with said memory means for converting said accessed audio information into sensory-output information;

said output means associated with said memory means for converting said audio information into said sensory-output information representative of a particular one of said plurality of sensory-information representations when said electronic learning aid/teaching apparatus is in said first mode of operation;

said output means in addition associated with said memory means for converting said audio information into said sensory-output information representative of a multiple of sequentially accessed said plurality of sensory-information representations when said electronic learning aid/teaching apparatus is in said second mode of operation;

said output means in addition associated with said memory means for converting said audio information from said memory means corresponding to a word or fraction thereof formed by a consecutive arrangement of a group of said sensory-information representations interpreted by said electronic learning aid/teaching apparatus as said second functional-category representations into sensory-output information when said electronic learning aid/teaching apparatus is in said second mode of operation;

said output means in addition associated with said memory means and said logic means, which includes said arithmetical-problem-solution means for converting said audio information from said memory means concerning solutions to said arithmetical problems into said sensory-output information when said electronic learning aid/teaching apparatus is in said second mode of operation and said sensory-information representations are interpreted by said electronic learning aid/teaching apparatus as said third functional-category representations;

said output means in addition associated with said memory means and said logic means, which includes said arithmetical-problem-solution means for converting said audio information from said memory means representing comments reflecting on the operator's response to said arithmetical problems into said sensory-output information when said electronic learning aid/teaching apparatus is in said second mode of operation and said sensory-information representations are interpreted by said electronic learning aid/teaching apparatus as said third functional-category representations; and said control means in addition for the coordination of said sensory-information-illumination means and said output means.

33. The electronic learning aid/teaching apparatus as set forth in claim 32, further including an operating-mode-selection means associated with said control means for determining the particular one of said plurality of operating modes of said electronic learning aid/teaching apparatus.

34. The electronic learning aid/teaching apparatus as set forth in claim 33, wherein said operating-mode-selection means comprises:

said first mode of operation having said operator-input means in the form of a button visually and functionally associated with each of said plurality of sensory-information representations; and said second mode of operation having said operator-input means in the form of a button visually and functionally associated in an equal manner with all of said plurality of sensory-information representations.

35. The electronic learning aid/teaching apparatus as set forth in claim 32, further including a functional-category selection means associated with said control means for determining the particular one of said plurality of functional categories of said sensory-information representations.

36. The electronic learning aid/teaching apparatus as set forth in claim 32, further including:

a plurality of card means;

said plurality of card means having a surface on which said sensory-information representation in visual, tactile, and/or odorous form is located to present pictorial-symbol information and/or language-symbol information, to include imagery, alphabetic letters, phonemes, words, text, numerals, and/or arithmetical symbols;

coding means associated with each of said plurality of card means, identifying said functional-category of said card means and identifying each said sensory-information representation;

a housing means having a plurality of card slots to accommodate the insertion of said card means;

an operating-mode-selection means including said first mode of operation having said operator-input means in the form of a button visually and functionally associated with each of said plurality of card slots;

said operating-mode-selection means in addition including said second mode of operation having said operator-input means in the form of a button visually and functionally associated in an equal manner with all of said plurality of card slots;

decoding means for reading said coding means;

said control means being responsive to said decoding means associated with said plurality of card means inserted in said card slots of said housing means and said input signal in said operating order defined by said operating mode of said electronic learning aid/teaching apparatus; and said intercard-time means comprising an operator-adjustable control.

37. The electronic learning aid/teaching apparatus as set forth in claim 36, wherein:

said coding means associated with each of said card means comprises a code-key area;

said code-key area includes a plurality of raised code keys uniquely arranged with respect to each individual said card means and identifying said card means;

said raised code keys in addition identifying said functional category of each of said plurality of card means;

said code keys are uniquely arranged with respect to each individual said card means defining a distinctive pattern of keys thereon;

said decoding means is associated with each of said card slots;

said decoding means comprising a switch-assembly means positioned in each of said card slots;

said switch-assembly means arranged in functional association with said code-key area of inserted said card means into said card slot; and said switch-assembly means comprising a plurality of switches, each positioned to being in the open position or the closed position depending on said unique arrangement of said code keys in said code-key area on inserted said card means in registration to said switch-assembly means located in arrangement with said card slot.

\* \* \* \* \*